(12) United States Patent  
Noel

(10) Patent No.: US 8,600,620 B2  
(45) Date of Patent: Dec. 3, 2013

(54) STEERING ASSEMBLY FOR A VEHICLE AND METHOD OF OPERATING THE SAME

(75) Inventor: Gerard Noel, Quebec (CA)

(73) Assignee: GN Technologies Inc., Sainte-Julie, Quebec (CA)

( * ) Notice: Subject to any disclaimer, the term of this patent is extended or adjusted under 35 U.S.C. 154(b) by 228 days.

(21) Appl. No.: 13/319,064

(22) PCT Filed: Jun. 17, 2010

(86) PCT No.: PCT/CA2010/000940  
§ 371 (c)(1),  
(2), (4) Date: Nov. 4, 2011

(87) PCT Pub. No.: WO2010/145030  
PCT Pub. Date: Dec. 23, 2010

(65) Prior Publication Data  
US 2012/0059549 A1 Mar. 8, 2012

Related U.S. Application Data

(60) Provisional application No. 61/187,927, filed on Jun. 17, 2009.

(51) Int. Cl.  
*A01B 69/00* (2006.01)

(52) U.S. Cl.  
USPC ............... 701/41; 180/6.2; 180/400; 180/416

(58) Field of Classification Search  
USPC ............... 701/41, 42; 180/6.2, 256, 258, 400, 180/414, 416, 417; 280/124.135, 124.138, 280/93.51, 433  
See application file for complete search history.

(56) References Cited

U.S. PATENT DOCUMENTS

| 3,370,670 A | 2/1968 | Love |
| 3,753,580 A | 8/1973 | Folkert |
| 4,090,581 A | 5/1978 | Miner et al. |
| 4,109,747 A | 8/1978 | Hornagold et al. |

(Continued)

FOREIGN PATENT DOCUMENTS

| CA | 2152245 | 12/1995 |
| EP | 0671311 | 9/1995 |

(Continued)

OTHER PUBLICATIONS

International Preliminary Report on Patentability for PCT/CA2010/000940 dated Jan. 5, 2012.

*Primary Examiner* — Gertrude Arthur Jeanglaude  
(74) *Attorney, Agent, or Firm* — Nixon Peabody LLP

(57) ABSTRACT

A steering assembly for steering a vehicle. The steering assembly comprises a first steering knuckle having a first wheel rotatably mounted thereto, a first swing mechanism for enabling displacement of the first steering knuckle along a first arced path and a first guiding mechanism for pivoting the first steering knuckle when the first steering knuckle is displaced along the first arced path in order to maintain the first wheel oriented tangentially relative to the first arced path. The first arced path is concave relative to a central longitudinal axis of the vehicle and spaced from the first frame member, away from a central longitudinal axis of the vehicle, by a distance sufficient to prevent the first wheel from contacting the first frame member when the first steering knuckle is pivoted. There is further provided a method of operating the steering assembly.

30 Claims, 47 Drawing Sheets

(56) References Cited

U.S. PATENT DOCUMENTS

| | | | |
|---|---|---|---|
| 4,134,601 A | | 1/1979 | Propst |
| 4,271,922 A | * | 6/1981 | Kishline ............ 180/254 |
| 4,313,613 A | * | 2/1982 | Worsham ............ 280/89.11 |
| 4,343,560 A | * | 8/1982 | Chalmers ............ 403/13 |
| 4,382,607 A | | 5/1983 | Voight |
| 4,394,729 A | * | 7/1983 | Armstrong ............ 712/243 |
| 4,468,047 A | | 8/1984 | McGhie et al. |
| 4,616,949 A | * | 10/1986 | Kellner ............ 403/104 |
| 4,625,982 A | * | 12/1986 | Matsuo ............ 280/93.506 |
| 4,720,119 A | | 1/1988 | Ritter |
| 5,046,577 A | | 9/1991 | Hurlburt |
| 5,236,059 A | | 8/1993 | Overocker |
| 5,322,308 A | | 6/1994 | Bishop |
| 5,340,138 A | | 8/1994 | Hurlburt |
| 5,477,937 A | | 12/1995 | Chagnon |
| 6,308,976 B1 | | 10/2001 | Mitchell |
| 6,402,170 B1 | | 6/2002 | Hurlburt |
| 6,675,925 B2 | | 1/2004 | Takahashi |
| 6,945,353 B2 | | 9/2005 | Bishop |
| 7,416,201 B2 | | 8/2008 | Davey |
| 2008/0048414 A1 | | 2/2008 | Van Mill et al. |

FOREIGN PATENT DOCUMENTS

| | | |
|---|---|---|
| EP | 1985474 | 10/2008 |
| GB | 443762 | 3/1936 |
| WO | 2008003859 | 1/2008 |

* cited by examiner

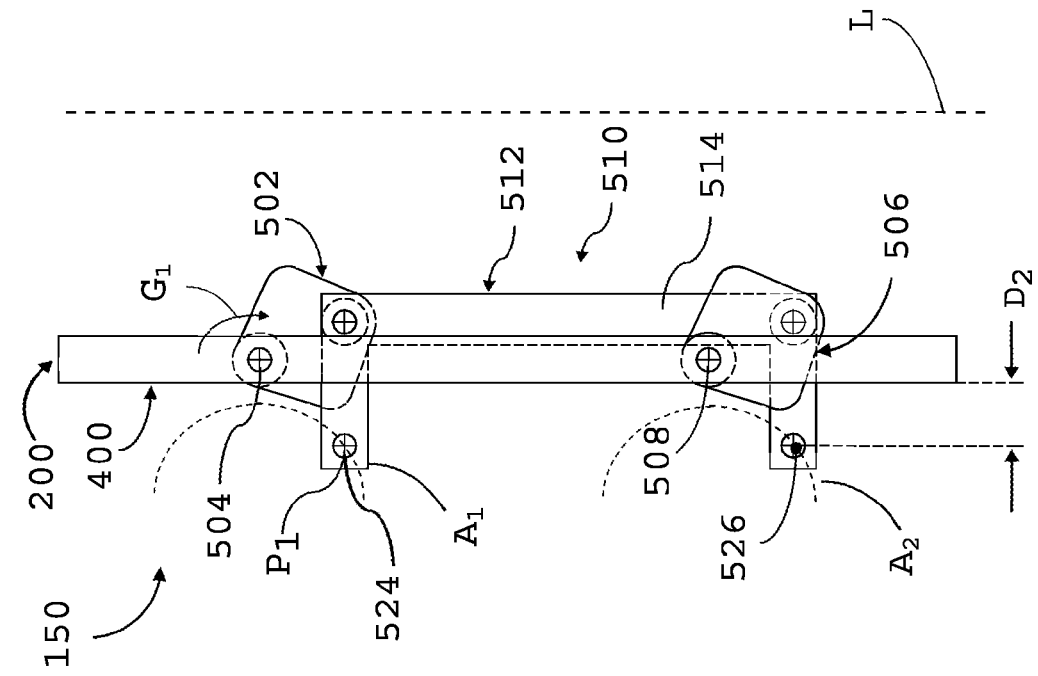

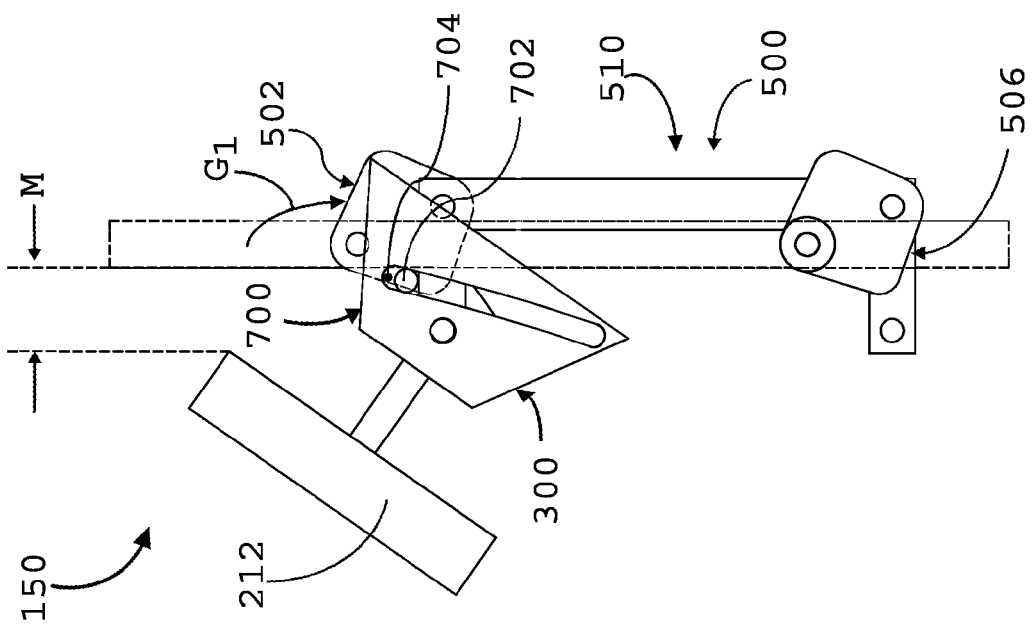
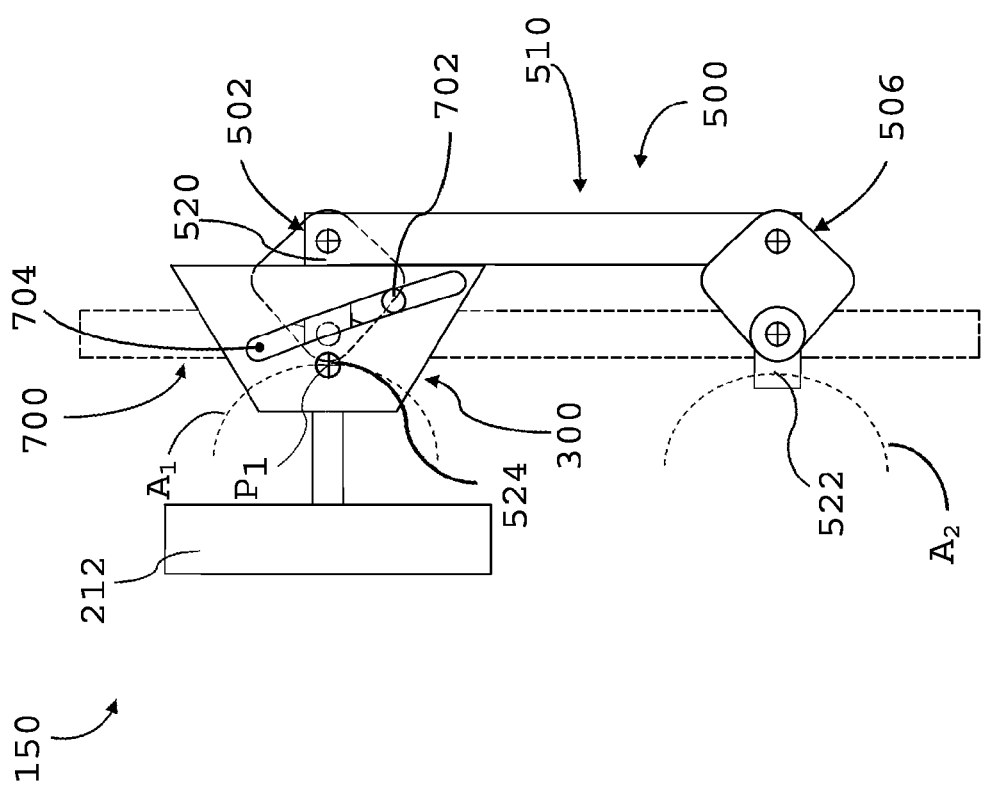

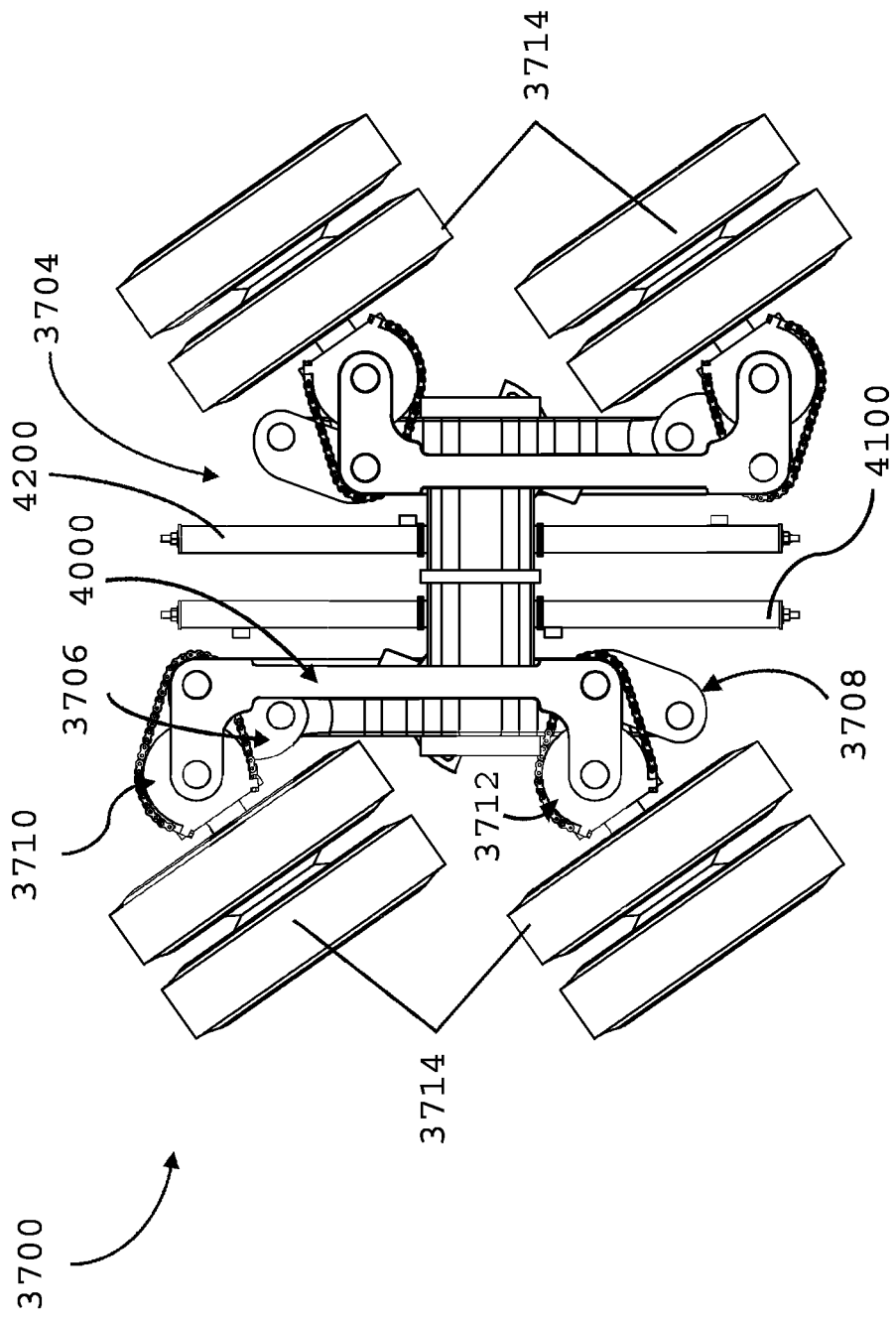

STEERING ASSEMBLY FOR A VEHICLE AND METHOD OF OPERATING THE SAME

CROSS REFERENCE TO RELATED APPLICATION

The present application is a National Phase of PCT/CA2010/000940, filed Jun. 17, 2010, entitled, "Steering Assembly For A Vehicle And Method Of Operating The Same", and which claims priority from U.S. Provisional Patent Application Ser. No. 61/187,927 filed Jun. 17, 2009, the specification of which is herein incorporated by reference.

TECHNICAL FIELD

The invention relates to steering assemblies. More precisely, the invention pertains to a steering assembly for orienting wheels of a vehicle and to a method of operating the same.

BACKGROUND

Trailers are commonly used for the transportation of goods. A trailer is generally attached to and pulled by a powered vehicle such as a car or, for a larger trailer, a tractor truck.

Typically, the mounting of wheels on a trailer frame can be accomplished by fixing a wheel at each end of a rotating axle which is then mounted under the frame of the trailer, or by mounting each wheel on separate fixed spindles on each side of the vehicle, the wheel rotating around the fixed axle.

In both cases, the wheels are always oriented parallel to the frame. This configuration is adapted to the trailer traveling in a straight line, but is problematic when the trailer is negotiating a curve. In that instance, the wheels become unaligned with the trajectory of the trailer during the turn, resulting in wheels of the trailer slipping on the road.

It is therefore desirable to be able to orient the wheels to keep the wheels aligned (i.e. tangential) with the trajectory of the trailer. Moreover, in a turn, the wheels on each side of a vehicle do not follow the same trajectory. For instance, when negotiating a left turn, the wheels on the right side of the trailer follow a curved trajectory having a radius of curvature greater than the wheels on the left side of the trailer. Therefore, the wheels on either side of the trailer will slip during the turn, causing premature wear to the tires mounted on the wheels and possibly leading to serious accidents.

In hopes of overcoming such drawbacks, some apparatuses for orienting wheels on a trailer have been proposed. In one such apparatus, the wheels are mounted on an axle and are linked using a rack-and-pinion system, which is widely used in modern cars and therefore well-known in the art. Unfortunately, this system does not allow the wheels on the left and right side of the trailer to be turned at different angles and therefore does not solve the wheel slippage problem.

Further, the laws of most jurisdictions define a maximum distance between the wheels on the left side and on the right side of the vehicle. The wheels are therefore required to be positioned relatively close to the frame of the trailer. This configuration thus prevents the wheels from turning to great angles without contacting the trailer frame.

Another apparatus consists of a dolly or bogie system being pivotally mounted under the trailer. A dolly comprises a chassis mounted on a set of wheels, generally linked together by a rigid axle. While the wheels remain parallel to the dolly at all time, the whole dolly can pivot in relation to the trailer when the trailer negotiates a turn. Once again, because this system lacks the ability to orient wheels on the left side and the right side at the vehicle at different angles, the slippage issue is not resolved. Further, the installation of a dolly under the trailer raises the overall center of mass of the trailer, which then increases the risk of the trailer tipping over when turning.

Other apparatuses involving complex hydraulic circuits have been proposed, but are often too complicated, cumbersome and are prone to leaks, which would be most undesirable, especially if the trailer is traveling at great speed.

There is therefore a need for an apparatus that will overcome at least one of the above-identified drawbacks.

Features of the invention will be apparent from review of the disclosure, drawings and description of the invention below.

BRIEF SUMMARY

According to one aspect, there is provided a steering assembly for steering a vehicle. The steering assembly comprises a first frame member securely connected to a chassis of the vehicle; a first steering knuckle comprising a first spindle having a first wheel rotatably mounted thereto; a first swing mechanism operatively connecting the first steering knuckle to the first frame member for enabling displacement of the first steering knuckle along a first arced path having a first radius of curvature, the first steering knuckle being pivotally connected to the first swing mechanism for enabling the first wheel to be oriented in a first desired orientation relative to the vehicle, the first arced path being concave relative to a central longitudinal axis of the vehicle and spaced from the first frame member, away from the central longitudinal axis of the vehicle, by a distance sufficient to prevent the first wheel from contacting the first frame member when the first steering knuckle is pivoted; a first guiding mechanism operatively connecting the first steering knuckle and the first swing mechanism for pivoting the first steering knuckle when the first steering knuckle is displaced along the first arced path in order to maintain the first wheel oriented tangentially relative to the first arced path; and an actuator operatively connected to the first swing mechanism for displacing the first steering knuckle along the first arced path, and thereby pivoting the first steering knuckle, until the first wheel is oriented in the desired orientation to thereby steer the vehicle in a desired direction.

In one embodiment, the steering assembly further comprises a second steering knuckle comprising a second spindle having a second wheel rotatably mounted thereto, the first swing mechanism further operatively connecting the second steering knuckle to the first frame member for enabling displacement of the second steering knuckle along a second arced path having a second radius of curvature similar to the first radius of curvature, the second steering knuckle being pivotally connected to the first swing mechanism for enabling the second wheel to be oriented in a second desired orientation relative to the vehicle, the second arced path being concave relative to the central longitudinal axis of the vehicle and spaced from the first frame member, away from the central longitudinal axis of the vehicle, by a distance sufficient to prevent the second wheel from contacting the first frame member when the second steering knuckle is pivoted; and a second guiding mechanism operatively connecting the second steering knuckle and the first swing mechanism for pivoting the second steering knuckle when the second steering knuckle is displaced along the second arced path in order to maintain the second wheel oriented tangentially relative to the second arced path.

In a further embodiment, the first swing mechanism further comprises first and second link members pivotally connected to the first frame member and extending towards the central longitudinal axis of the vehicle; and a mounting member pivotally connected to the first and second link members in order to enable arcuate movement of the mounting member while maintaining the mounting parallel to the frame member, the first and second steering knuckles being pivotally connected to the mounting member.

In yet a further embodiment, the mounting member is C-shaped and comprises first and second mounting portions extending away from the central longitudinal axis of the vehicle, the first steering knuckle being pivotally connected to the first mounting portion and the second steering knuckle being pivotally connected to the second mounting portion.

In another embodiment, the first guiding mechanism comprises a first guiding element associated with the first steering knuckle and a second guiding element associated with the first link member, the first and second guiding elements being operatively engaged together.

In a further embodiment, the second guiding mechanism comprises a third guiding element associated with the second steering knuckle and a fourth guiding element associated with the second link member, the third and fourth guiding elements being operatively engaged together.

In yet a further embodiment, the second guiding element is different from the fourth guiding element for enabling the first wheel to be oriented tangentially to a trajectory of the first wheel and the second wheel to be oriented tangentially to a trajectory of the second wheel, the trajectory of the first wheel being different from the trajectory of the second wheel.

In another embodiment, the first guiding element comprises a groove defined in the first steering knuckle and the second guiding element comprises a pin projecting from the first link member, the pin being adapted for slidingly engaging the groove such that pivoting of the first link member moves the pin along the groove, thereby urging pivoting of the first steering knuckle.

In yet another embodiment, the first guiding element comprises a first chain secured to the first steering knuckle and the second guiding element comprises a first sprocket securely connected to the first link member, the first chain being secured to the first sprocket such that pivoting of the first link member, and thereby of the first sprocket, urges pivoting of the first steering knuckle.

In a further embodiment, the third guiding element comprises a second chain secured to the second steering knuckle and the fourth guiding element comprises a second sprocket securely connected to the second link member, the second chain being secured to the second sprocket such that pivoting of the second link member, and thereby of the second sprocket, urges pivoting of the second steering knuckle.

In yet a further embodiment, the first sprocket has a diameter greater than the second sprocket for enabling the first wheel to be oriented in a first orientation while the second wheel is oriented in a second orientation different from the first orientation.

In another embodiment, the steering assembly comprises a second frame member securely connected to the chassis of the vehicle; a third steering knuckle comprising a third spindle having a third wheel rotatably mounted thereto; a second swing mechanism operatively connecting the third steering knuckle to the second frame member for enabling displacement of the third steering knuckle along a third arced path having a third radius of curvature similar to the first and second radii of curvature, the second steering knuckle being pivotally connected to the second swing mechanism for enabling the third wheel to be oriented in a third desired orientation relative to the vehicle, the third arced path being concave relative to the central longitudinal axis of the vehicle and spaced from the second frame member, away from the central longitudinal axis of the vehicle, by a distance sufficient to prevent the third wheel from contacting the second frame member when the third steering knuckle is pivoted; a third guiding mechanism operatively connecting the third steering knuckle and the second swing mechanism for pivoting the third steering knuckle when the third steering knuckle is displaced along the third arced path in order to maintain the third wheel oriented tangentially relative to the third arced path; and the actuator is operatively connected to the second swing mechanism for displacing the third steering knuckle along the third arced path, and thereby pivoting the third steering knuckle, until the third wheel is oriented in the desired orientation to thereby steer the vehicle in the desired direction.

In a further embodiment, the steering assembly further comprises a fourth steering knuckle including a fourth spindle having a fourth wheel rotatably mounted thereto, the second swing mechanism further operatively connecting the fourth steering knuckle to the second frame member for enabling displacement of the fourth steering knuckle along a fourth arced path having a fourth radius of curvature similar to the first, second and third radii of curvature, the fourth steering knuckle being pivotally connected to the second swing mechanism for enabling the fourth wheel to be oriented in a fourth desired orientation relative to the vehicle, the fourth arced path being concave relative to the central longitudinal axis of the vehicle and spaced from the second frame member, away from the central longitudinal axis of the vehicle, by a distance sufficient to prevent the fourth wheel from contacting the second frame member when the fourth steering knuckle is pivoted; and a fourth guiding mechanism operatively connecting the fourth steering knuckle and the second swing mechanism for pivoting the fourth steering knuckle when the fourth steering knuckle is displaced along the fourth arced path in order to maintain the fourth wheel oriented tangentially relative to the fourth arced path.

In yet a further embodiment, the first, second, third and fourth guiding mechanism are respectively adapted to pivot a corresponding steering knuckle at a predetermined pivoting rate such that, during turning of the vehicle travelling on a ground surface, each of the first, second, third and fourth wheel is oriented tangentially relative to a respective trajectory of the corresponding wheel, thereby preventing slippage of the first, second, third and fourth wheels on the ground surface.

In another embodiment, the first frame member is pivotally connected to the second frame member for enabling the first frame member to pivot relative to the second frame member about a frame pivot axis extending perpendicularly to the central longitudinal axis of the vehicle and parallel to a ground surface.

In yet another embodiment, the actuator comprises a first cylinder adapted to actuate the first swing mechanism and a second cylinder adapted to actuate the second swing mechanism.

In a further embodiment, the first and second cylinders are hydraulic cylinders.

In another embodiment, each one of the first and second cylinders comprises a sleeve secured to a corresponding frame member; a barrel slidably mounted in the sleeve and operatively connected to a corresponding mounting member via movement transmission means; and a piston slidably mounted in the barrel, the piston being secured to the sleeve such that activation of the corresponding cylinder moves the barrel linearly along the sleeve, thereby moving the corresponding mounting member along the corresponding arced path.

In yet a further embodiment, the first and second cylinders are reciprocally interconnected such that activation of one of the first and second cylinders in order to move the corresponding barrel linearly in a first direction causes activation of the other of the first and second cylinders and moves the corresponding barrel in a second direction opposite the first direction.

In another embodiment, the movement transmission means comprise a half wheel pivotally connected to the corresponding frame member and to the corresponding mounting member; and a plurality of cables connecting the barrel to the half wheel for urging pivoting of the half wheel when the barrel is moved linearly along the sleeve to thereby move the corresponding mounting member along the corresponding arced path.

In one embodiment the steering assembly further comprises controlling means operatively connected to the actuator for controlling actuation of the first swing mechanism.

In another embodiment, the steering assembly further comprises controlling means operatively connected to the actuator for controlling actuation of the first and second swing mechanisms.

In another embodiment, the vehicle comprises a trailer pivotally coupled to a tractor truck via a fifth wheel coupling for enabling pivoting of the trailer relative to the tractor truck about a vertical trailer pivot axis.

In a further embodiment, the controlling means are operatively coupled to the actuator and the fifth wheel coupling for detecting a turning angle of the tractor truck travelling on a ground surface and for controlling actuation of the first and second swing mechanisms in order to orient the first, second, third and fourth wheels tangentially to their respective trajectory, thereby preventing slippage of the first, second, third and fourth wheels on the ground surface.

In another embodiment, the controlling means are settable to a manual mode for enabling a user to manually orient the first, second, third and fourth wheels in their respective desired orientation.

In yet another embodiment, the first, second, third and fourth wheels each comprises a dual wheel assembly having a pair of single wheels rotatably mounted to a corresponding steering knuckle, parallel to one another.

According to another aspect, there is further provided a vehicle comprising the steering assembly.

According to yet another aspect, there is further provided a method of operating the steering assembly. The method comprises providing the steering assembly; activating the actuator to thereby move the first, second, third and fourth steering knuckle along their respective arced path until the first, second, third and fourth wheels are oriented in the desired orientation.

In one embodiment, the vehicle comprises a trailer pivotally coupled to a tractor truck via a fifth wheel coupling for enabling pivoting of the trailer relative to the tractor truck about a vertical trailer pivot axis, and the method further comprises detecting a turning angle of the tractor truck relative to the trailer, the tractor truck travelling on a ground surface; controlling actuation of the first and second swing mechanisms in order to orient the first, second, third and fourth wheels tangentially to their respective trajectory, thereby preventing slippage of the first, second, third and fourth wheels on the ground surface.

In another embodiment, activating the actuator comprises manually activating the actuator.

BRIEF DESCRIPTION OF THE DRAWINGS

In order that the invention may be readily understood, embodiments of the invention are illustrated by way of example in the accompanying drawings.

FIG. 5 is a schematic representation showing a swing mechanism of a steering assembly for a vehicle, in accordance with one embodiment, with the swing mechanism in a first position.

FIG. 6 is a schematic representation showing the swing mechanism shown in FIG. 5, with the swing mechanism in a second position.

FIG. 7 is a schematic representation showing a swing mechanism of a steering assembly and a guiding mechanism of the steering assembly, in accordance with one embodiment, with the swing mechanism in a first position.

FIG. 8 is a schematic representation showing the swing mechanism and the guiding mechanism shown in FIG. 7, with the swing mechanism in a second position.

FIG. 42 is a drawing showing a top plan view of the steering assembly shown in FIG. 37, in a second position.

DETAILED DESCRIPTION

In the following description of the embodiments, references to the accompanying drawings are by way of illustration of an example by which the invention may be practiced. It will be understood that other embodiments may be made without departing from the scope of the invention disclosed.

There is provided a steering assembly for use with a vehicle. Providing a vehicle with a steering assembly that reduces slippage of its wheels, and therefore scrubbing of tires mounted to the wheels on the pavement, is of great advantage, as it enhances lifespan of tires mounted to the wheels.

Moreover, the steering assembly further enables wheels of the vehicle to be oriented at great angles with respect to the frame of the vehicle. This is of great advantage when the vehicle is maneuvering in a location where little space is available.

Figure 1:
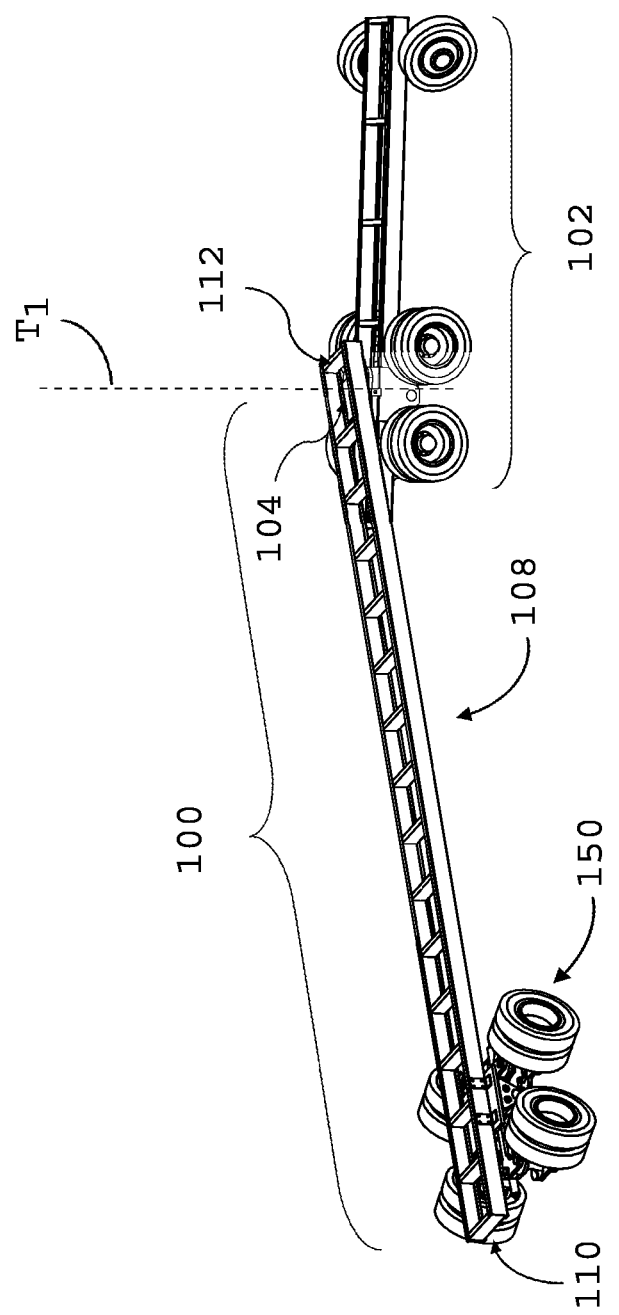
FIG. 1 is a drawing showing a top perspective view of a trailer frame attached to a trailer tractor frame and a steering assembly for a vehicle mounted to the trailer frame, in accordance with one embodiment.

Now turning to FIG. 1, there is shown a trailer chassis 100 of a trailer, not shown, coupled to a tractor truck chassis 102 of a tractor truck, not shown, using coupling means 104. The tractor truck, not shown, is powered and is used to move the trailer, not shown, to a desired destination. The coupling means 104 are provided to enable the trailer to pivot around a vertical trailer pivot axis $T_1$. In one embodiment, the coupling means 104 comprise a fifth wheel coupling having a fifth wheel mounted to the tractor trailer chassis, the fifth wheel being adapted to pivotally receive therein a corresponding kingpin of the trailer chassis, as will be further described.

Still referring to FIG. 1, the trailer chassis 100 comprises a steering assembly 150 for steering the trailer. The steering assembly 150 is mounted under a trailer deck 108 adapted to receive transportable goods thereon. In the embodiment shown in FIG. 1, the steering assembly 150 is mounted at a back end 110 of the trailer chassis 100 while the coupling means 104 are mounted at an opposed front end 112 of the trailer chassis 100. It will be appreciated by the skilled addressee that this configuration enables the trailer, not shown, to be relatively stable when transportable goods are received on the trailer deck 108.

In an alternative embodiment, the trailer chassis 100 further comprises a second steering assembly mounted under the trailer deck 108 between the front end and the back end thereof. It will further be appreciated that various configurations may be used for the positioning of the steering assembly 150 with reference to the trailer chassis 100 according to stability considerations and/or local regulations.

Now turning to FIGS. 2, 3, 4 and 9, there is shown the steering assembly 150 for steering wheels of a vehicle in accordance with one embodiment.

In the illustrated embodiment, the steering assembly 150 comprises a frame 200 having a plurality of orientable wheels 250 operatively connected thereto, as it will become apparent below.

In one embodiment, the steering assembly 150 comprises a front left steering knuckle 300, a back left steering knuckle 302, a front right steering knuckle 304 and a back right steering knuckle 306. Each of the steering knuckles 300, 302, 304, 306 has a wheel 250 rotatably mounted thereto.

The skilled addressee will appreciate that the term "wheel" is herein used to refer to any number of wheels mounted on a same axle. More specifically, in the illustrated embodiment, each wheel 250 comprises a dual wheel assembly having a pair of wheels mounted to their respective steering knuckle, parallel to one another. This configuration provides the trailer with enhanced stability and with an ability to carry greater loads. In an alternative embodiment, each wheel 250 comprises a single wheel.

Figure 2:
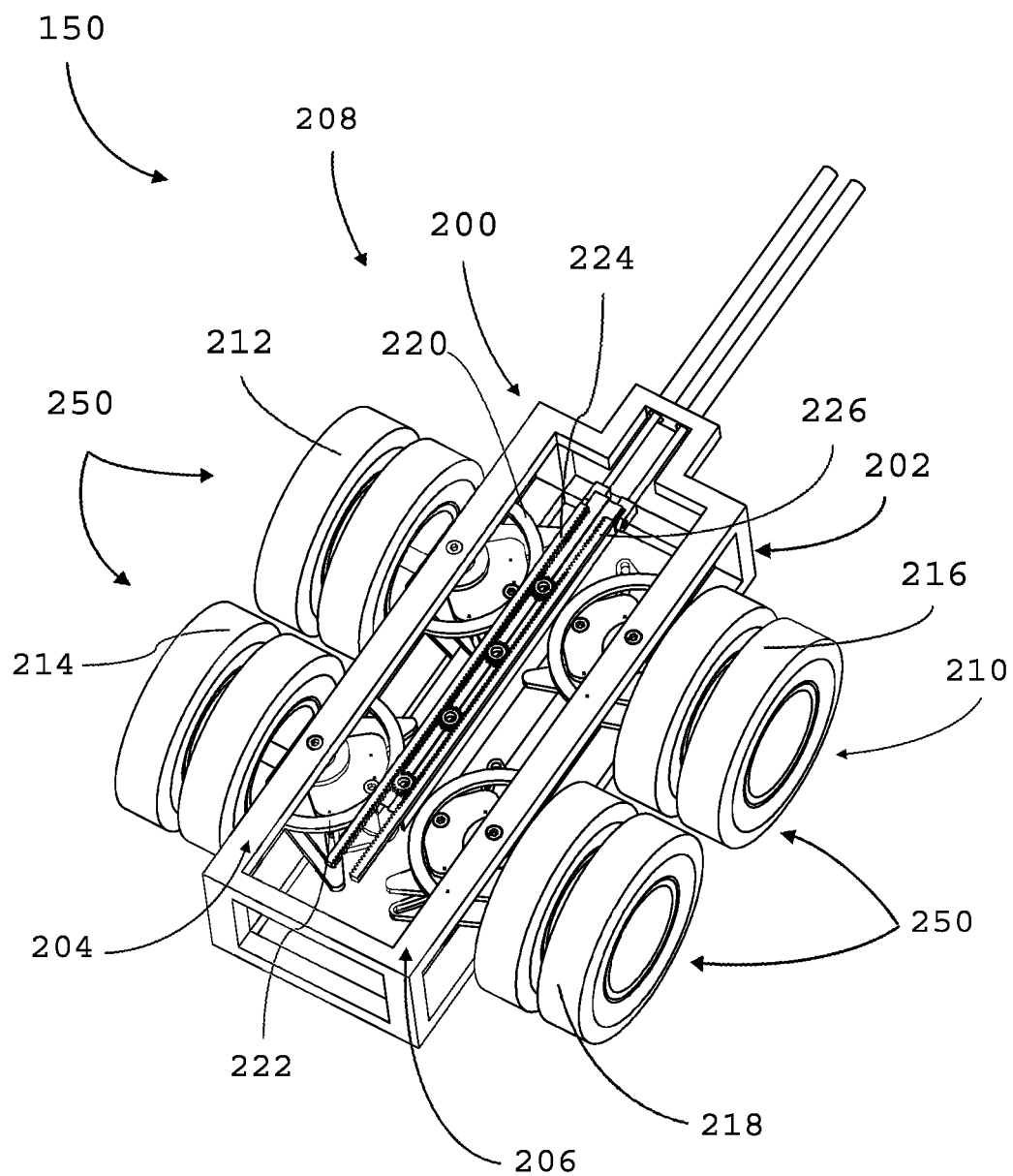
FIG. 2 is a drawing showing a perspective view of the steering assembly shown in FIG. 1.

Still referring to FIGS. 2, 3, 4 and 9, the frame 200 is adapted to be mounted underneath the trailer deck 108, not shown in FIG. 2, and provides a base structure for elements of the steering assembly 150 to be mounted thereto. As such, the frame 200 further provides structural strength to the steering assembly 150.

Figure 4:
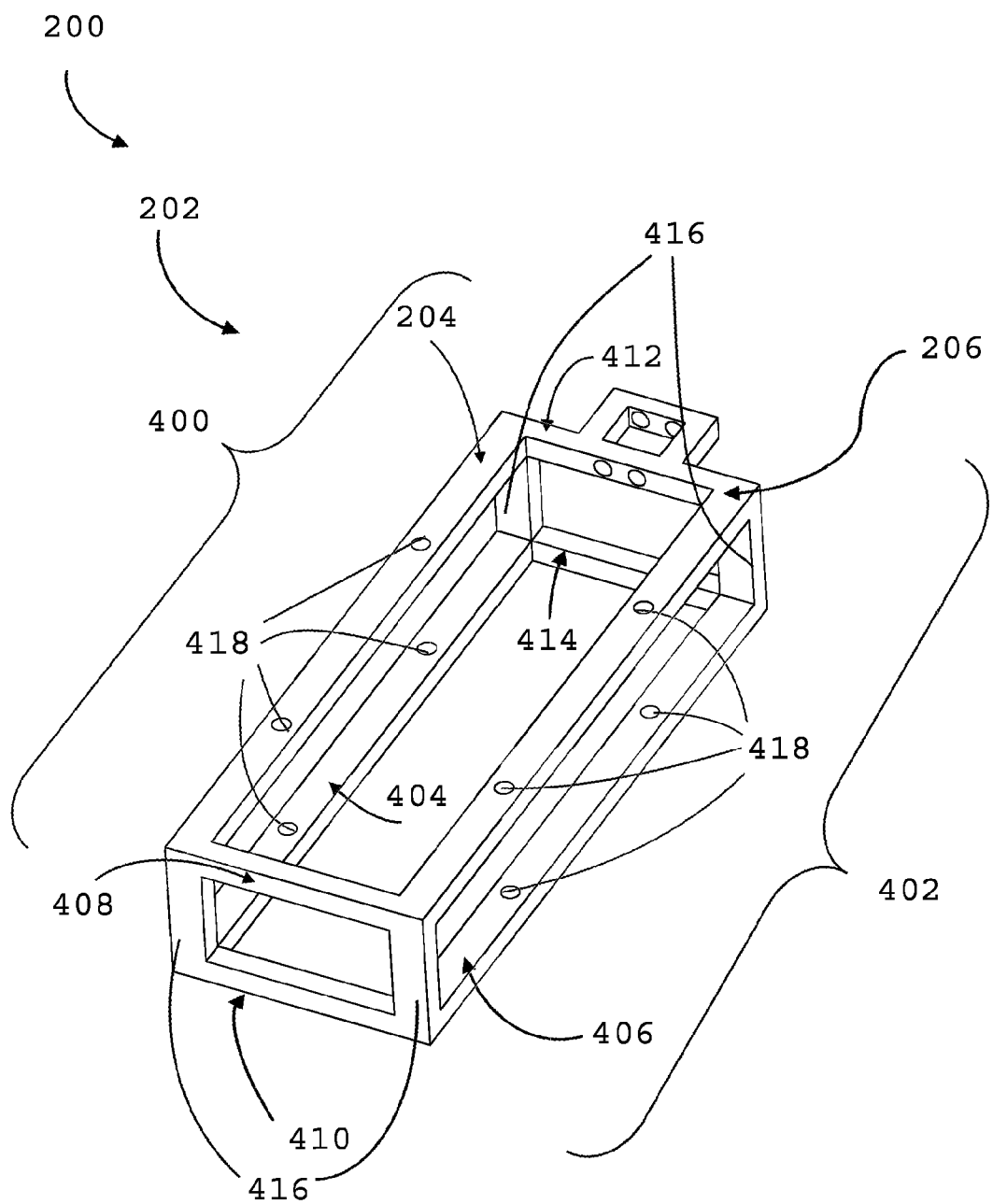
FIG. 4 is a drawing showing a perspective view of a frame for the steering assembly shown in FIG. 2.

In one embodiment, the frame 200 comprises a cage 202 having a pair of parallel top left and right longitudinal members 204, 206. As shown in FIG. 4, it will be appreciated that, in this embodiment, the top left and right longitudinal members 204, 206 each respectively defines a left and right linear frame portions, or left and right frame members 400, 402, of the frame 200, which are securely connected to the trailer deck 108.

Figure 3:
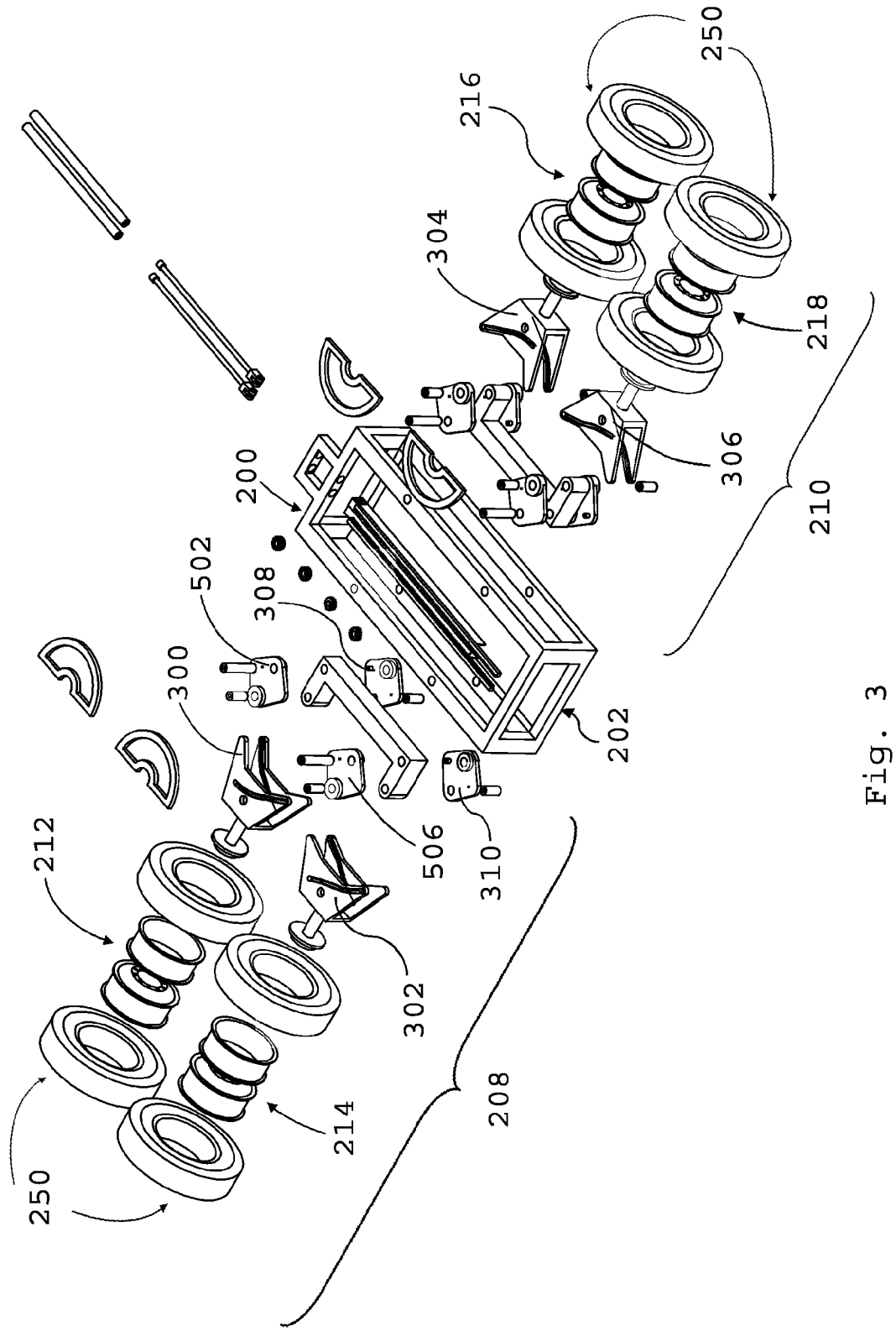
FIG. 3 is a drawing showing an exploded view of the steering assembly shown in FIG. 2.

Referring back to FIG. 2, the steering assembly 150 comprises a left steering assembly portion 208 and a right steering assembly portion 210, as best shown in FIG. 3. The left steering assembly portion 208 is adapted to orient a wheel 250 or a plurality of wheels mounted on a left side of the steering assembly 150 in a desired direction while the right steering assembly portion 210 is adapted to pivot a wheel 250 or a plurality of wheels mounted on a right side of the steering assembly 150 in the desired direction, as it will become apparent below.

In the illustrated embodiment, the left steering assembly portion 208 comprises a front left wheel 212 and a back left wheel 214. Similarly, still in this embodiment, the right steering portion comprises a front right wheel 216 and a back right wheel 218.

In one embodiment, the right steering assembly portion 210 is substantially a mirror image of the left steering assembly portion 208. Therefore, only the left steering assembly portion 208 will be described in the following description.

To better show the underlying principle of the present invention, there is shown, in FIGS. 5 to 8, a schematic representation of the left steering assembly portion 208 in accordance with one embodiment. One skilled in the art will appreciate that the schematic representation is not to scale in FIGS. 5 to 8.

For clarity purposes, of the frame 200, only the left frame member 400 is represented in FIGS. 5 to 8.

As best shown in FIGS. 5 and 6, the steering assembly 150 comprises a swing mechanism 500 which operatively connects the front left steering knuckle 300, not shown in FIGS. 5 and 6 for enabling displacement of the front left steering knuckle 300 along a first arced path $A_1$.

As shown in FIGS. 7 and 8, the front left steering knuckle 300 is pivotally connected to the swing mechanism 500 and is pivotable about a front knuckle pivot 524 defining a wheel pivot axis $P_1$ for enabling the front left wheel 212 to be oriented in a first desired orientation relative to the trailer. The swing mechanism 500 causes displacement of the wheel pivot axis $P_1$ inwardly or outwardly from the frame 200, as it will become apparent below.

The steering assembly 150 further comprises a guiding mechanism 700 operatively connecting the front left steering knuckle 300 and the swing mechanism 500 for pivoting the front left steering knuckle 300 when the front left steering knuckle 300 is displaced along the first arced path $A_1$, as it will become apparent below.

Now turning to FIGS. 5 and 6, there is shown the swing mechanism 500, in accordance with one embodiment. The skilled addressee will appreciate that the swing mechanism 500 herein described is merely provided as an example and that various designs may be used for the swing mechanism 500, as long as it enables displacement of front left steering knuckle 300 along the first arced path $A_1$.

In the illustrated embodiment, the swing mechanism 500 comprises a first link member 502 pivotally connected to the left linear frame portion 400 by a first pivot 504 and extends towards a central longitudinal axis L of the trailer. In one embodiment, a second link member 506 is similarly connected on the left frame member 400 by a second pivot 508 and also extends towards the central longitudinal axis L.

The first link member 502 and the second link member 506 are further connected together by a mounting member 510. In one embodiment, the mounting member 510 is generally C-shaped and comprises a beam 512 having a linear mounting member portion 514 extending between a front elbow 516 and a back elbow 518 of the beam 512, as best shown in FIG. 20.

Figure 20:
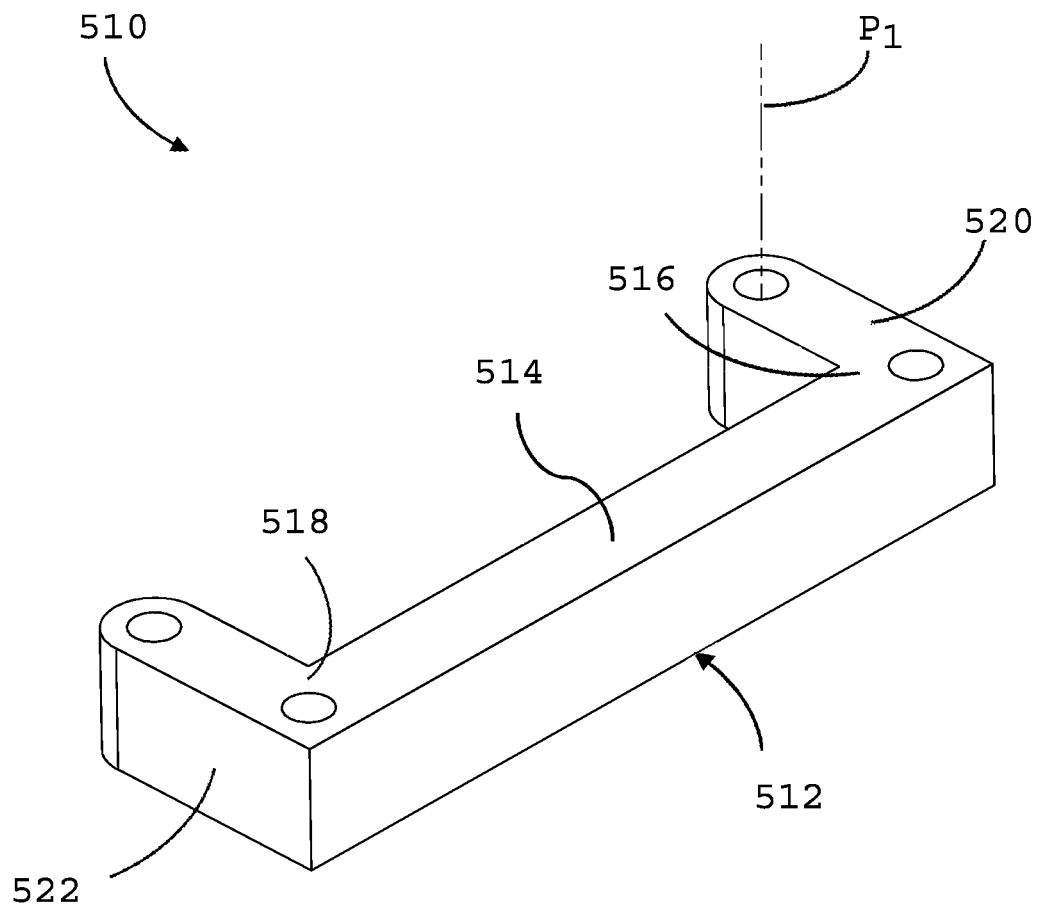
FIG. 20 is a drawing showing a perspective view of a mounting member of the steering assembly shown in FIG. 2.

In the embodiment illustrated in FIGS. 5, 6 and 20, a front knuckle mounting portion 520 extends from the front elbow 516, towards the outside of the frame 200, i.e. away from the central longitudinal axis L, and perpendicularly to the linear mounting member portion 514. Similarly, a back knuckle mounting portion 522 extends from the back elbow 518, also towards the outside of the frame 200, away from the central longitudinal axis L and perpendicularly to the linear mounting member portion 514. The front left steering knuckle 300, not shown in FIGS. 5 and 6, is pivotally mounted to the front spindle mounting portion 520 by a front knuckle pivot 524, as it will become apparent below.

It will be appreciated that the front knuckle pivot 524 defines a substantially vertical wheel pivot axis $P_1$ about which the front steering knuckle 300, not shown in FIGS. 5 and 6, pivots. Similarly, the back left steering knuckle 302, also not shown in FIGS. 5 and 6, is pivotally mounted to the back spindle mounting portion 522 by a back knuckle pivot 526.

In the illustrated embodiment, the first link member 502 is further pivotally connected to the front elbow 516 of the mounting member 510, while the second link member 506 is further pivotally connected to the back elbow 518 of the mounting member 510.

As can be appreciated from FIGS. 5 and 6, in this configuration, the linear mounting member portion 514 is forced to remain parallel to the left frame member 400 when the first and second link members 502 and 506 are pivoted. Still in this configuration, the front knuckle mounting portion 520 and the back knuckle mounting portion 522 are therefore forced to remain perpendicular to the left frame member 400.

Furthermore, this configuration enables arcuate displacement of the mounting member 510, and therefore of the front left steering knuckle 300 and of the back left steering knuckle 302 connected thereto. More specifically, the front left steering knuckle 300 is confined to the first arced path $A_1$, which has a first radius of curvature defined by the size and shape of the first and second link members 502 and 506, as one skilled in the art will appreciate. Similarly, the back left steering knuckle 302 is confined to a second arced path $A_2$, which has a second radius of curvature which is also defined by the size and shape of the first and second link members 502 and 506, and therefore is similar to the first radius of curvature.

It will further be appreciated that the first arced path $A_1$ and the second arced path $A_2$ are both concave relative to the central longitudinal axis L. More specifically, the first arced path $A_1$ and the second arced path $A_2$ each has a pair of end portions 550 and a curved middle portion 552 extending therebetween, the curved middle portion 552 being positioned closer to the central longitudinal axis L than the end portions 550. This configuration prevents interference between the front and back left wheels 212 and 214, not shown in FIGS. 5 and 6, and the left frame member 400 or the trailer, as it will become apparent below.

In a first embodiment shown in FIG. 5, the mounting member 510 is in a first position. In this configuration, the front and back spindle knuckle pivots 524 and 526 are at a first distance $D_1$ from the left frame member 400.

In a second embodiment shown in FIG. 6, the first and second link members 502 and 506 have been pivoted in a pivot direction $G_1$, thereby having moved the mounting member 510 in a second position. In this embodiment, the front and back spindle mounting portions 520 and 522 are now at a second distance $D_2$ from the left frame member 400, the second distance $D_2$ being greater than the first distance $D_1$.

The skilled addressee will understand from this example that a pivoting of the first and second link members 502 and 506 will cause the front and back knuckle pivots 524 and 526, and therefore the front and back left steering knuckles 300 and 302, not shown in FIGS. 5 and 6, to move inwardly in the frame or outwardly from the frame 200 along, respectively, the first and second arced path $A_1$ and $A_2$.

Alternatively, the mounting member 510 may comprise an E-shaped beam having three spindle mounting portions at each of which may be mounted a wheel or a set of wheels. It will be appreciated that such an arrangement would form a "triple-axle configuration". In yet another embodiment, the mounting member 510 may comprise a beam with a different shape having a greater number of spindle mounting portions, thereby allowing a greater number of wheels or sets of wheels to be mounted thereto and to be oriented using the steering assembly 150.

Now turning to FIGS. 7 and 8, there is provided a guiding mechanism 700, in accordance with one embodiment. The skilled addressee will appreciate that the guiding mechanism 700 herein described is merely provided as an example and various other designs may be used for the first steering mechanism, as long as it pivots a steering knuckle when the steering knuckle is displaced along its arced path in order to maintain the wheel mounted to the steering knuckle oriented tangentially relative to the arced path.

In the embodiment shown in FIGS. 7 and 8, the front left steering knuckle 300 is pivotally mounted to the front spindle mounting portion 520 by the front knuckle pivot 524. Moreover, still in this embodiment, the front left wheel 212 is rotatably mounted to the front left steering knuckle 300.

In one embodiment, the guiding mechanism 700 comprises a first guiding element associated with the front left steering knuckle 300 and a second guiding element associated with the first link member 502. The first and second guiding elements are operatively engaged together and are cooperable for guiding the front left steering knuckle 300, and therefore the front left wheel 212, towards the desired direction when the wheel pivot axis $P_1$ is displaced by the swing mechanism 500, as it will become apparent below.

In one embodiment, the first guiding element comprises a groove 704 defined in the front left spindle knuckle 300 and the second guiding element comprises a pin 702 projecting from the first link member 502. The groove 704 is adapted to slindingly receive the pin 702 therein.

The coupling between the swing mechanism 500 and the guiding mechanism 700 will now be detailed in accordance with one embodiment.

In this embodiment, when the first link member 502 pivots, the pin 702 cooperates with the groove 704 to guide the front left steering knuckle 300 towards the desired direction. More specifically, the pin 702 is constrained to the groove 704 and moves therealong. When the first link member 502 is pivoted, the front left steering knuckle 300 is thereby urged to pivot about the front knuckle pivot 524, as shown in FIG. 8.

While the front left steering knuckle 300 pivots in the pivot direction $G_1$, it is also displaced outwardly from the frame 200 by the swing mechanism 500, as explained hereabove. Furthermore, the first arced path A1, which the front left steering knuckle 300 follows, is spaced from the left frame member 400, away from the central longitudinal axis L, by a distance sufficient to prevent the first wheel from contacting the left frame member 400 when the front left steering knuckle 300 is pivoted.

Therefore, as the skilled addressee will appreciate, a given minimum distance M between the front wheel 212 and the left frame member 400 is respected. This allows the front wheel 212 to be pivoted at great angles without coming in contact with the frame 200, which is of great advantage.

One skilled in the art will appreciate that this is particularly advantageous for an embodiment of a steering assembly 150 comprising a dual wheel assembly, in which wheels are usually positioned close to the frame 200 and great angles of pivot of the wheels are usually difficult to attain.

Moreover, the skilled addressee will appreciate that a pivoting rate and a direction of the pivoting of the front left steering knuckle 300 about the wheel pivot axis $P_1$ is defined by the shape of the groove 704.

In one embodiment, the groove 704 on each knuckle is shaped and sized to allow the front left wheel 212 and the back left wheel 214 to be pivoted at a different angle than the front right wheel 216 and the back right wheel 218 during a turn. For instance, during a right turn of the trailer 100, the front right wheel 216 and the back right wheel 218 may be pivoted at a greater angle than the front left wheel 212 and the back left wheel 214 such that the front right wheel 216 may remain tangential to its trajectory and the back right wheel 218 may also remain tangential to its trajectory, which is different from the trajectory of the front right wheel 216, as one skilled in the art will appreciate.

Figure 12:
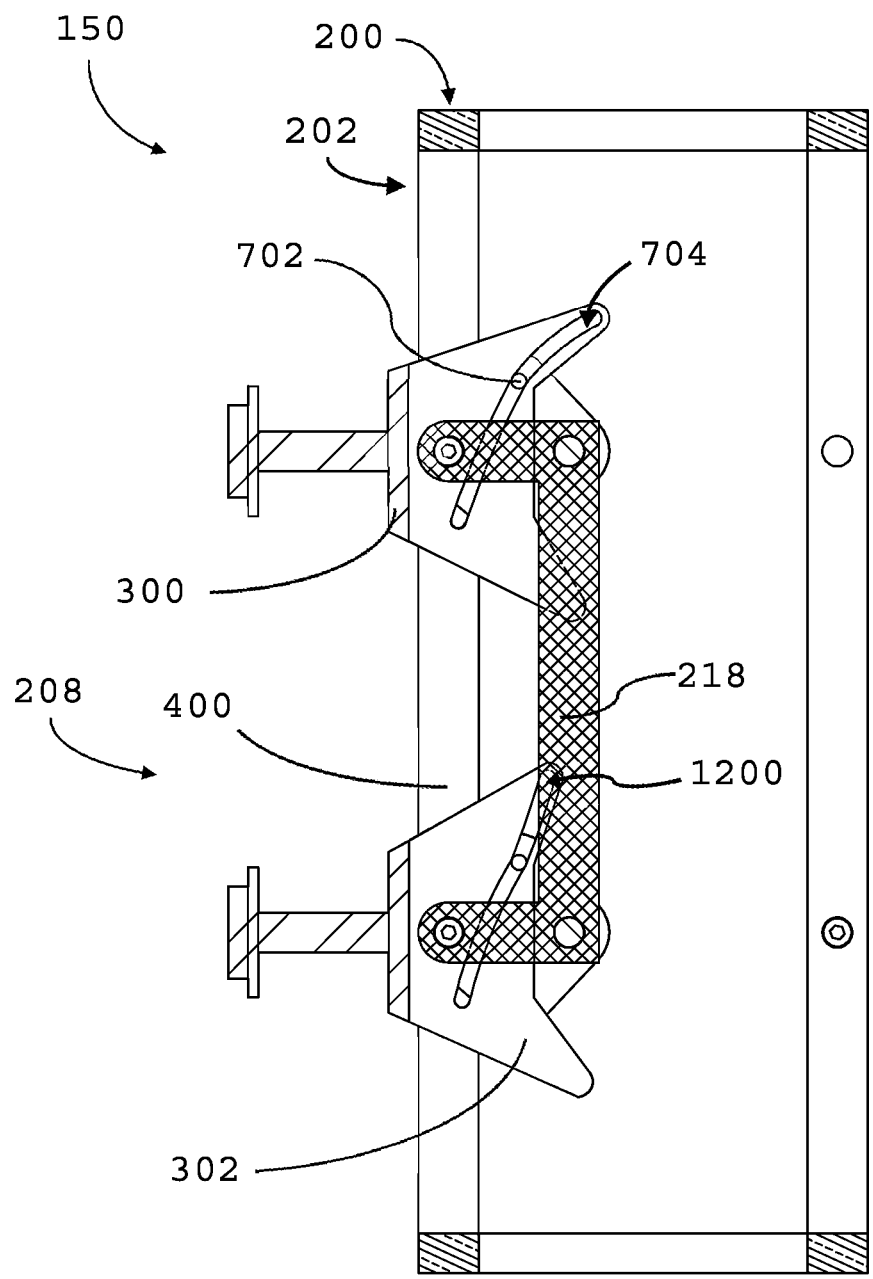
FIG. 12 is a drawing showing a top plan view, cross-sectioned along line XII-XII of FIG. 11, of the left steering assembly portion shown in FIG. 10.
Figure 13:
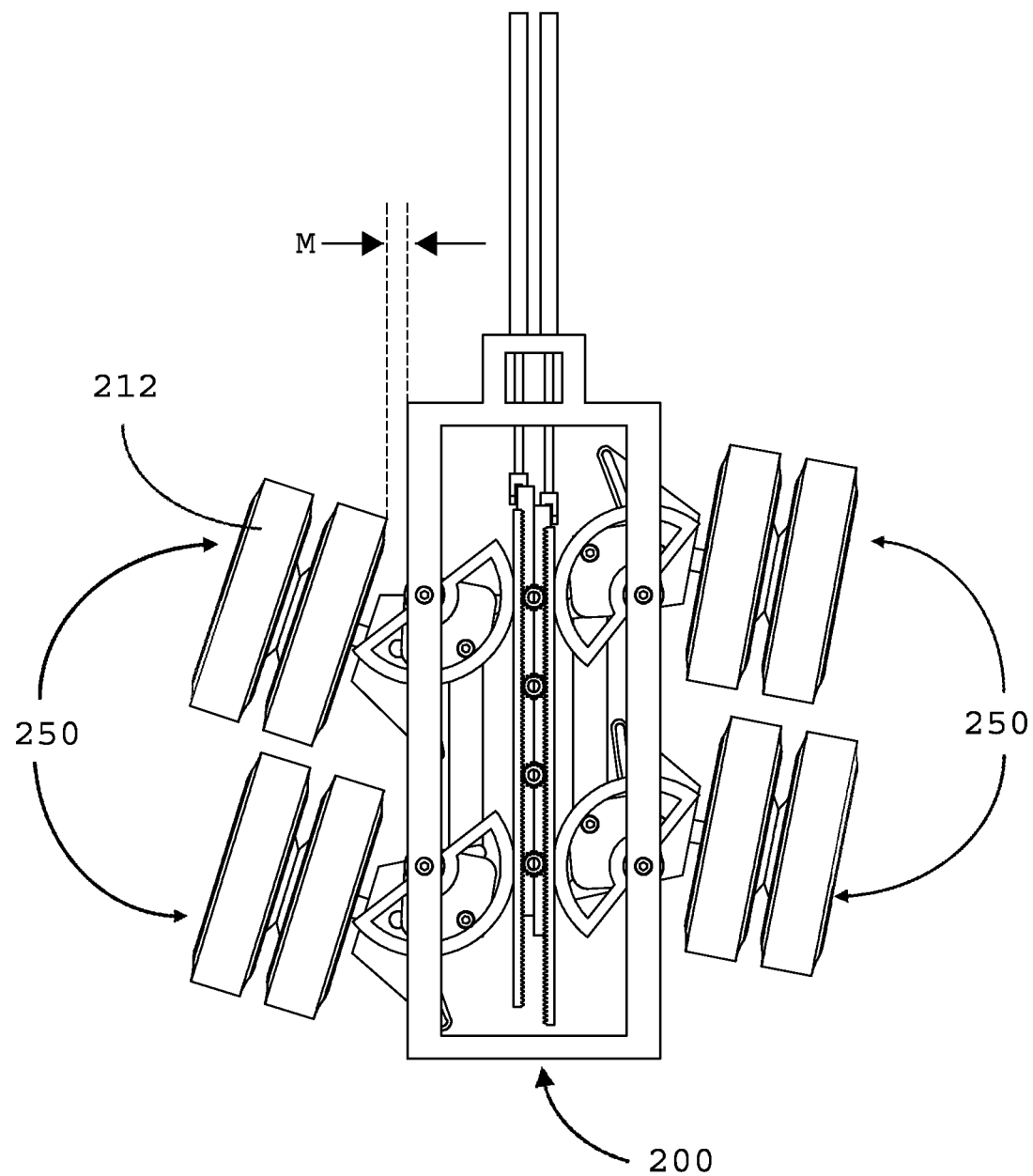
FIG. 13 is a drawing showing a top plan view of the steering assembly shown in FIG. 2, in a second position.

Moreover, referring to the embodiment shown in FIG. 12, the groove 704 on the front left knuckle 300 is shaped and sized differently than a groove 1200 defined on the back left knuckle 302 to enable the front left wheel 212, not shown in FIG. 12, and the back left wheel 214, not shown in FIG. 12, to remain tangential to their respective trajectory during a turn, the trajectory of the left wheel 212 and the trajectory of the right wheel 214 having a common center of turn. In one embodiment, the same configuration is present on the front right knuckle 304, not shown in FIG. 12, and the back right knuckle 306, not shown in FIG. 12.

These configurations advantageously reduce scrubbing and/or slippage of the wheels 212, 214, 216, 218 on a ground surface on which the trailer is traveling during a turn of the trailer 100. This is particularly advantageous when the trailer does not have any forward speed and that the front left wheel 212 is oriented manually by an operator of the trailer, for instance to steer the trailer in or out of a location where little maneuvering space is available, as it will become apparent below.

Elements of the steering assembly 150 will now be further detailed in accordance with a best mode contemplated by the inventor.

Now referring to FIGS. 2 and 4, the cage 202 further comprises a pair of parallel bottom longitudinal members 404 and 406 positioned opposed to the top longitudinal members 204 and 206 and two pairs of back and front parallel horizontal cross-members 408, 410 and 412, 414.

The cage 202 further comprises two pairs of front and back vertical members 416 for connecting each of the parallel top longitudinal members 204 and 206 to the corresponding parallel bottom longitudinal members 404 and 406. It will be appreciated that in the embodiment shown in FIG. 2, the top and bottom longitudinal members 204, 206, 404, 406, cross-members 408, 410 412, 414 and vertical members 416 define a generally rectangular shape.

Now referring to FIGS. 3 and 4, a pair of spaced-apart pivot pin receiving holes 418 extends vertically through each one of the parallel top longitudinal members 204 and 206 and of the parallel bottom longitudinal members 404 and 406. The pivot pin receiving holes 418 each are each adapted to receive therein a pivot pin, not shown, having a link member pivotally mounted thereto.

Referring specifically to FIG. 3, in the illustrated embodiment, the left steering assembly portion 208 further comprises third and fourth pivoting plates 308 and 310 respectively opposed to the first and second link members 502 and 506, the third and fourth pivoting plates 308 and 310 being pivotally mounted to the bottom left longitudinal member 404, as it will become apparent below.

Now referring to FIGS. 18 and 19, the first link member 502 will be described in accordance with one embodiment. The skilled addressee will appreciate that all link members are similar and thus only the description of the first link member 502 is needed.

Figure 14:
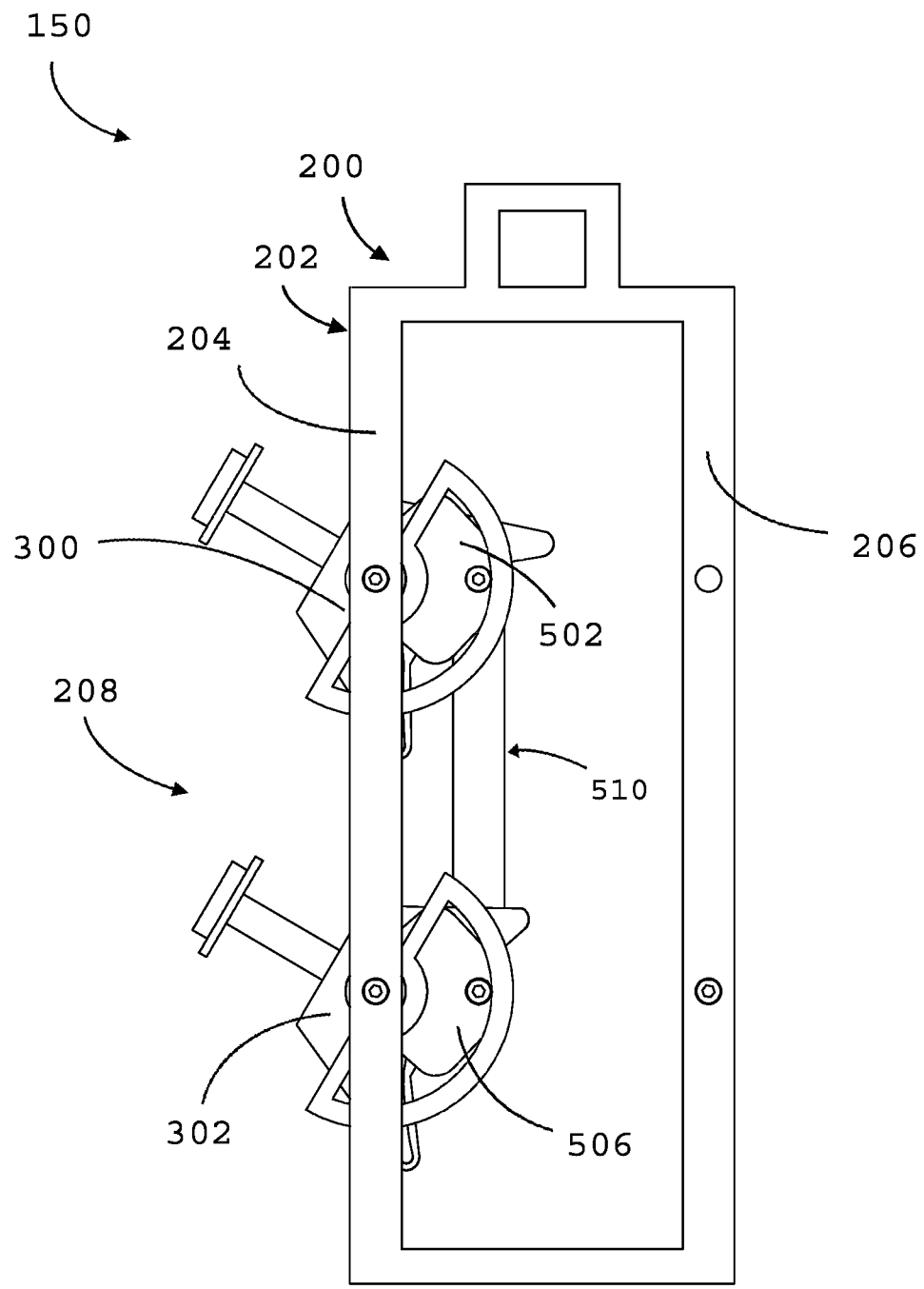
FIG. 14 is a drawing showing a top plan view of a left steering assembly portion of the steering assembly shown in FIG. 13, with the wheels removed.
Figure 15:
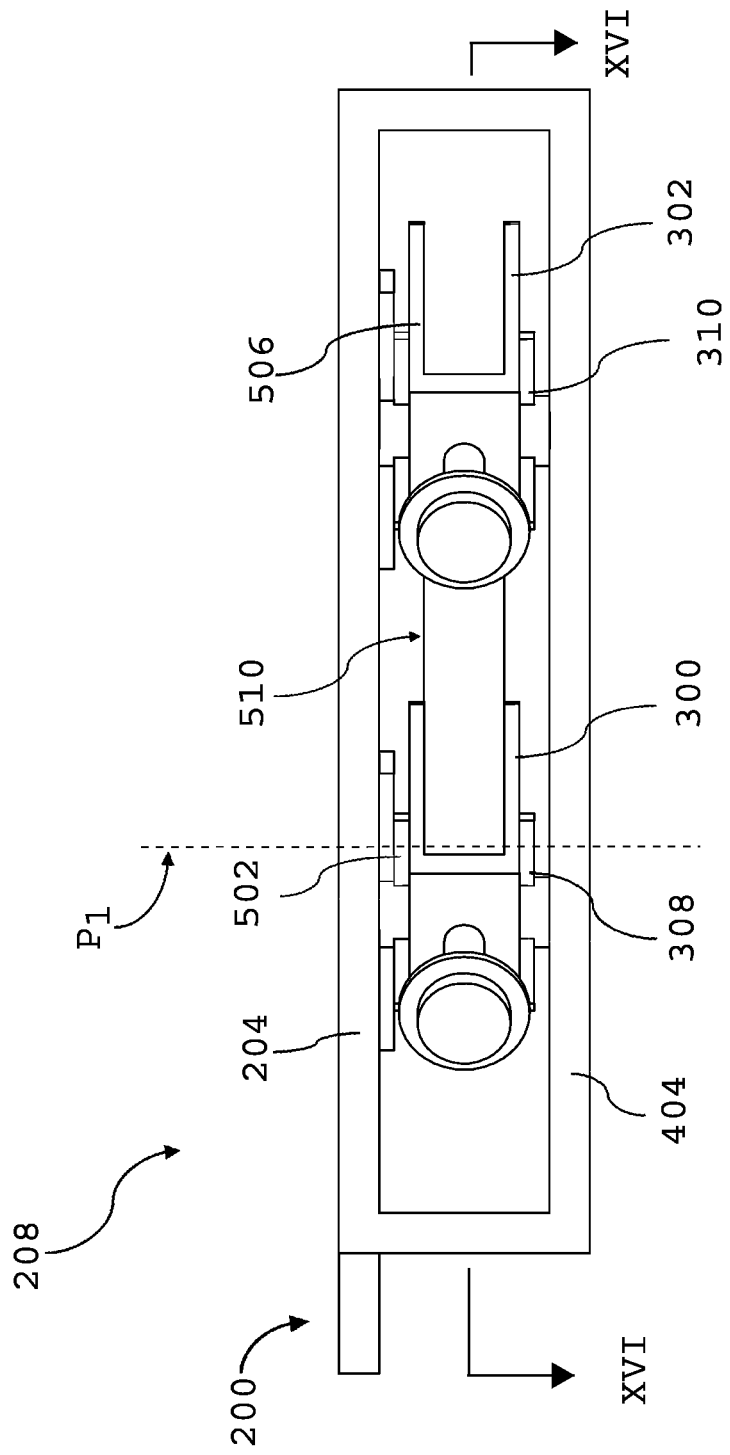
FIG. 15 is a drawing showing a left elevation view of the left steering assembly portion shown in FIG. 14.
Figure 16:
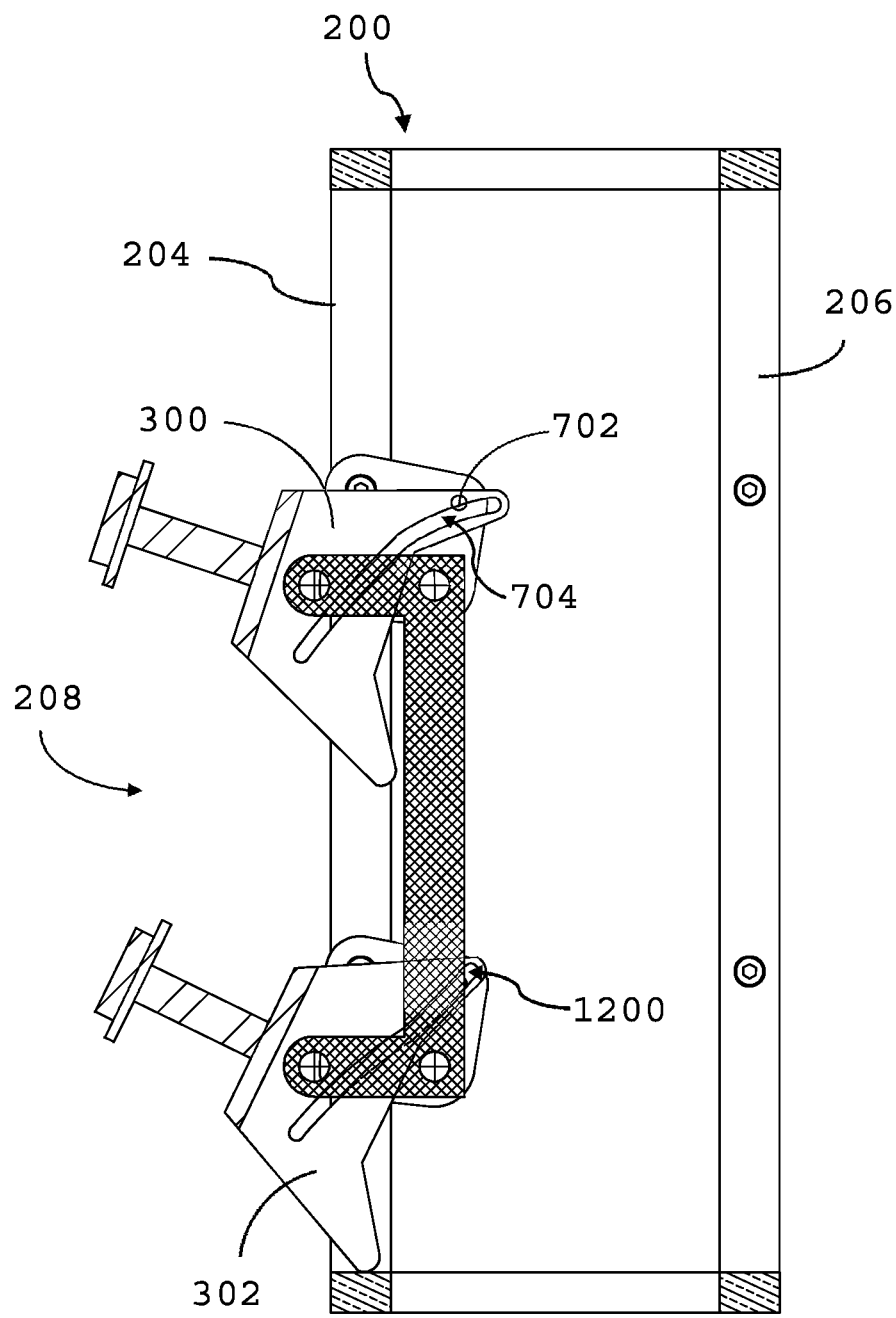
FIG. 16 is a drawing showing a top plan view, cross-sectioned along line XVI-XVI of FIG. 15, of the left steering assembly portion shown in FIG. 14.
Figure 18:
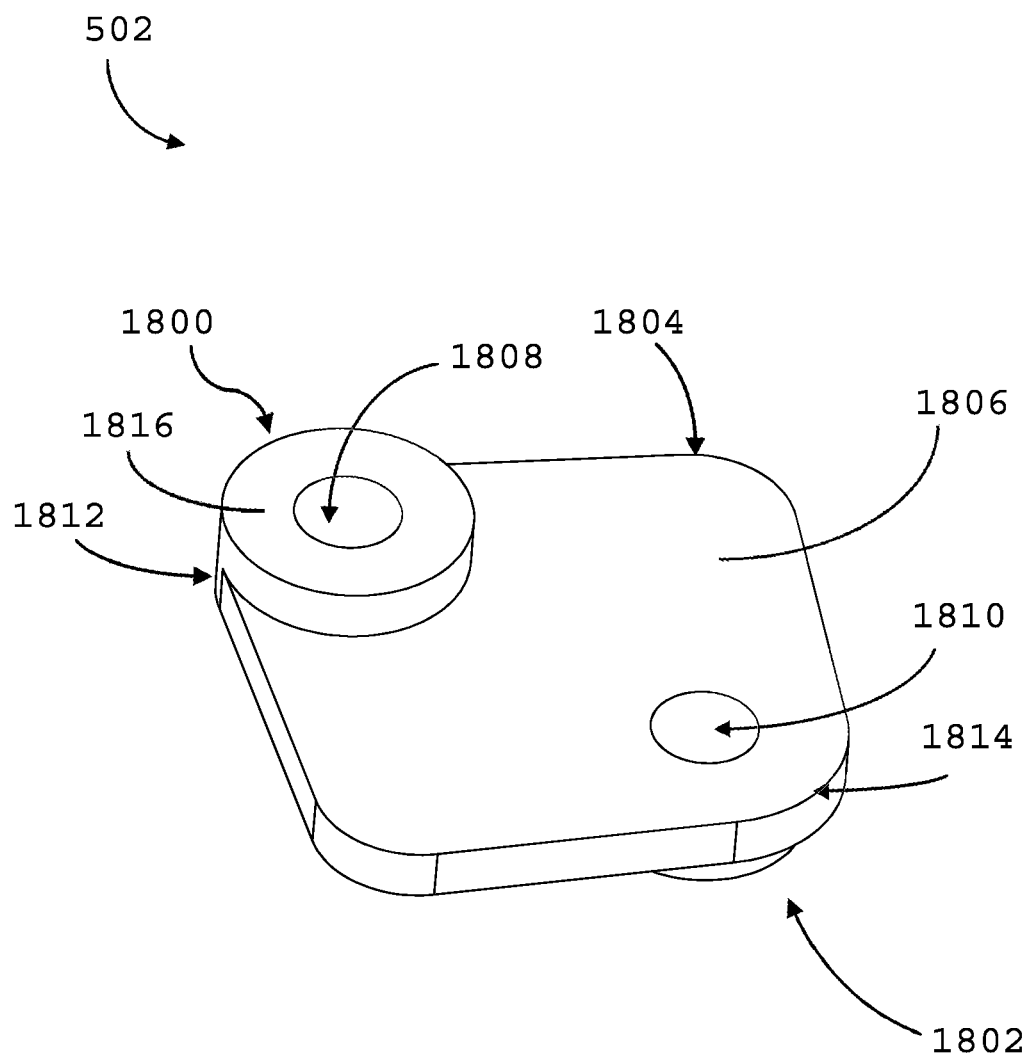
FIG. 18 is a drawing showing a top perspective view of a pivoting plate of the steering assembly shown in FIG. 2.
Figure 19:
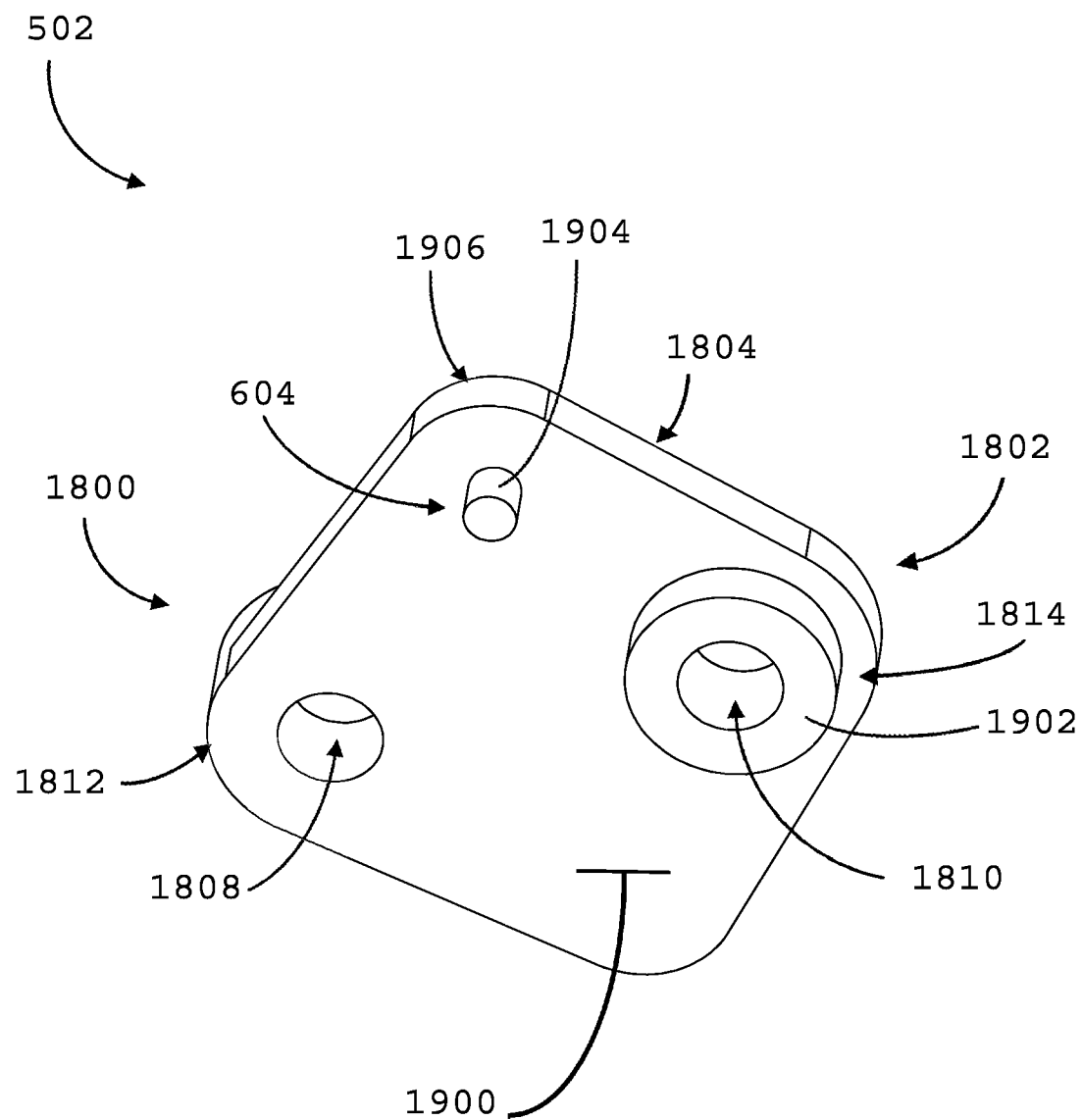
FIG. 19 is a drawing showing a bottom perspective view of the pivoting plate shown in FIG. 18.

The first link member 502 comprises a first frame connecting portion 1800 adapted to be pivotally connected to the left frame member 400, not shown in FIGS. 18 and 19, and a first mounting portion 1802 located away from the first frame connecting portion 1800. In the embodiment shown in FIGS. 14 and 15, the first link member 502 comprises a generally square first pivoting plate 1804 having a planar top face 1806, an opposed planar bottom face 1900 and a pair of pivot receiving holes 1808 and 1810 defined therein, extending between the planar top face 1806 and the planar bottom face 1808.

In the embodiment shown in FIGS. 18 and 19, a first pivot receiving hole 1808 is defined in a first corner 1812 of the first pivoting plate 1804 and a second pivot receiving hole 1810 is defined in a second opposed corner 1814 of the first pivoting plate 1804. The first pivot receiving hole 1808 is adapted to receive therein a first pivot pin, not shown in FIGS. 18 and 19, and the second pivot receiving hole 1810 is adapted to receive therein a second pivot pin, not shown in FIGS. 18 and 19, as it will become apparent below.

Still in this embodiment, the first frame connecting portion 1800 comprises a first annular projection 1816 protruding from the planar top face 1806 of the first pivoting plate 1804. The first annular projection 1816 is concentric relative to the first pivot receiving hole 1808 and is provided to space the first pivoting plate 1804 from the top left longitudinal member 204, not shown in FIGS. 18 and 19, as it will become apparent below.

Still referring to FIGS. 18 and 19, in one embodiment, the first mounting portion 1802 comprises a second annular projection 1902 protruding from the planar bottom face 1900 of the first pivoting plate 1804. The second annular projection 1902 is axially positioned around the second pivot receiving hole 1810 to space the first pivoting plate 1804 from the mounting member 510, not shown in FIGS. 18 and 19, as it will become apparent below.

Still referring to FIGS. 18 and 19, the pin 702 is mounted to the planar bottom face 1900 of the first pivoting plate 1804. In the embodiment shown in FIGS. 18 and 19, the pin 702 comprises a cylindrical projection 1904 projecting from the bottom face 1900 of the first pivoting plate 1804, normally thereto. Still in this embodiment, the pin 702 is located in a third corner 1906 of the pivoting plate 1804, adjacent the first corner 1812 and the second corner 1814.

Figure 17:
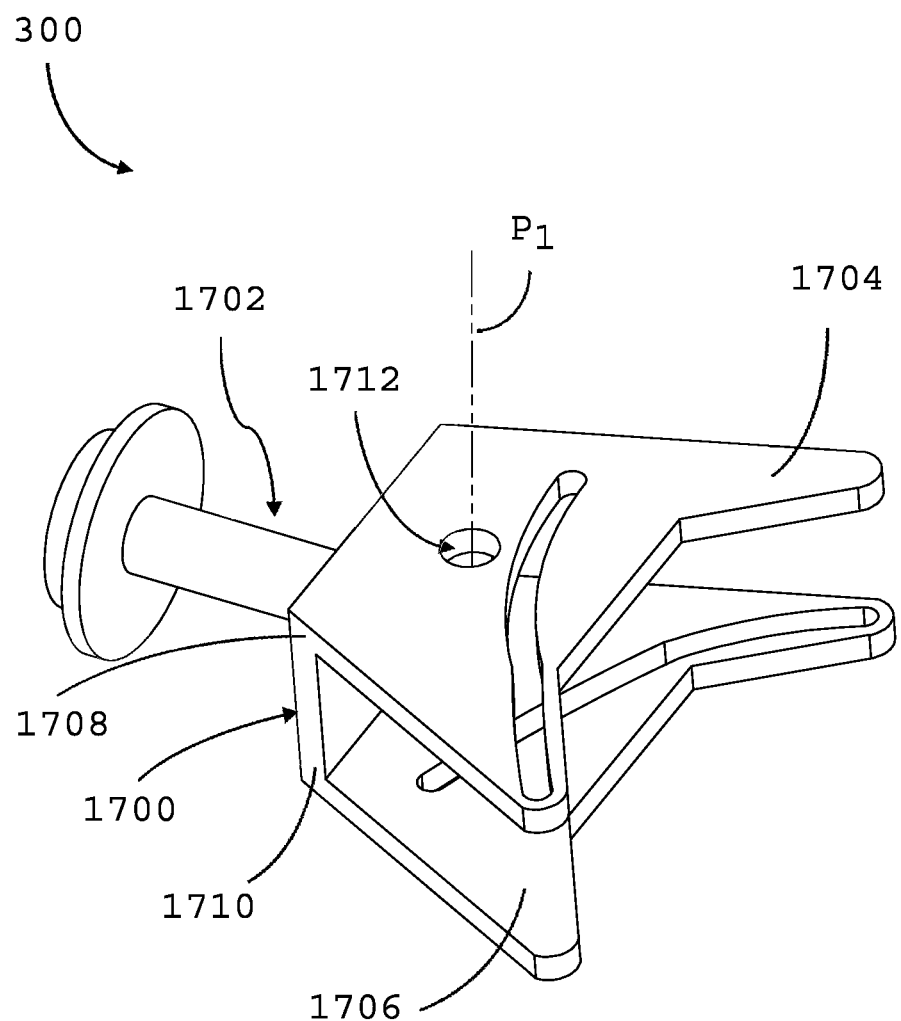
FIG. 17 is a drawing showing a perspective view of a steering knuckle of the steering assembly shown in FIG. 2.

Now turning to FIG. 17, the front left steering knuckle 300 is shown. The skilled addressee will appreciate that the back left steering knuckle 302, the front right steering knuckle 304 and the back right steering knuckle 306, although not shown in FIG. 17, are substantially similar to the front left steering knuckle 300 and thus require no further description.

In the illustrated embodiment, the front left steering knuckle 300 comprises a side plate member 1700 having a spindle 1702 extending normally therefrom in a first direction. The spindle 1702 is adapted to rotatably receive the front left wheel 212, not shown in FIG. 17, thereon.

Still referring to FIG. 17, the front left steering knuckle 300 further comprises a pair of parallel spaced-apart top and bottom, generally V-shaped plate members 1704 and 1706 respectively extending from a top and bottom end 1708 and 1710 of the side plate member 1700. In one embodiment, the top and bottom, generally V-shaped plate members 1704 and 1706 extend parallel to the spindle 1702, in a second direction opposed to the first direction.

Still in the embodiment illustrated in FIG. 17, a top knuckle pivot hole 1712 is defined in the top plate member 1704 of the front left spindle knuckle 300. The top knuckle pivot hole 1712 is adapted to receive therein a front knuckle pivot pin, not shown. The skilled addressee will appreciate that the front knuckle pivot hole 1712 defines the vertical wheel pivot axis $P_1$.

Now referring to FIGS. 9, 10, 11 and 12, there is shown a steering assembly 150 in a first position according to one embodiment.

The skilled addressee will appreciate that in this first position, the wheels 212, 214, 216 and 218 are substantially parallel to the frame 200 and that therefore, the trailer is steered forwardly and linearly.

Figure 11:
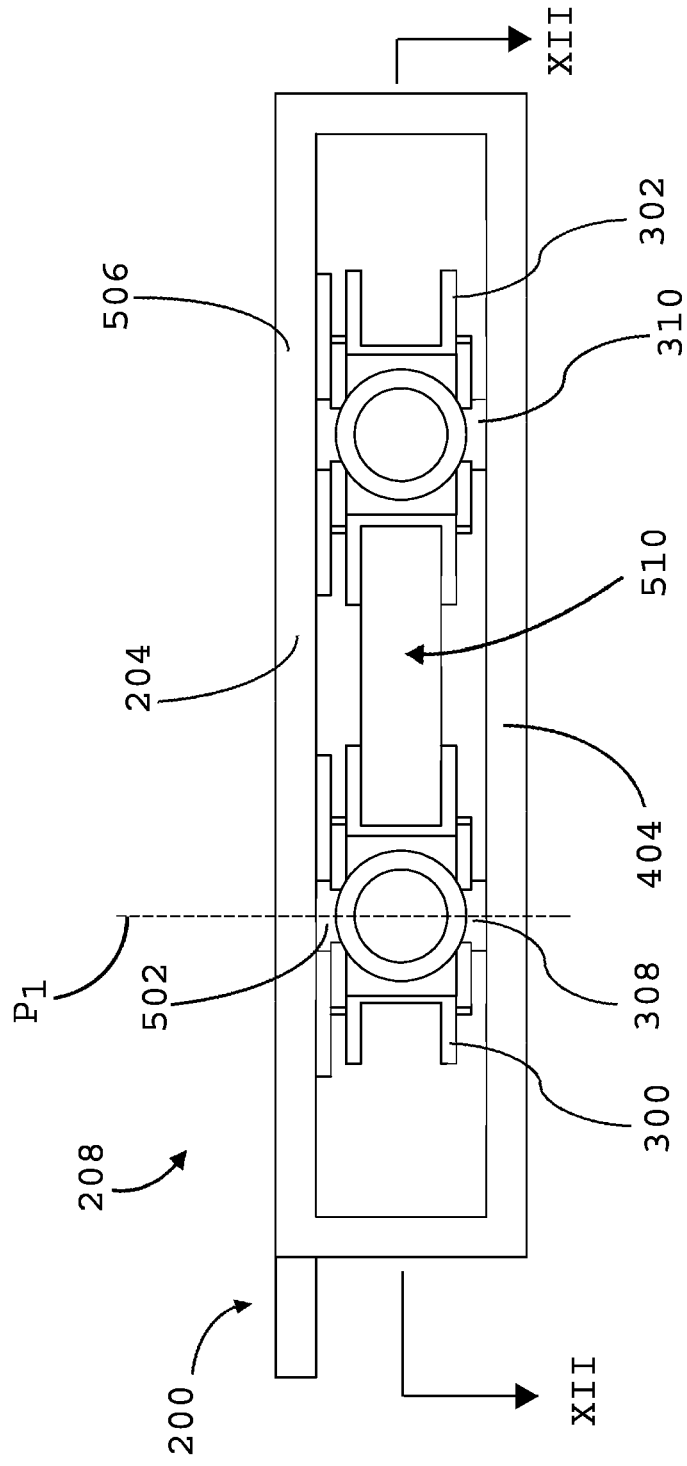
FIG. 11 is a drawing showing a left elevation view of the left steering assembly portion shown in FIG. 10.
Figure 21:
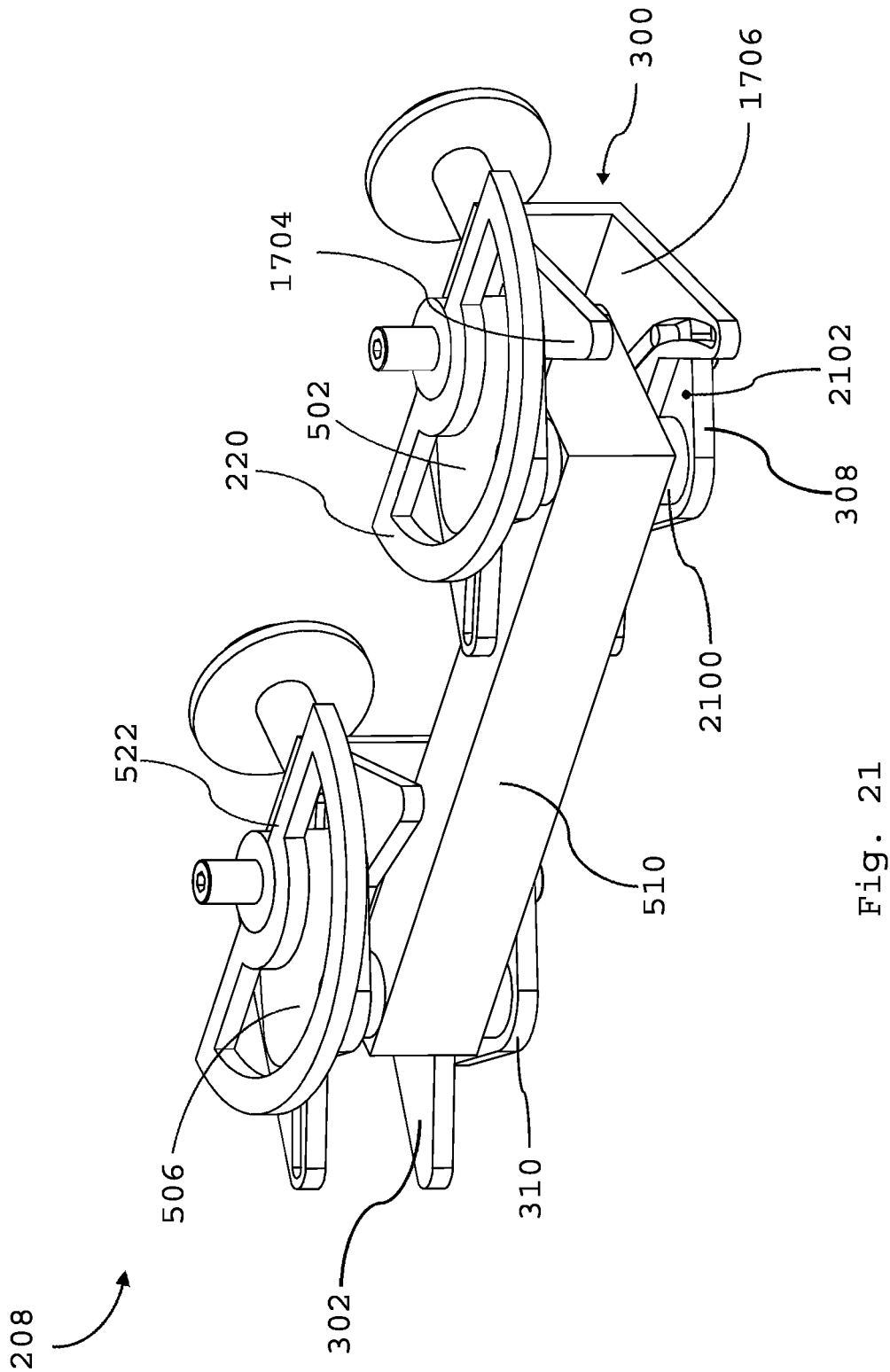
FIG. 21 is a drawing showing a perspective view of the left steering assembly portion shown in FIG. 10, with the frame removed to better show the mounting of the elements together.

In the embodiment shown in FIGS. 11 and 21, the left steering assembly portion 208 is mounted to the frame 200 between the top left longitudinal member 204 and the opposed bottom left longitudinal member 404.

More specifically, the first and second link members 502 and 506 are pivotally mounted under the top left longitudinal member 204 of the frame 200. Still in the illustrated embodiment, the third and fourth pivoting plates 308 and 310 are mounted on top of the bottom left longitudinal member 404, in vertical alignment respectively with the first link member 502 and the second link member 506.

In the illustrated embodiment, the mounting member 510 is pivotally mounted between the first, second link members and the third and fourth pivoting plates 502, 506, 308 and 310. As mentioned hereabove, the second annular projection 1902 of the first link member 502, best shown in FIG. 19, spaces out the mounting member 510 from the first link member 502.

In one embodiment, the second annular projection 1902 has a given thickness similar to the thickness of the top, generally V-shaped plate member 1704 of the front left steering knuckle 300.

In one embodiment, the third pivoting plate 308 comprises a third annular projection 2100 protruding upwardly from a top face 2102 thereof. Similarly to the second annular projection, the third annular projection 2100 has a given thickness similar to the thickness of the bottom, generally V-shaped plate member 1706.

It will be appreciated that the second link member 506 and the fourth pivoting plate 310 are arranged according to a similar configuration, as best shown in FIG. 21.

The skilled addressee will appreciate that this configuration enables the mounting member 510 to be received in the front left steering knuckle 300 between the top and bottom, generally V-shaped plate members 1704 and 1706 and to be pivotally connected thereto while also being pivotally connected to the frame 200 by the third and fourth pivoting plates 308 and 310. This configuration provides compactness to the steering assembly 150, which is of great advantage for installing the steering assembly 150 on a vehicle under which a limited amount of space is available.

The steering assembly 150 further comprises an actuator operatively connected to the swing mechanism 500 for displacing the front left and back left steering knuckles 300 and 302 along the first and second arced path $A_1$ and $A_2$, respectively.

Referring to FIGS. 2, 18 and 21, the left steering assembly portion 208 comprises a front left half wheel 220 securely mounted to the first annular projection 1816 of the first link member 502, as best shown in FIG. 21. Similarly, the left steering assembly portion 208 further comprises a back left half wheel 222 securely mounted to the second pivoting plate 506.

The left steering assembly portion 208 further comprises a left actuating bar 224 operatively coupled to the actuating means, the left actuating bar 224 being translatable in a direction parallel to the frame 200. In one embodiment, the front and back left half wheels 220 and 222 are connected to the left actuating bar 224 using a belt.

In an alternative embodiment, the front and back left half wheels 220 and 222 and the left actuating bar 224 each comprise a set of teeth cooperable with each other in a rack and pinion arrangement. The skilled addressee will appreciate that various mechanisms are possible for operatively coupling the left actuating bar 224 and the front and back half wheels 220 and 222 to thereby convert a translational movement to a pivotal movement for arcuately displacing the mounting member 510.

Figure 9:
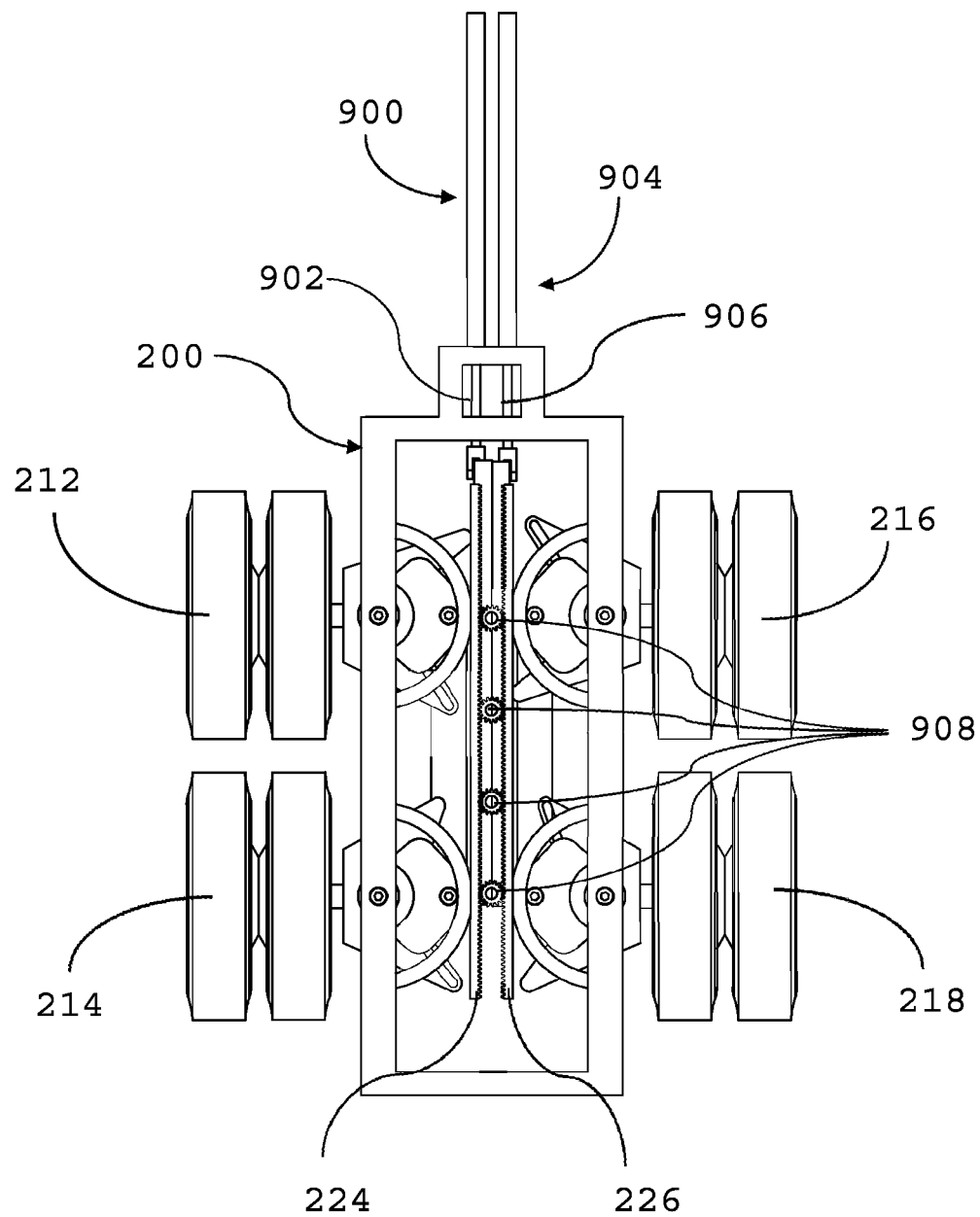
FIG. 9 is a drawing showing a top plan view of the steering assembly shown in FIG. 2, in a first position.
Figure 10:
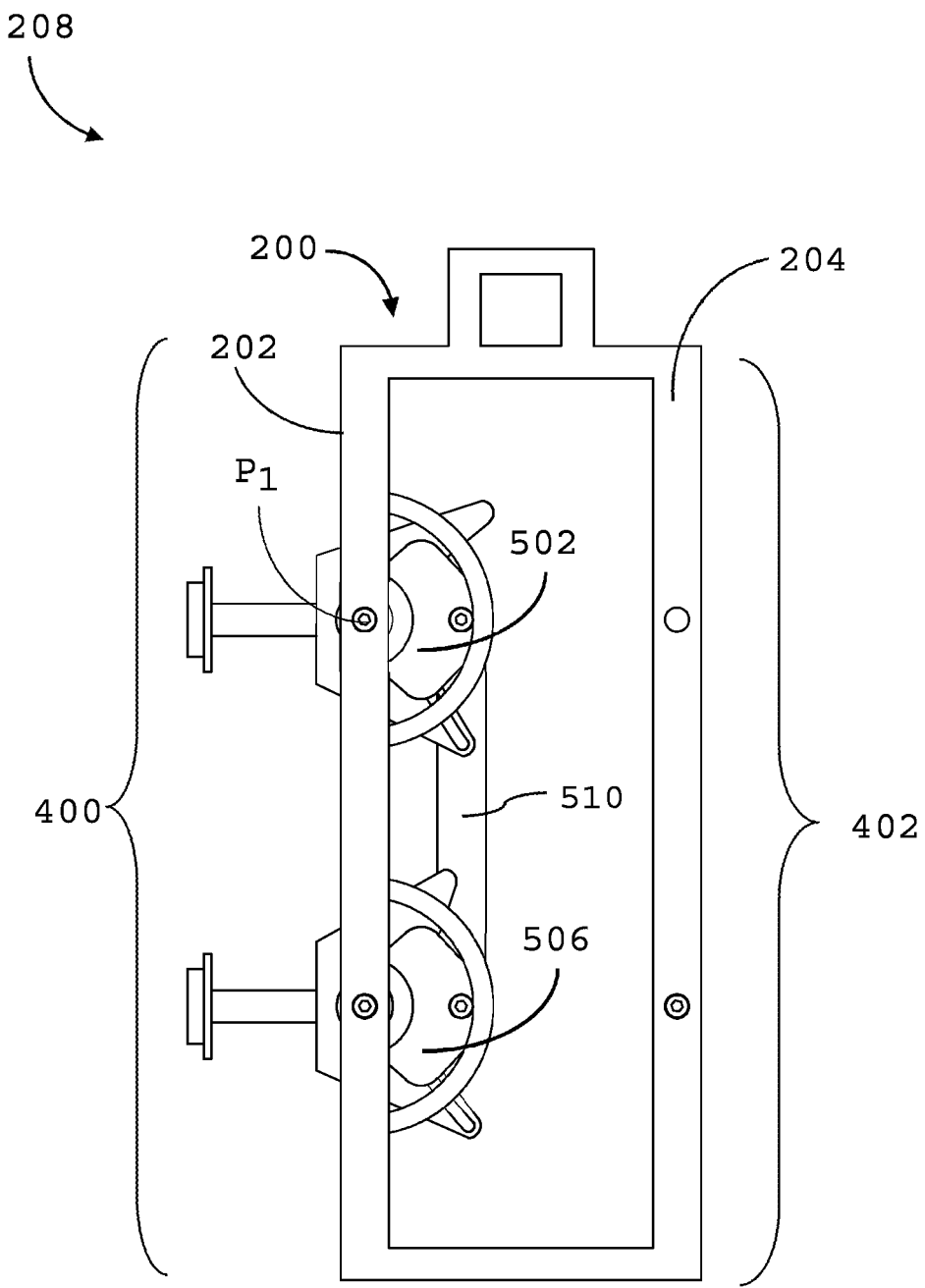
FIG. 10 is a drawing showing a top plan view of a left steering assembly portion of the steering assembly shown in FIG. 9, with the wheels removed.

Now turning to FIG. 9 and in one embodiment, the actuator comprise a left actuating cylinder 900 operatively mounted to the frame 200. The left actuating cylinder 900 comprises a left piston rod 902 extending parallel to the left actuating bar 224.

The left piston rod 902 is operatively connected to the left actuating bar 224 for causing a translation of the left actuating bar 224 in a longitudinal direction, thereby causing a pivoting of the first and second pivoting plates 502 and 506, thus actuating the swing mechanism 500.

In the embodiment illustrated in FIG. 9, the right steering assembly portion 210 is similarly actuated by a right actuating cylinder 904 having a right piston rod 906 adapted to move in translation a right actuating bar 226.

In one embodiment, the left actuating bar 224 and the right actuating bar 226 are operatively coupled together by a set of sprockets 908 mounted under the trailer bed 108, not shown. The skilled addressee will appreciate that in this configuration, when one of the left and right actuating bars 224 and 226 moves in a first direction, the other one of the left and right actuating bars 224 and 226 moves in a second direction opposite the first direction. This configuration thus advantageously provides a coordination of the pivoting of the left wheels 212 and 214 with the right wheels 216 and 218 when the trailer is turning.

Figure 22:
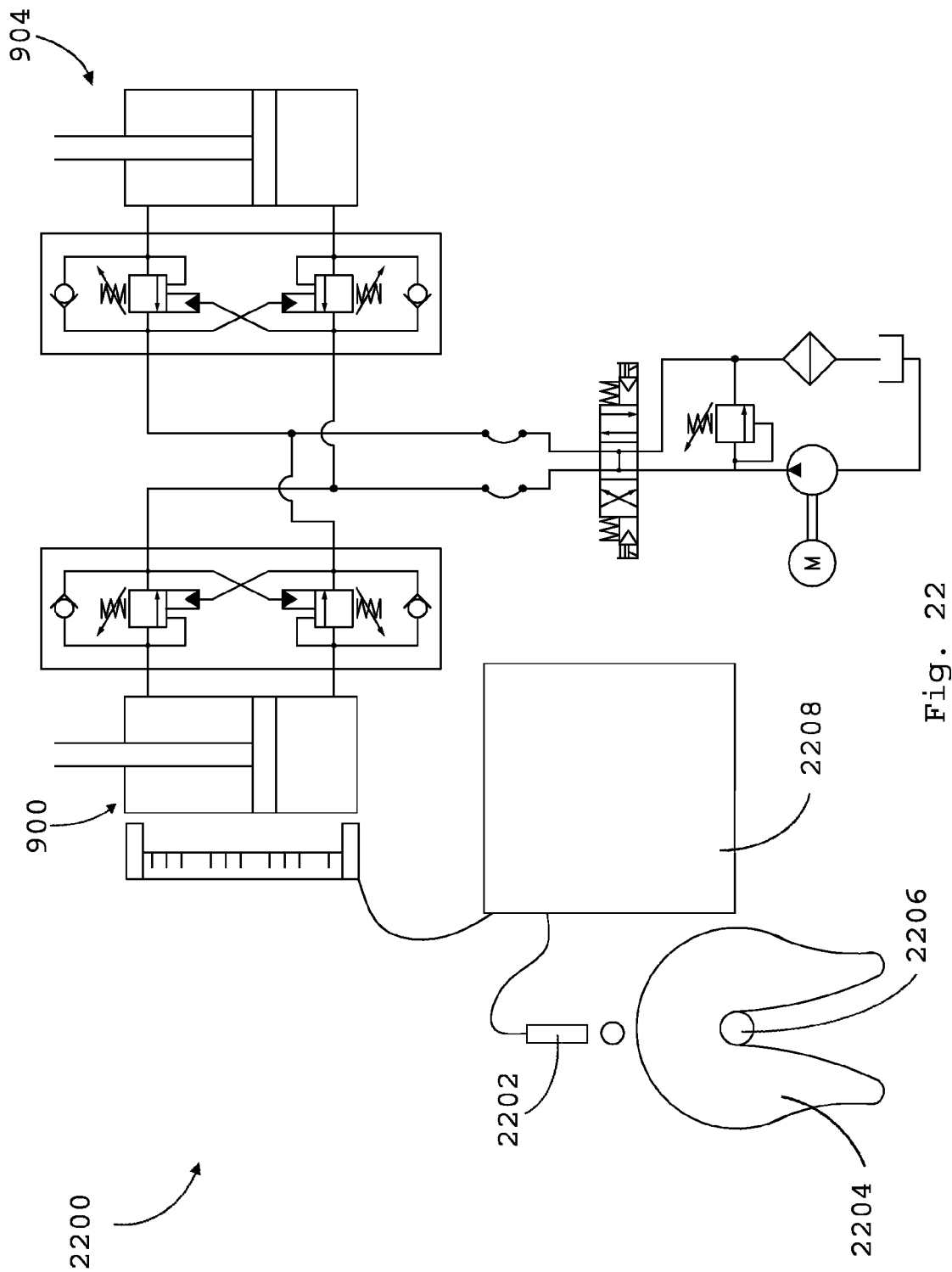
FIG. 22 is a schematic representation showing a control circuit for the steering assembly shown in FIG. 2, in accordance with one embodiment.
Figure 23:
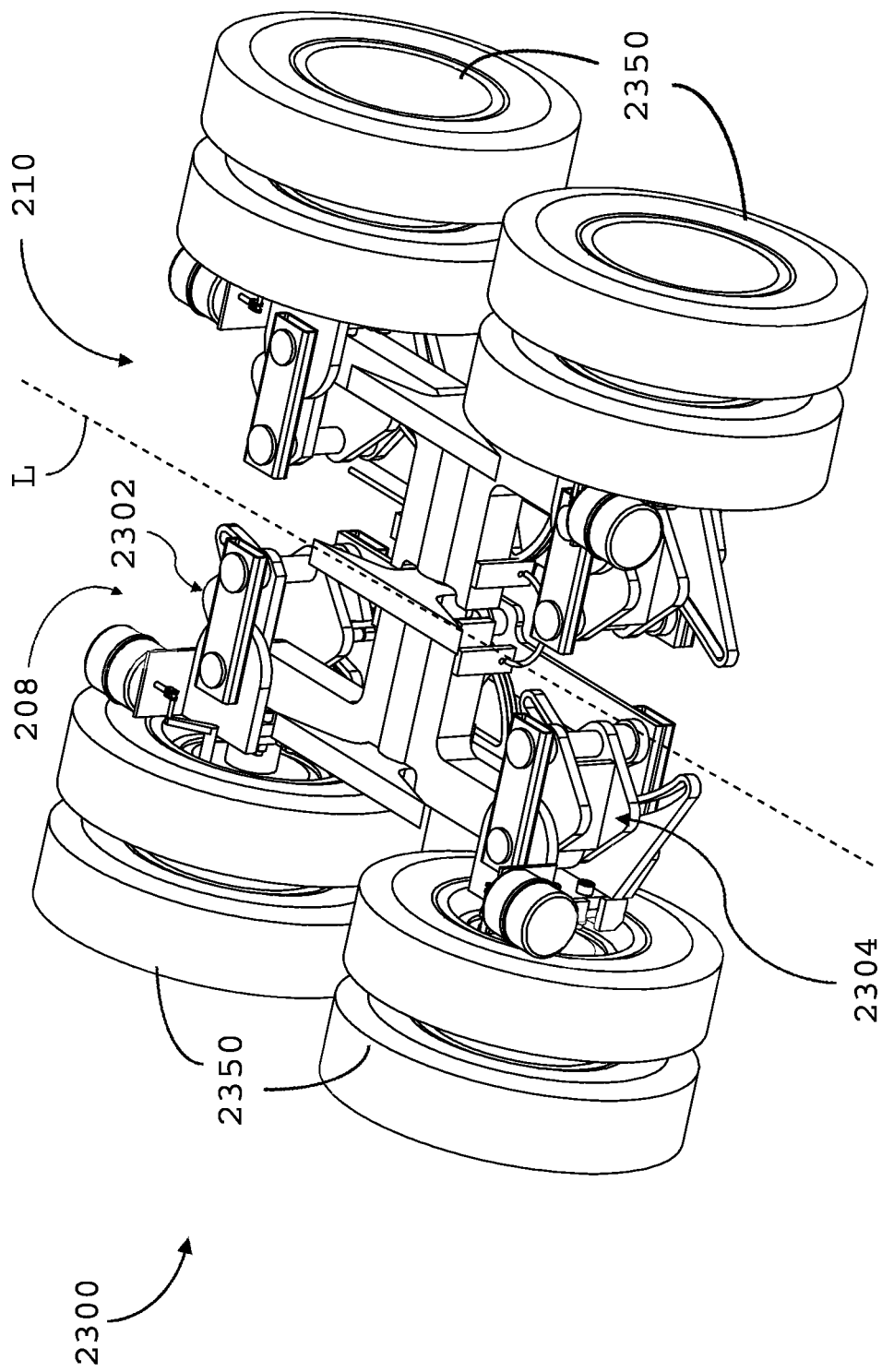
FIG. 23 is a drawing showing a perspective view of a steering assembly, in accordance with an alternative embodiment.

Now referring to FIG. 22, control means may further be provided for controlling actuation of the swing mechanism 500. In the illustrated embodiment, the control means comprise a control circuit 2200 for controlling an actuation of the left and right actuating cylinder 900 and 904. In one embodiment, the control circuit 2200 comprises a sensor 2202 for detecting the position of the fifth wheel 2204 mounted on the trailer tractor, not shown, in reference to the kingpin 2206 mounted on the trailer, not shown, and thereby detect a turning angle of the tractor truck relative to the trailer.

In the illustrated embodiment, the control circuit 2200 further comprises a controller 2208 operatively connected to the sensor 2202 and to the actuating cylinders 900 and 904 for activating the actuating cylinders 900 and 904 according to a detected position of the fifth wheel 2204.

In the embodiment shown in FIG. 22, the left actuating cylinder 900 is hydraulically and reciprocally connected to the right actuating cylinder 904. The skilled addressee will appreciate that in this configuration, a translation of one of the left and right actuating cylinders 900 and 904 in a first direction will cause a translation of the other of the left and right actuating cylinders 900 and 904 in a second direction opposite the first direction. This further contributes to coordinating the pivoting of the left wheels 212 and 214 with the right wheels 216 and 218 when the trailer is turning.

In one embodiment, there is further provided a manual operation mode in which the position of the left and right actuating cylinders 900 and 904 may be set manually by an operator of the trailer. This configuration is of great advantage to steer the trailer in or out of a location where little maneuvering space is available when the trailer does not have any forward speed.

In an alternative embodiment, the steering assembly 150 does not comprise actuating cylinders. In such an embodiment, the left and right actuating bars 224 and 226 are rigidly connected to a back end of the trailer tractor, now shown, and are directly moved in translation by a movement of the trailer tractor, not shown, in reference to the trailer.

Referring to FIGS. 13 to 16, there is further shown the steering assembly 150 in a second position in which the wheels 250 are oriented at a great angle. The skilled addressee will appreciate from FIG. 13 that the minimum distance M between the frame 200 and the front left wheel 212 is respected in this position. To pass from the first position, shown in FIGS. 9, 10, 11 and 12, to the second position, the actuator is activated and displaces the front left and back left steering knuckles 300 and 302 along their respective arced path, thereby pivoting the front left and back left steering knuckles 300 and 302 by means of the guiding mechanism 700, until the front left and back left wheels 212 and 214 are oriented in a desired orientation. This enables the vehicle to be steered in a desired direction, for instance to negotiate a turn.

In one embodiment, the guiding mechanisms associated with all the steering knuckles 300, 302, 304, 306 are adapted to pivot their corresponding steering knuckle at a predetermined pivoting rate. This may be accomplished by providing each of the grooves of the steering knuckles 300, 302, 304, 306 with a predetermined shape which will provide the desired pivoting rate, for instance. In this configuration, during turning of the vehicle which is travelling on a ground surface, each of the wheels 250 may be oriented tangentially relative to a respective trajectory of the corresponding wheel, thereby advantageously preventing scrubbing or slippage of the wheels 250 on the ground surface. This further reduces the space needed for the trailer to negotiate a turn.

For instance, trailers pulled by tractor trucks, when turning at a 90 degrees angle to enter a cross street, usually tend to pass over a portion of the curb, because such tight turns usually require a relatively large amount of space to maneuver. A trailer fitted with the steering assembly 150 as described herein may require less space laterally from their trajectory because the steering assembly 150, by orienting the wheels 250 according to their respective trajectory, would enable the trailer to substantially follow the trajectory of the tractor truck, thereby substantially keeping clear of the curb and thereby reducing the risk of causing injuries to pedestrians and/or causing damage to properties located on or near the curb.

To operate the steering assembly 150, the user may set the controlling means in one of many modes of operation. In a first mode, or idle mode, the steering assembly 150 is disabled. In this mode, the trailer acts as a regular trailer and the wheels 250 are not orientable. In a second mode, or manual mode, the user may manually set the orientation of the wheels 250 to a desired orientation using the controlling means. In a third mode, or automatic mode, the wheels 250 are oriented according to the trajectory of the tractor truck.

There is further provided a method for operating the steering assembly. According to a first step of the method, the steering assembly 150, as described hereinabove, is first provided. According to another step, the actuator is activated to thereby move the front left, back left, front right and back right steering knuckles 300, 302, 304, 306 along their respective arced path until the wheels 250 are oriented in a desired orientation. This step may be performed automatically, for instance when the trailer is moving at a speed which is below or above a predetermined speed.

According to a further step, the actuator is activated manually by the user. This step corresponds to the manual mode.

According to another step, which corresponds to the automatic mode, the sensor 2202 detects the angular position of the tractor truck relative to the trailer and the user controls, via the control means, actuation of the swing mechanism 500 by the actuator in order to orient the wheels 250 tangentially to their respective trajectory, thereby preventing scrubbing or slippage of the wheels 250 on the ground. This increases the lifespan of the tires mounted on the wheels 250, which advantageously reduces the cost associated with using the trailer.

Now turning to FIGS. 23 to 37, there is shown a steering assembly 2300, in accordance with an alternative embodiment.

Referring specifically to FIGS. 23 to 32, the frame 200, in this embodiment, does not comprise a cage, but instead comprises a pair of T-shaped left and right frame members 2400, 2402 pivotally connected together by a central pivot axle 2450. This makes the steering assembly 2300 substantially compact, which is of great advantage.

The left frame member 2400 comprises a left longitudinal frame portion 2404 having a front end 2406 and an opposed back end 2408, each having defined therein a vertical pivot hole 2410 for pivotally connecting first and second link members 2302, 2304 to the frame 200.

Figure 24:
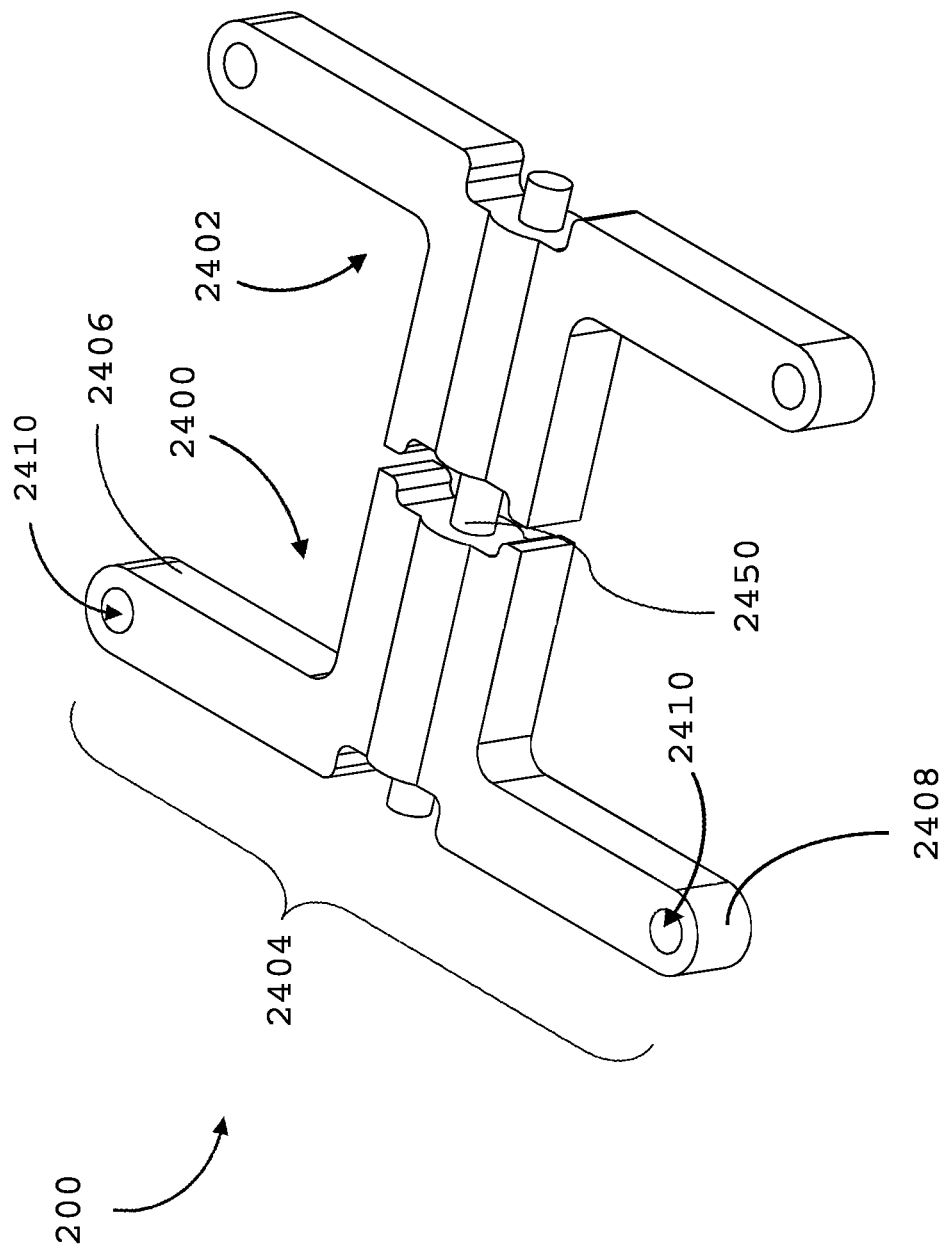
FIG. 24 is a drawing showing a perspective view of a frame for the steering assembly shown in FIG. 23.
Figure 25:
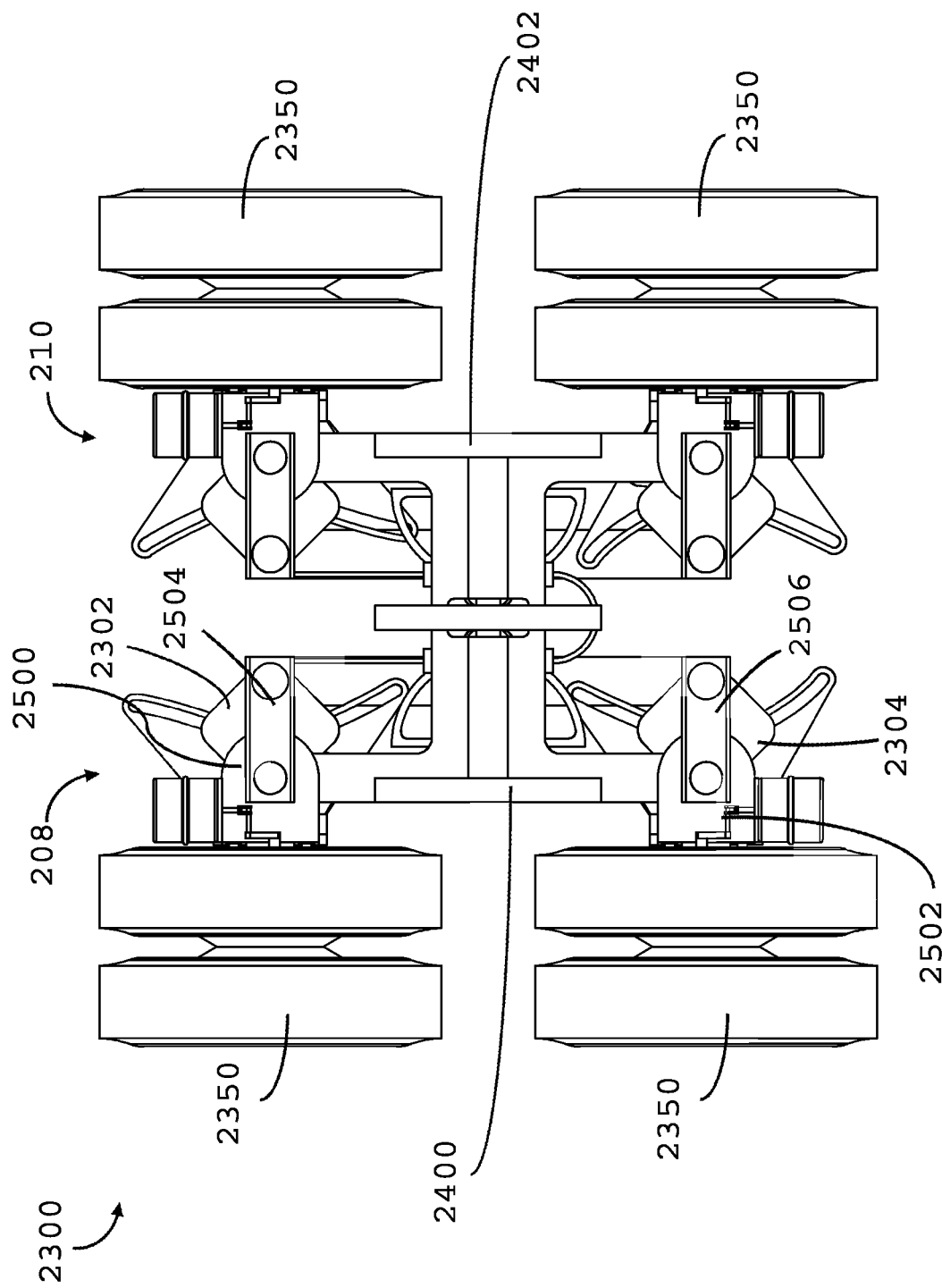
FIG. 25 is a drawing showing a top plan view of the steering assembly shown in FIG. 23, in a first position.
Figure 26:
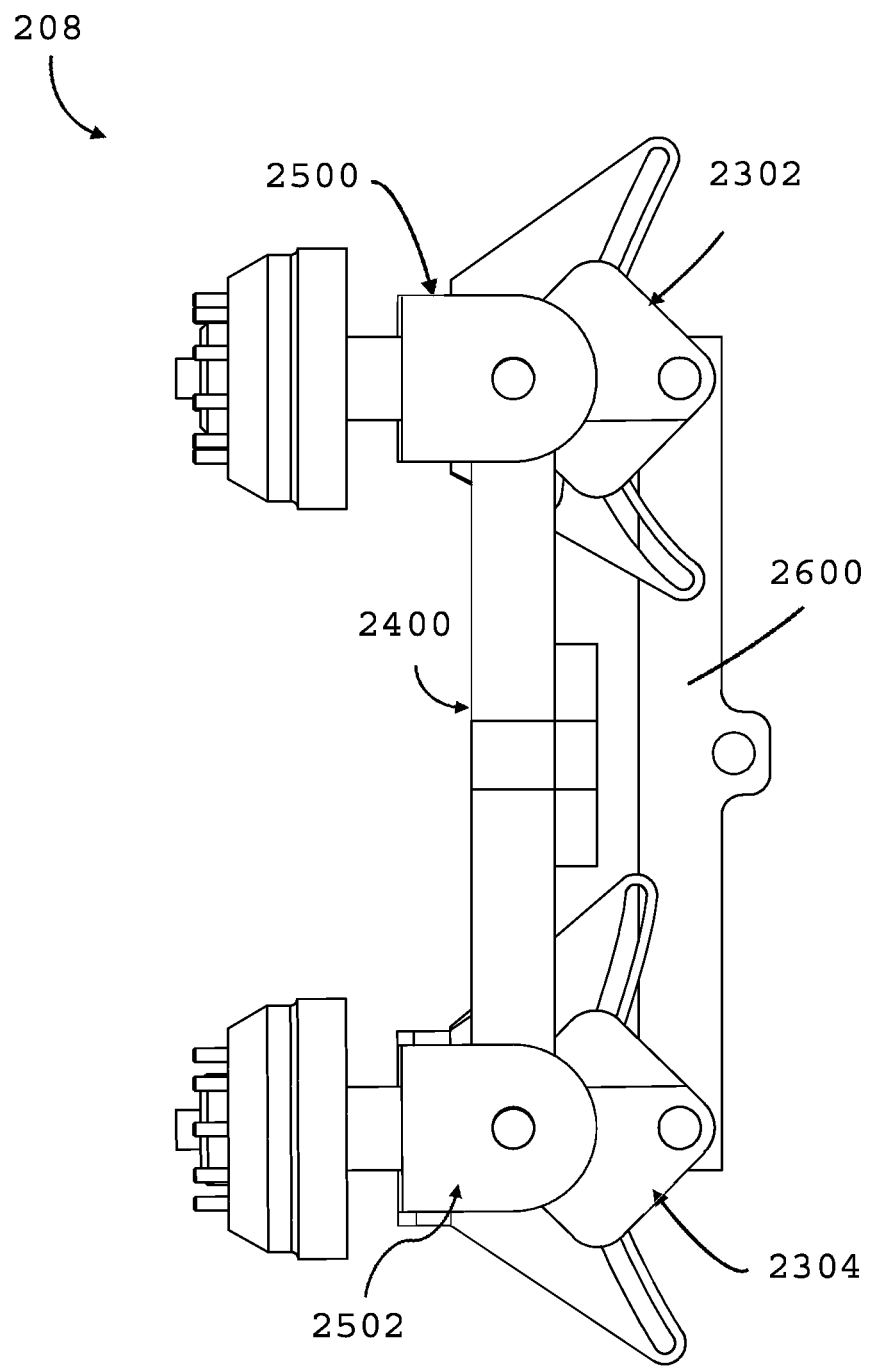
FIG. 26 is a drawing showing a top plan view of a left steering assembly portion of the steering assembly shown in FIG. 25, with the wheels removed.

As can be appreciated from FIG. 24, the right frame member 2402 is a mirror image of the left frame member 2400 and thus requires no further description.

The left and right steering assembly portions 208, 210 are respectively mounted on the left and right frame members 2400, 2402. Since the left and right frame members 2400, 2402 are both pivotally mounted on the central pivot axle 2450, the left and right steering assembly portions 208, 210 are thus adapted to pivot with respect to each other about a frame pivot axis extending perpendicularly to the central longitudinal axis L and parallel to a ground surface, also not shown in FIGS. 23 and 24. This is of great advantage, especially when the trailer on which the steering assembly 2300 is mounted travels on an uneven road, such as a road having potholes and bumps.

Moreover, in some jurisdictions, trailers having left wheels and right wheels pivotally connected together are permitted to carry greater loads than trailers on which wheels on the left side and right side are rigidly connected together, which is of great advantage.

Still referring to FIGS. 23 to 32, the skilled addressee will appreciate that the configuration of the steering assembly 2300 according to this alternative embodiment is substantially similar to the steering assembly 150 of the previous embodiment described hereabove. It will be appreciated that since the right steering assembly portion 210 is substantially similar to the left steering assembly portion 208, only the left steering assembly portion 208 needs to be described.

In this alternative embodiment, a mounting member 2600 is mounted below the first and second link members 2302, 2304 and is pivotally connected thereto. The steering assembly 2300 further comprises front left and back left steering knuckles 2500, 2502 pivotally connected to the mounting member 2600 and each having a wheel 2350 rotatably mounted thereto. In this embodiment, the steering assembly 2300 also comprises a front left connecting bar 2504 pivotally connecting the front left steering knuckle 2500 to the first link member 2302 and a back left connecting bar 2506 pivotally connecting the back left steering knuckle 2502 to the second link member 2304. It will be appreciated that the front left and back left connecting bars 2504, 2506 advantageously facilitate pivoting of the front left and back left steering knuckles 2500, 2502 without adding extra weight to the steering assembly 2300.

In this configuration, the front left and back left steering knuckles 2500, 2502 may respectively move along a corresponding arced path, as described above.

Figure 33A:
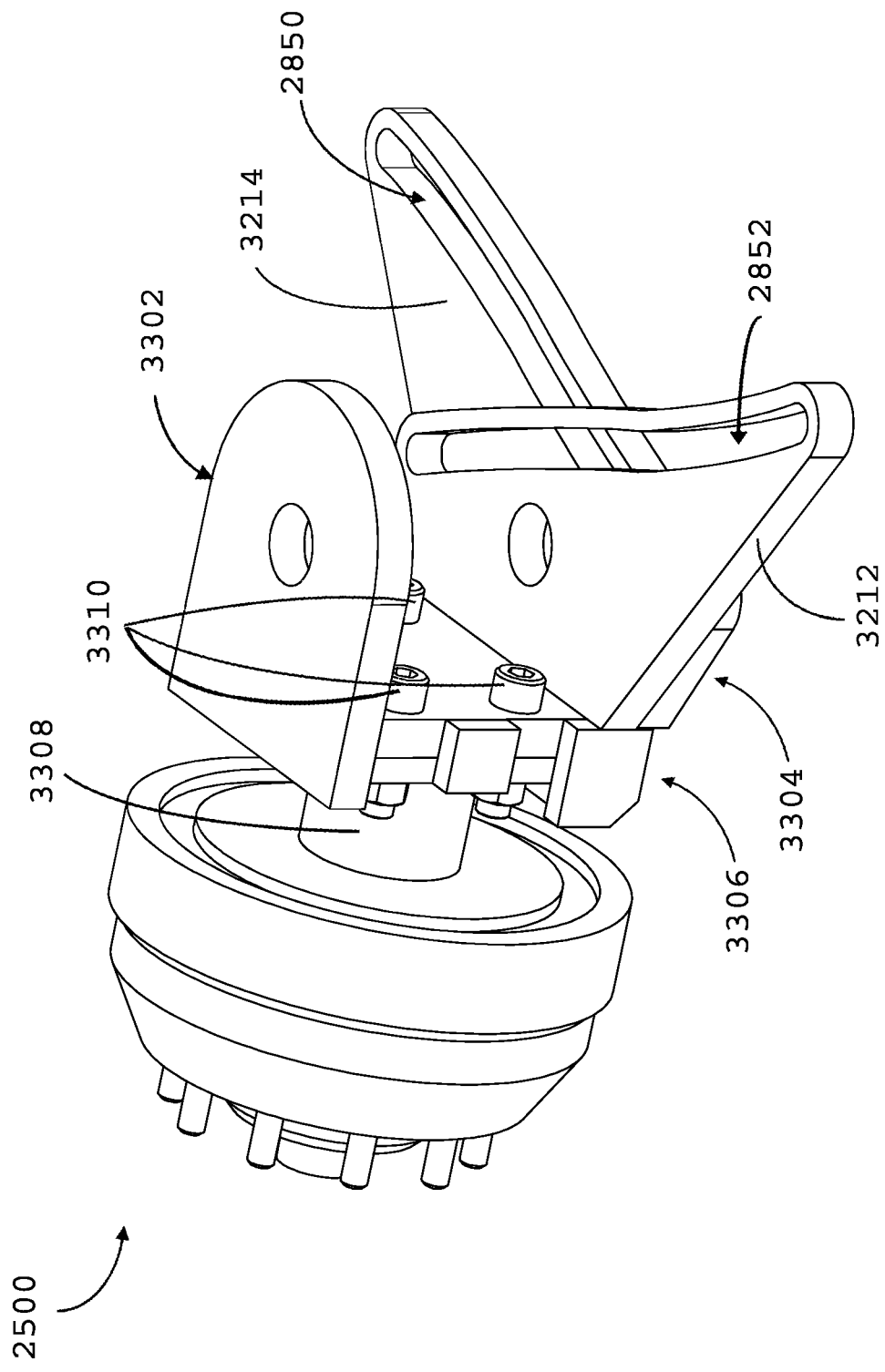
FIG. 33A is a drawing showing a perspective view of a steering knuckle of the steering assembly shown in FIG. 23.
Figure 33B:
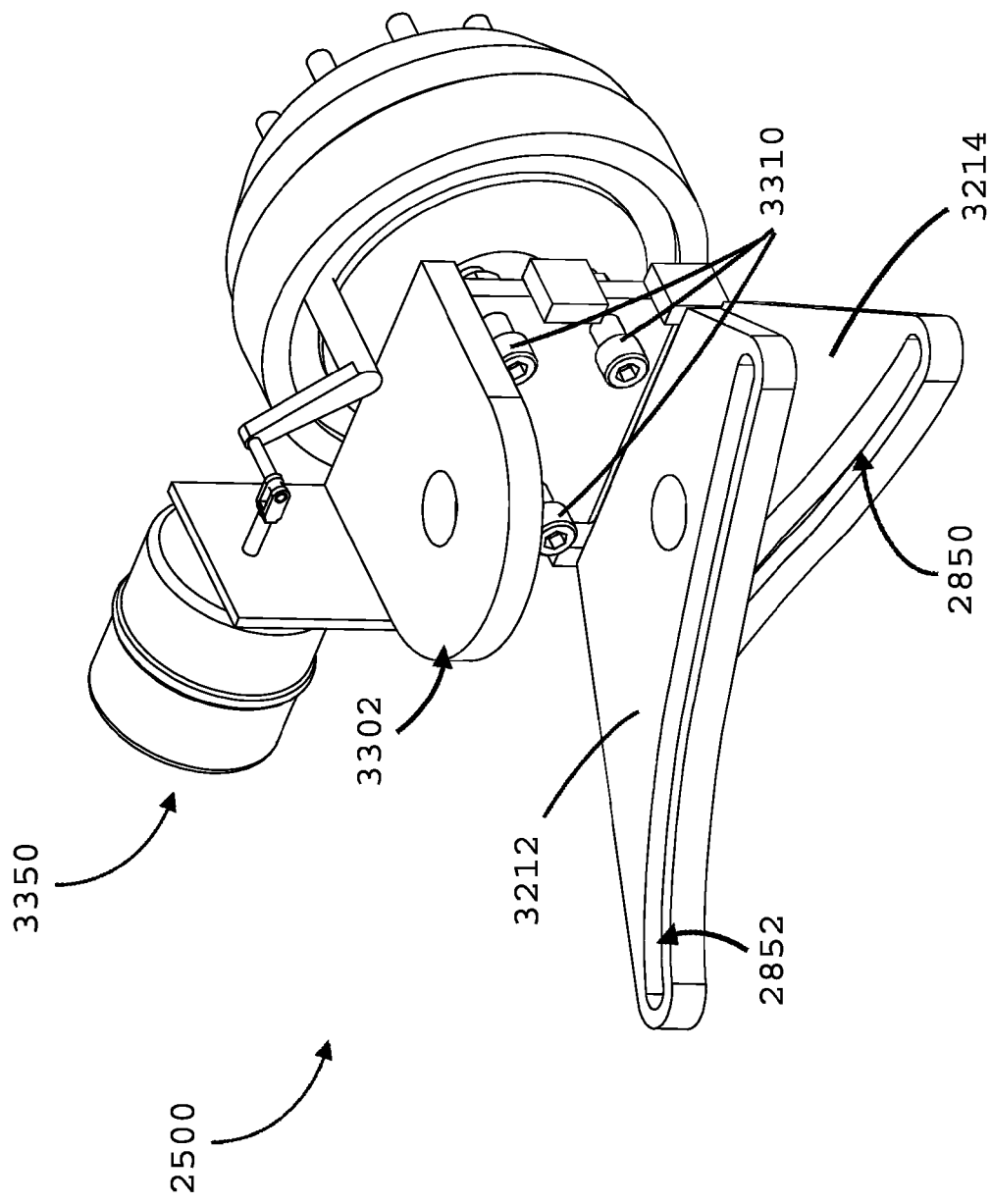
FIG. 33B is a drawing showing another perspective view of the steering knuckle shown in FIG. 33A, with a break assembly mounted thereon.

Now turning to FIGS. 33A and 33B, there is shown a front left steering knuckle 2500, still in accordance with this alternative embodiment. The front left steering knuckle 2500 comprises a top portion 3302 pivotally connected to the first link member 2302, not shown in FIG. 33A, a parallel bottom portion 3304 and an orthogonal side portion 3306 extending vertically therebetween. The side portion 3306 is adapted for fastening a wheel hub 3308 thereon using fasteners 3310 such as bolts or the like. This advantageously allows a user to adjust the alignment of the wheels by tightening or loosening the fasteners 3310 accordingly, as will be appreciated by the skilled addressee.

The steering assembly 2300 further comprises a guiding mechanism having a first guiding element associated with the front left steering knuckle 2500 and a second guiding element associated with the first link member 2302. In this alternative embodiment, the bottom portion 3304 of the front left steering knuckle 2500 comprises a pair of superposed plates 3312, 3314 having respectively defined therein first and second grooves 2850, 2852, which define the first guiding element of the guiding mechanism. The first and second grooves 2850, 2852 are adapted to respectively receive first and second pins 2800, 2802, best shown in FIG. 35, of the first link member 2302, which define the second guiding element. This configuration enables pivoting of the front left steering knuckle 2500 when the front left steering knuckle 2500 is displaced along its arced path while maintaining the wheel 2350 oriented tangentially to the arced path, as explained above.

A brake assembly 3350 may further be mounted to the front left steering knuckle 2500. In the illustrated embodiment, the brake assembly 3350 comprises an air brake assembly, which is widely known in the art.

Figure 34:
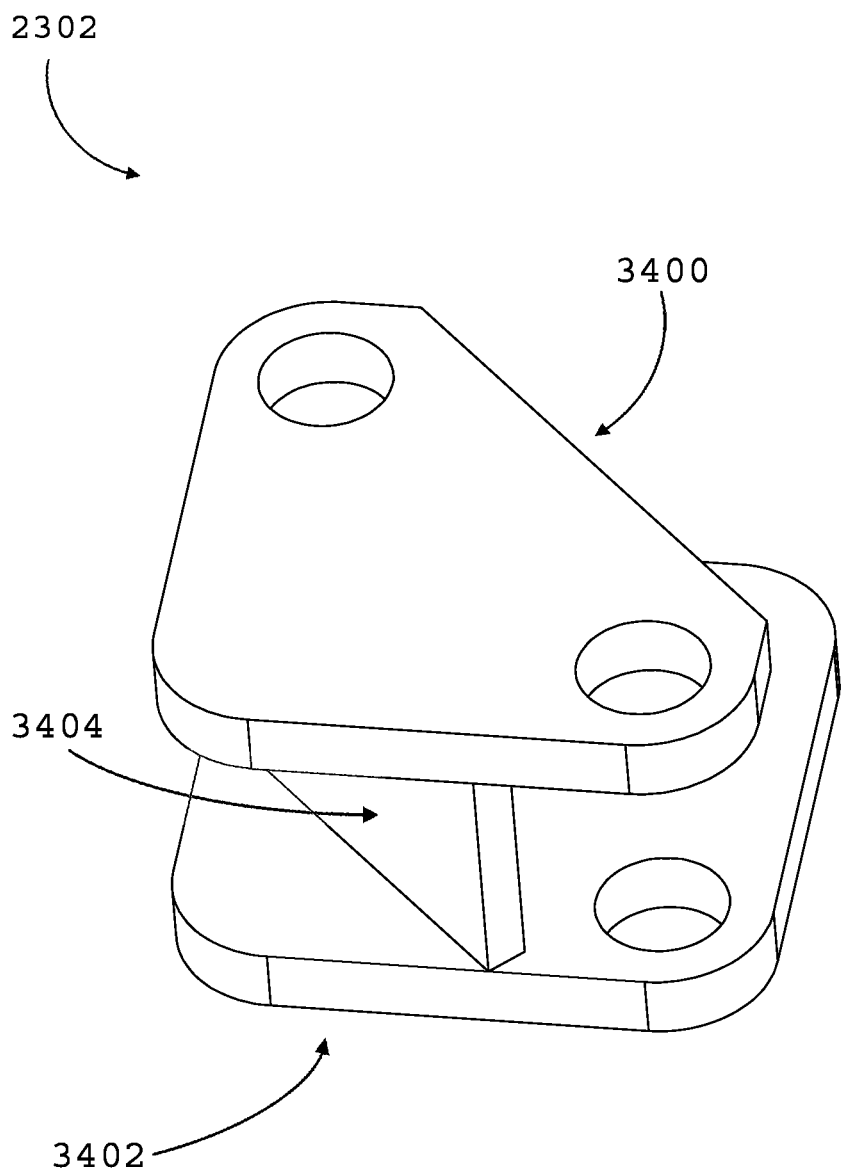
FIG. 34 is a drawing showing a top perspective view of a first link member for the steering assembly shown in FIG. 23.
Figure 35:
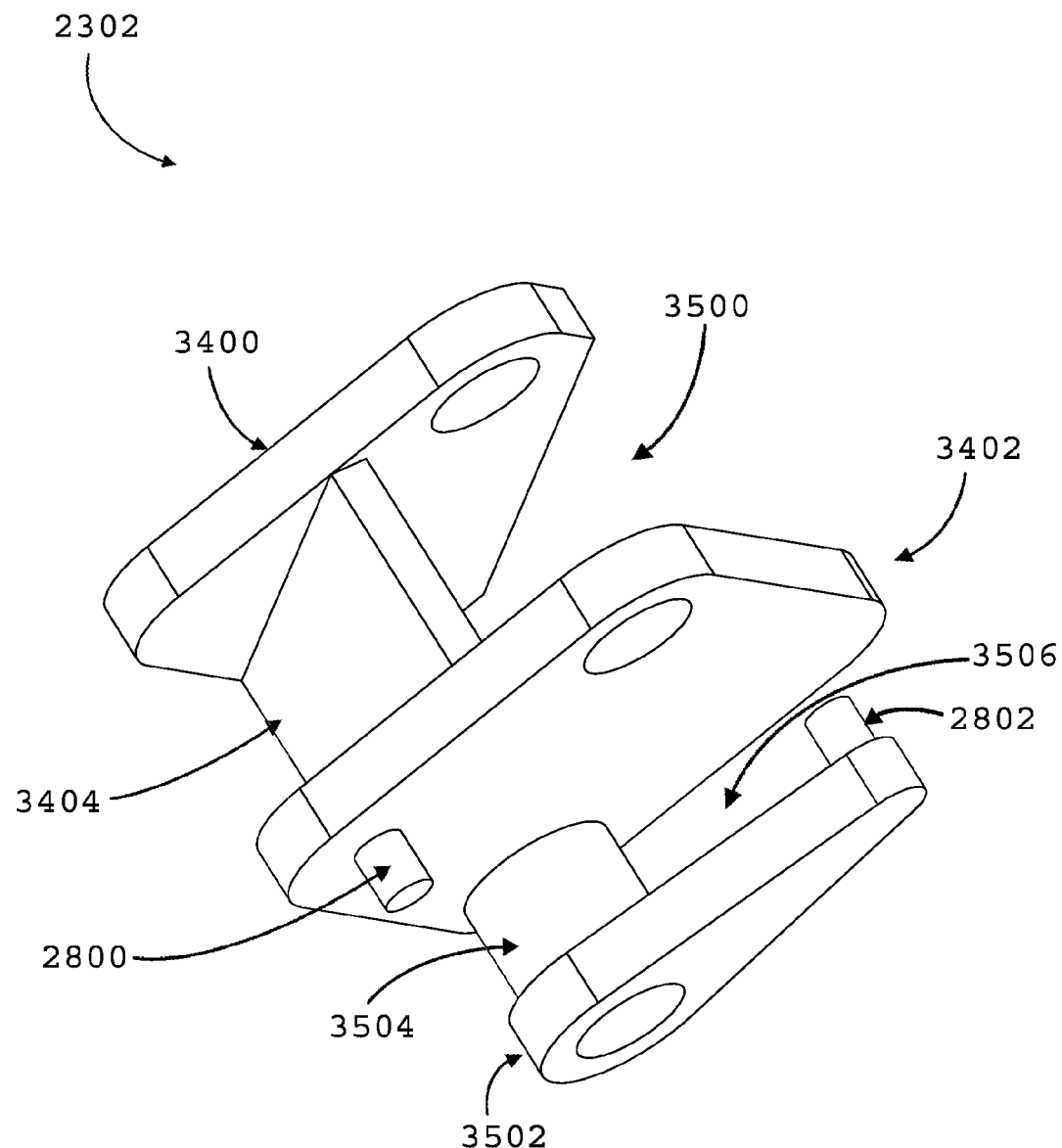
FIG. 35 is a drawing showing a bottom perspective view of the first link member shown in FIG. 34.
Figure 36:
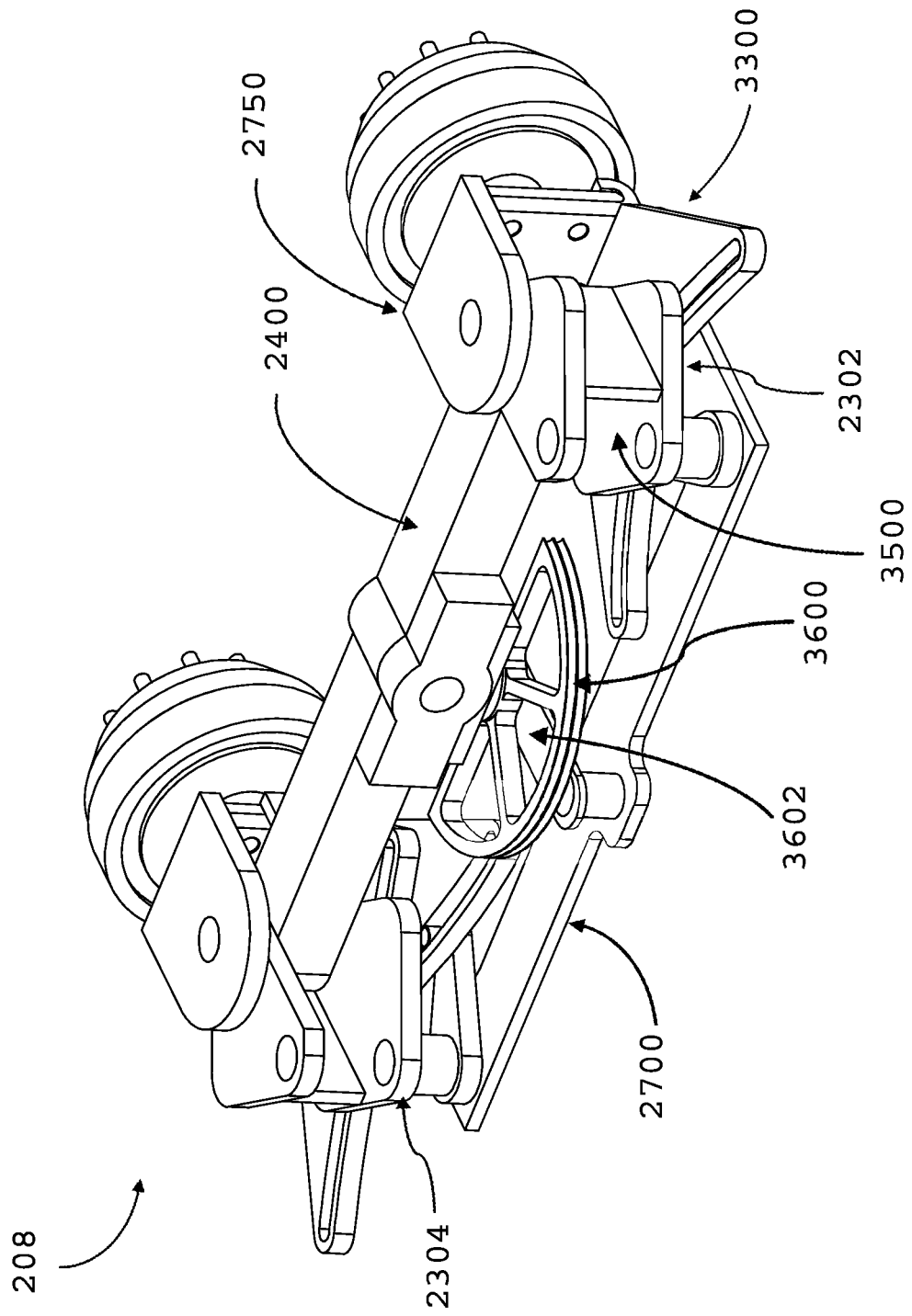
FIG. 36 is a drawing showing a perspective view of the left steering assembly portion shown in FIG. 23, with part of the frame removed to better show the mounting of the elements together.
Figure 37:
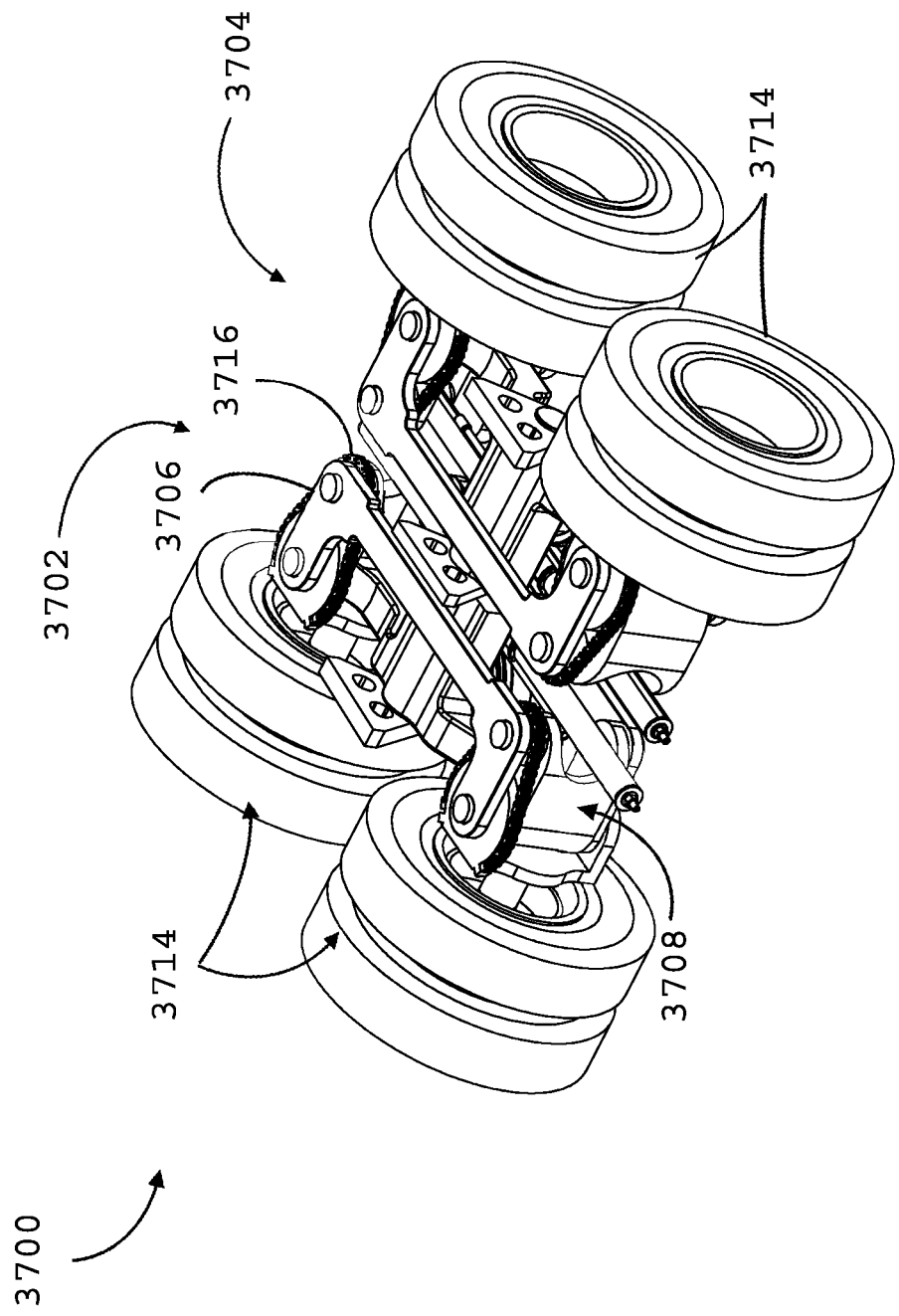
FIG. 37 is a drawing showing a perspective view of a steering assembly, in accordance with yet another embodiment.
Figure 38:
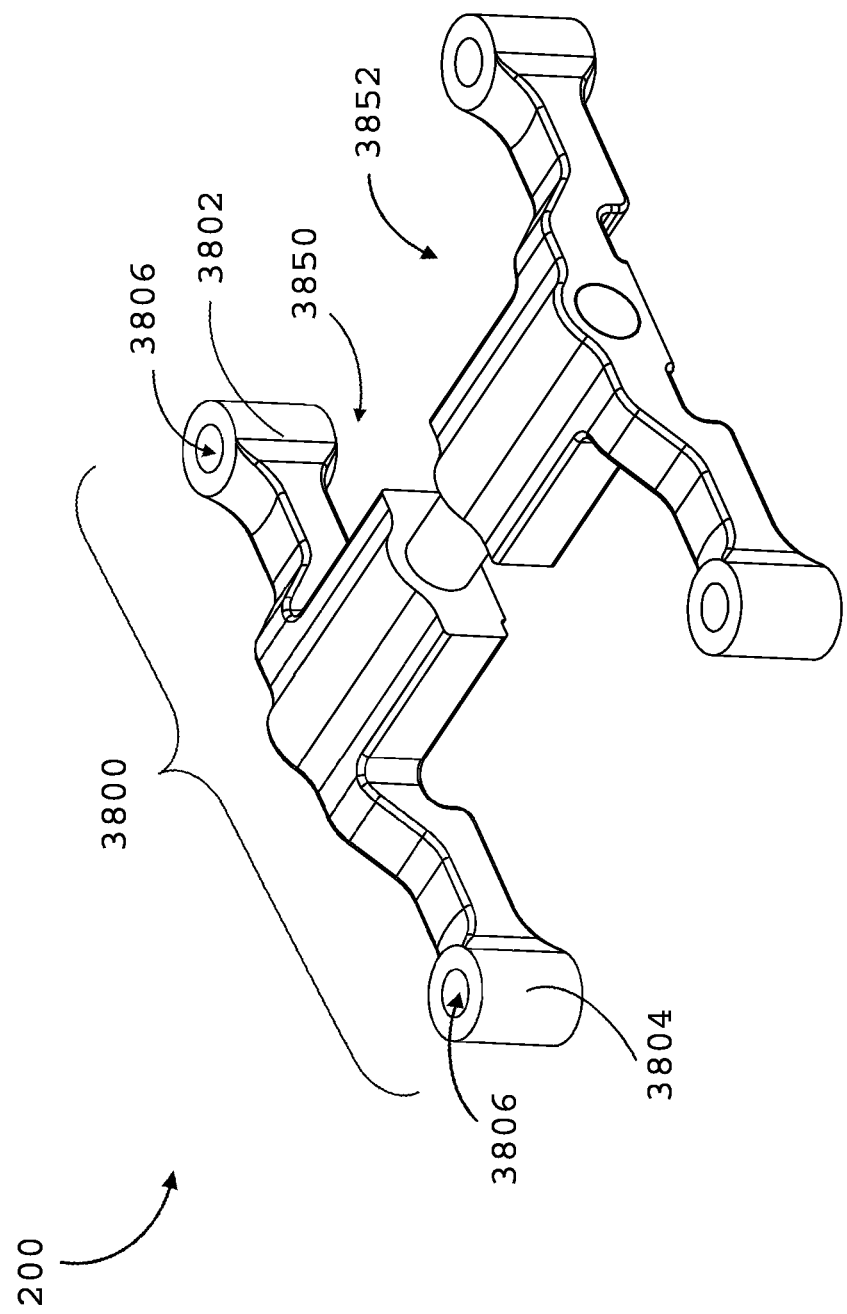
FIG. 38 is a drawing showing a perspective view of a frame for the steering assembly shown in FIG. 37.

Now turning to FIGS. 34 and 35, there is shown the first link member 2302 according to this alternative embodiment. The first link member 2302 comprises a pair of parallel, spaced apart first and second plates 3400 and 3402 connected by a vertical spacing plate 3404 extending orthogonally therebetween. A frame receiving space 3500 is thereby formed between the first plate 3400 and the second plate 3402. As best shown in FIG. 36, this frame receiving space 3500 is adapted for receiving the left frame member 2400, as it will become apparent below.

Figure 28:
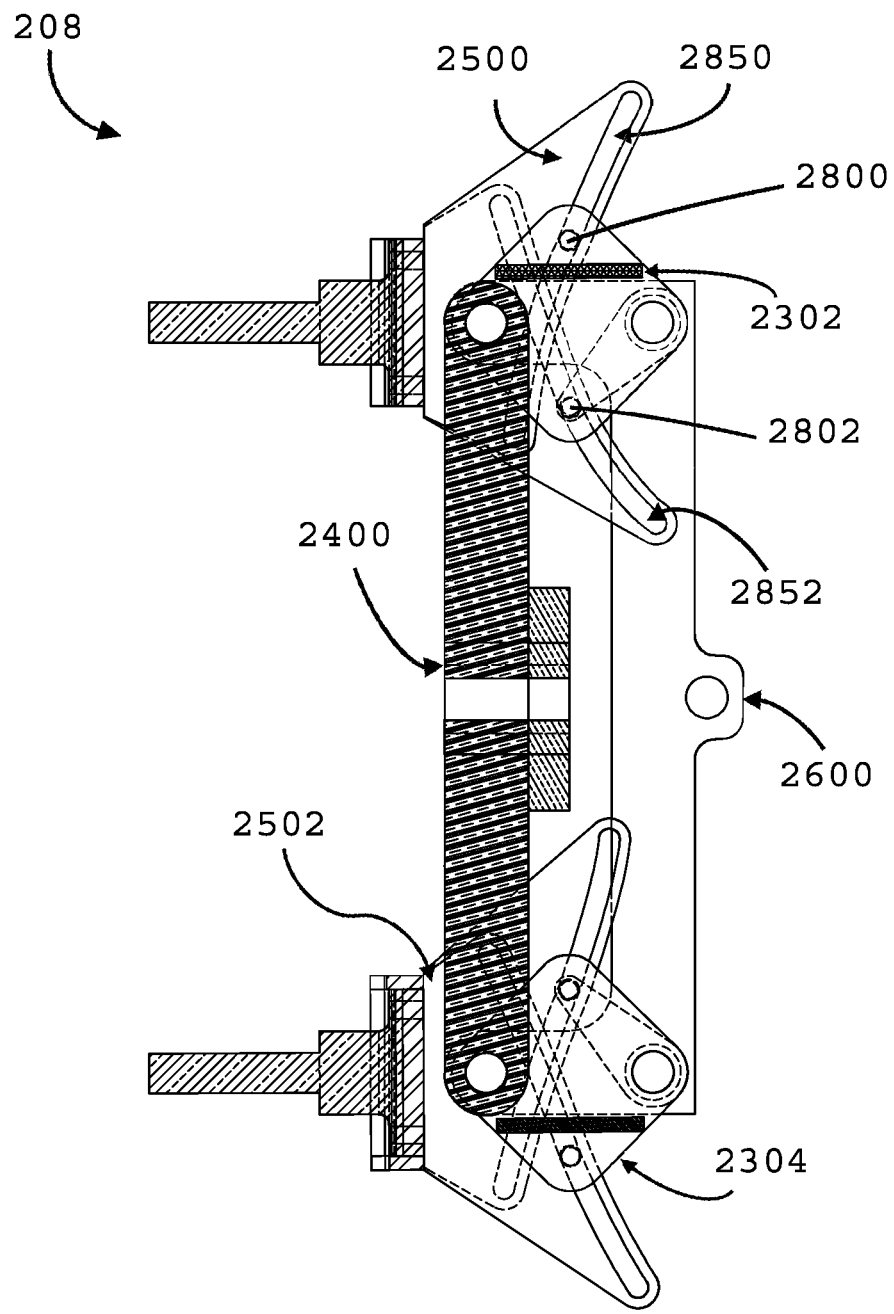
FIG. 28 is a drawing showing a top plan view, cross-sectioned along line XXVIII-XXVIII of FIG. 27, of the left steering assembly portion shown in FIG. 26.
Figure 29:
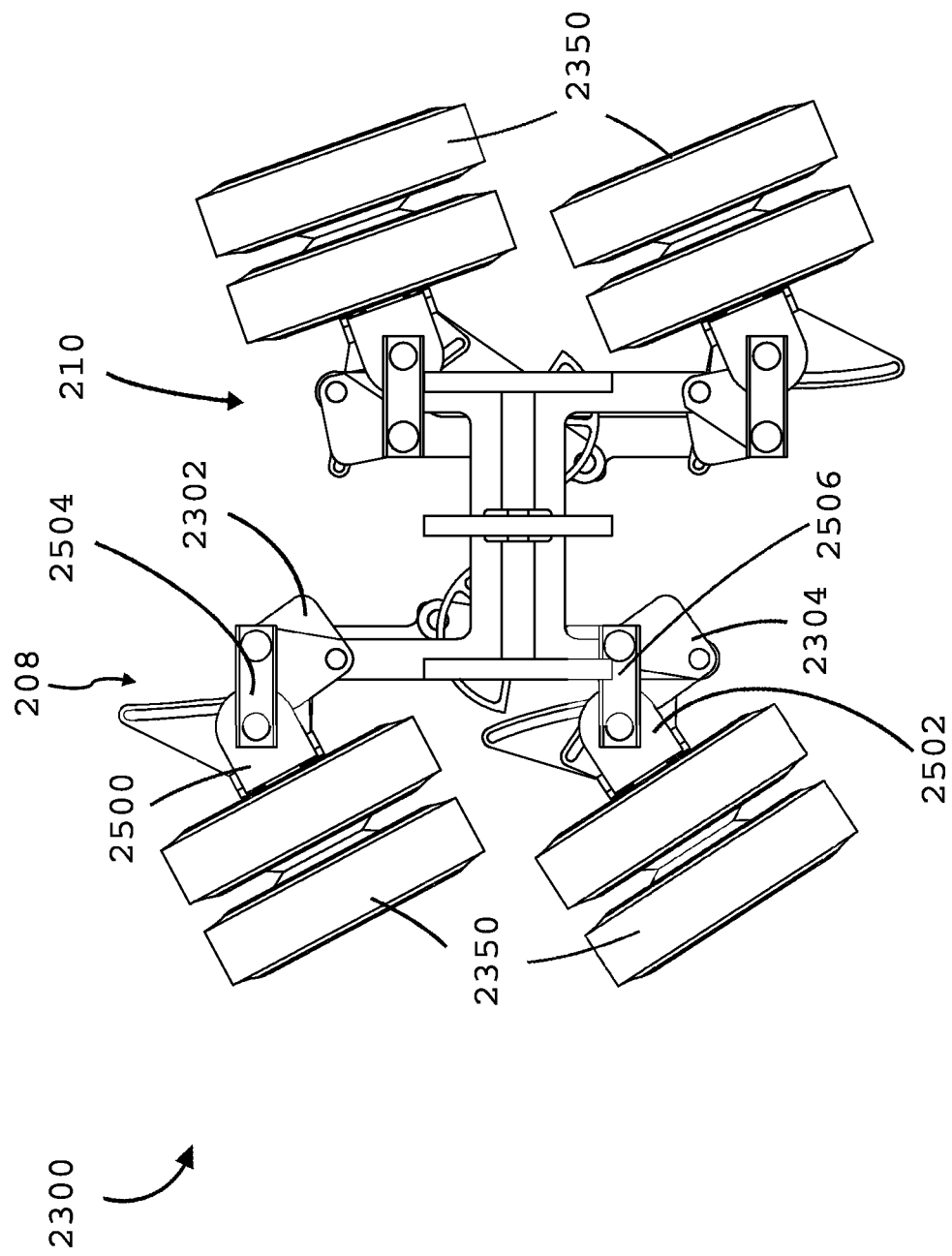
FIG. 29 is a drawing showing a top plan view of the steering assembly shown in FIG. 23, in a second position.
Figure 30:
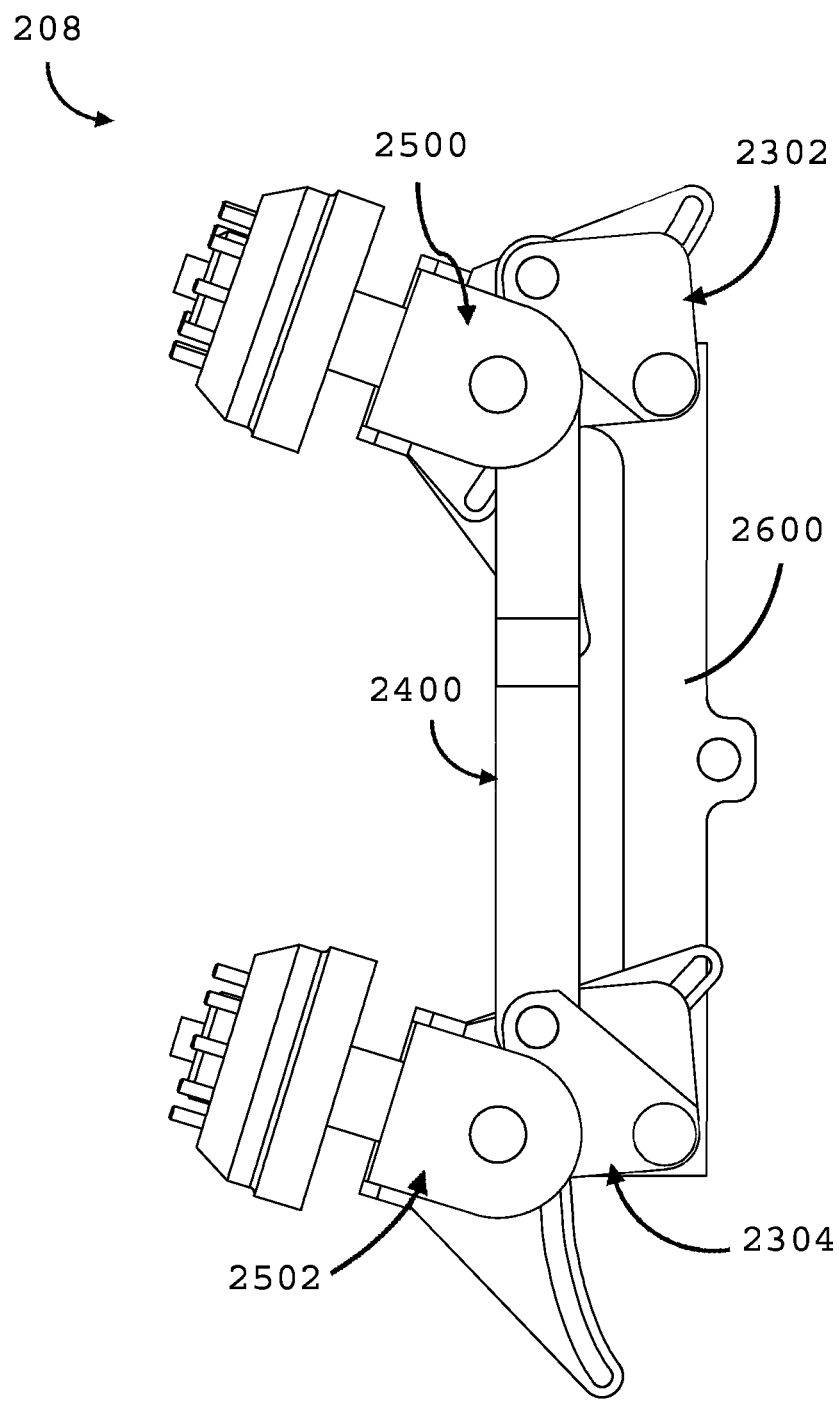
FIG. 30 is a drawing showing a top plan view of a left steering assembly portion of the steering assembly shown in FIG. 29, with the wheels removed.
Figure 31:
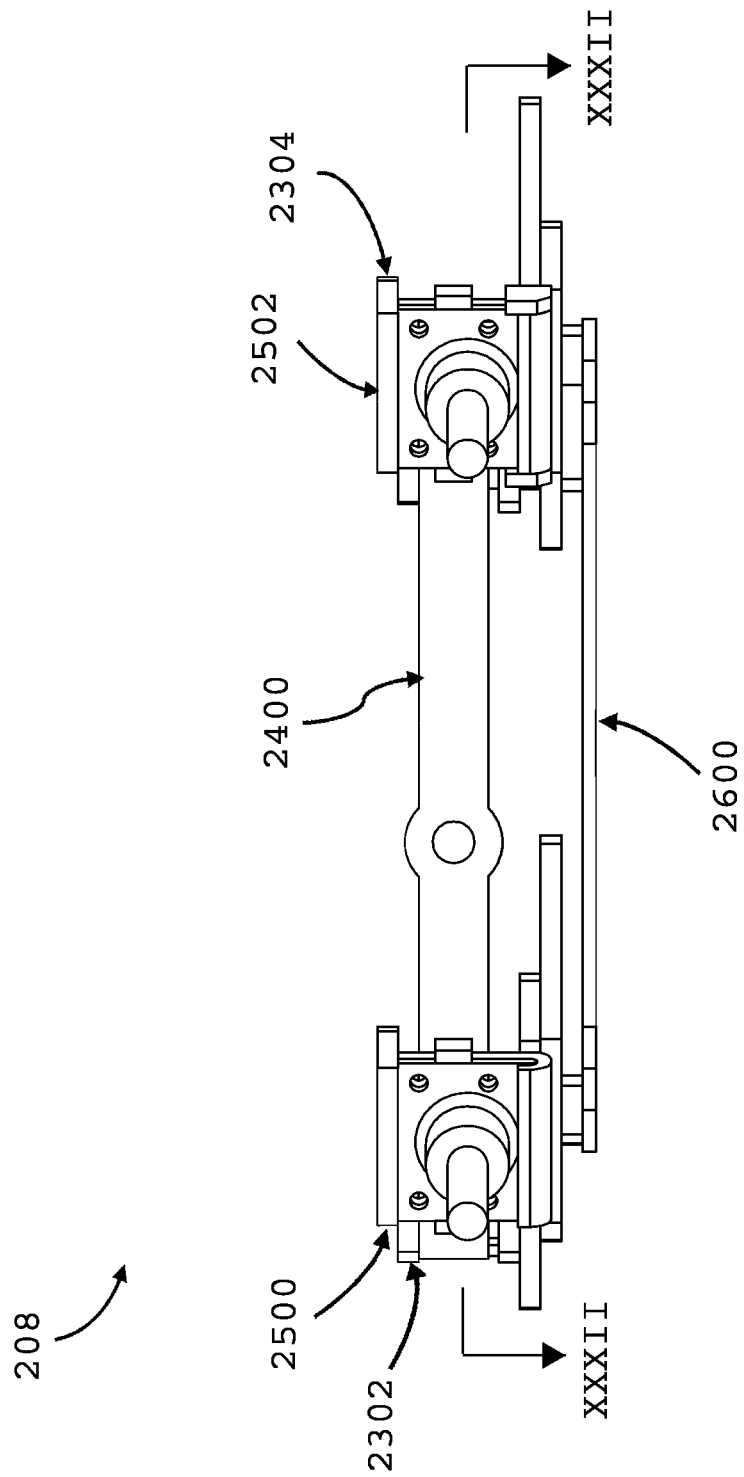
FIG. 31 is a drawing showing a left elevation view of the left steering assembly portion shown in FIG. 30.
Figure 32:
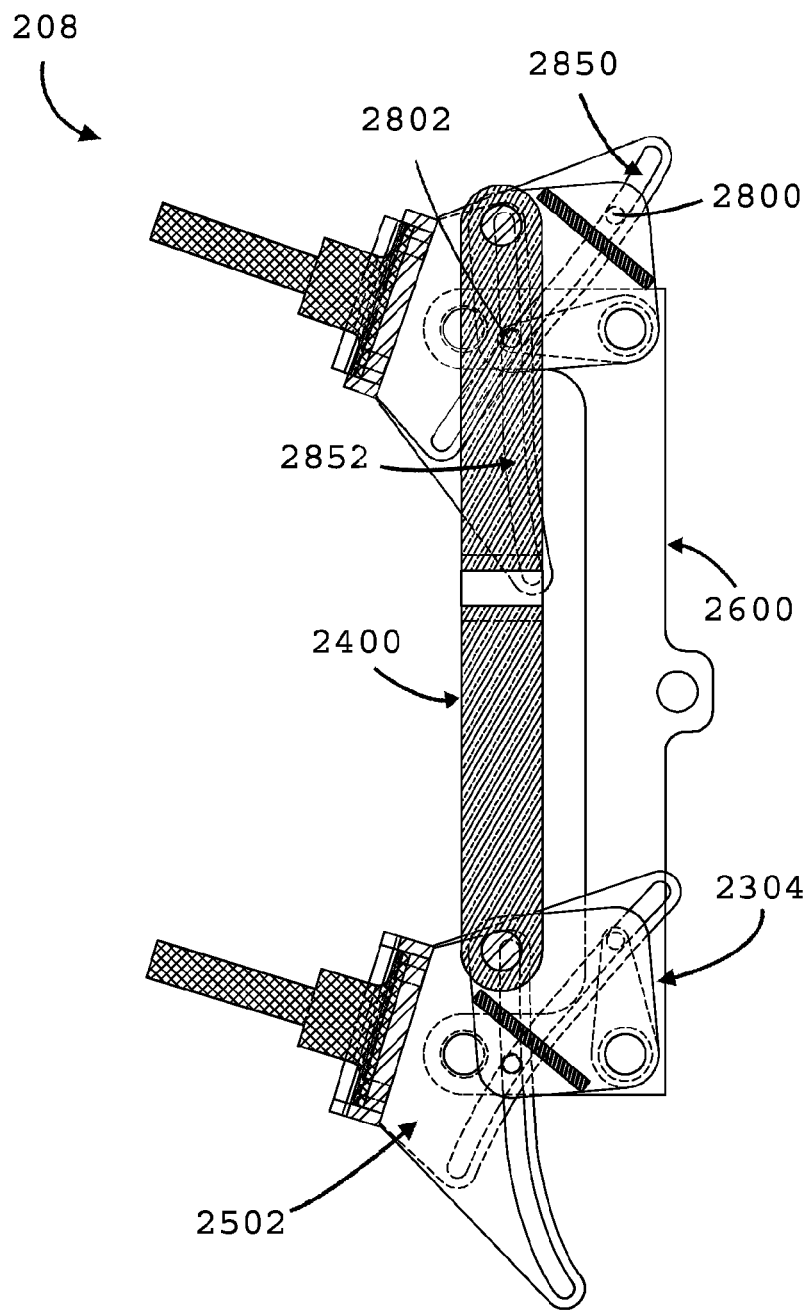
FIG. 32 is a drawing showing a top plan view, cross-sectioned along line XXXII-XXXII of FIG. 31, of the left steering assembly portion shown in FIG. 30.

The first link member 2302 further comprises a third arrowhead-shaped plate 3502, best shown in FIG. 35, extending parallel to the first and second plates 3400, 3402. The third plate 3502 is connected to the second plate 3402 by a tube segment 3504, thereby defining between the second and third plates 3402, 3502 a knuckle receiving space 3506 adapted to be engaged by the bottom portion 3304 of the front left steering knuckle 2500, as best shown in FIG. 36. The first and second pins 2800, 2802 of the first link 2302 extend into the knuckle receiving space 3506, the first pin 2800 extending downwardly from the second plate 3402 and the second pin 2802 extending upwardly from the third plate 3502. The first and second pins 2800, 2802 are adapted to engage the corresponding first and second grooves 2850, 2852 of the steering knuckle 2750, as best shown in FIGS. 28 and 32, and urge pivoting of the wheel, as explained above.

Figure 27:
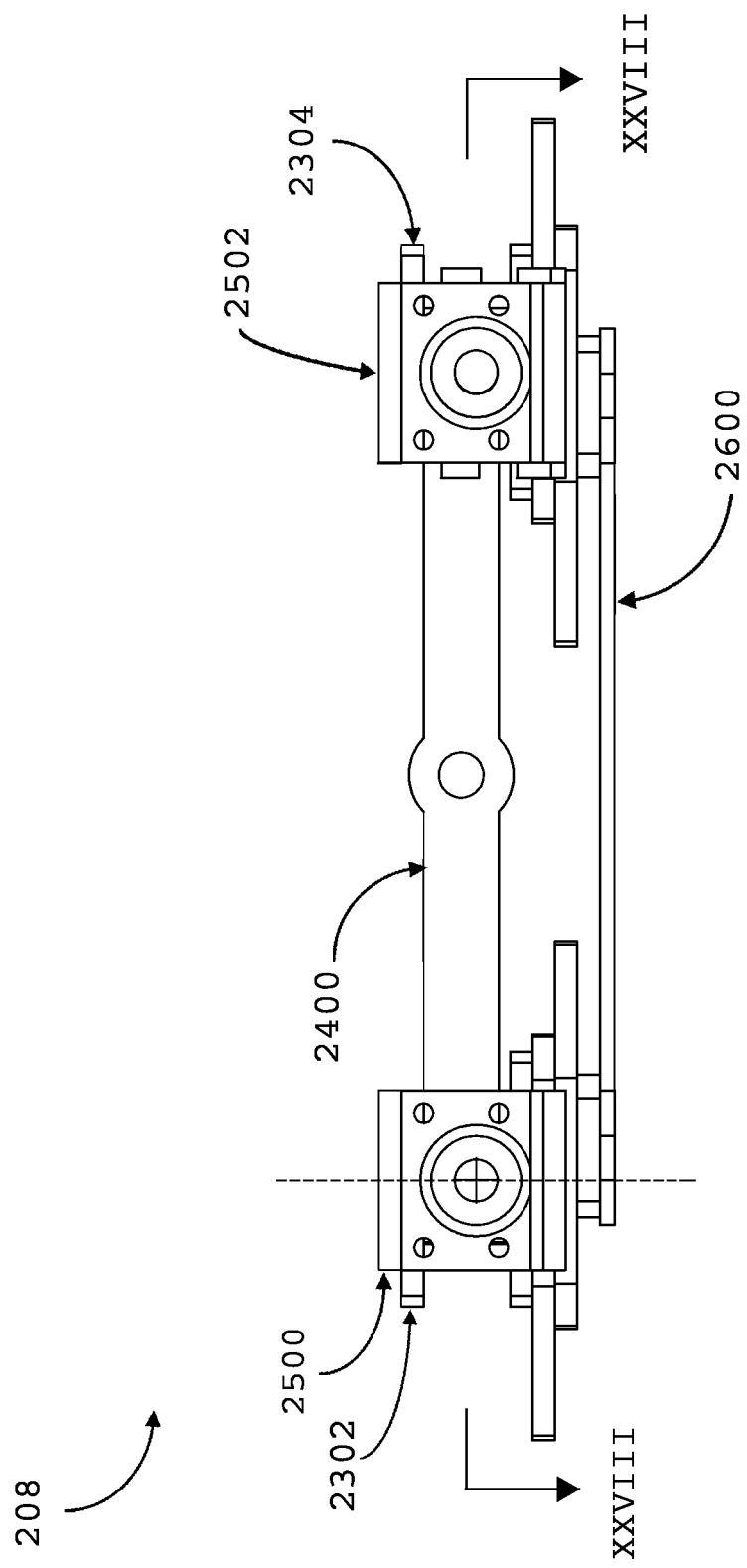
FIG. 27 is a drawing showing a left elevation view of the left steering assembly portion shown in FIG. 26.

Now referring to FIGS. 27 and 36 and still in this alternative embodiment, the left frame portion 2400 engages the frame receiving space 3500 of the first link member 2302 and is pivotally connected thereto. The skilled addressee will appreciate that the second link member 2304 is connected to the left frame portion 2400 according to a similar configuration.

The steering assembly 2300 further comprises an actuator. In this alternative embodiment, the left steering assembly portion 208 comprises a left half wheel 3600 pivotally mounted below the left frame member 2400. The left half wheel 3600 is further pivotally connected to the mounting member 2700 by a crank arm 3602 such that a pivoting of the half wheel displaces the mounting member. In one embodiment, the left half wheel 3600 is pivoted using flexible power transmission means, not shown, such as a belt, a chain, a rope or the like, the flexible power transmission means being actuated by hydraulic cylinders, not shown, and controlled by a control circuit such as the one described above and shown in FIG. 22.

Now turning to FIGS. 37 to 42, there is shown a steering assembly 3700, in accordance with yet another embodiment.

It will be appreciated that the steering assembly 3700 of the present embodiment is substantially similar to the steering assemblies 150, 2300 of the two embodiments described hereinabove. In this embodiment, the steering assembly 3700 comprises a left frame member 3850 pivotally connected to a right frame member 3852 and left and right steering assembly portions 3702, 3704 respectively mounted to the left and right frame members 3850, 3852. A front left wheel 3900, a back left wheel 3902, a front right wheel 3904 and a back right wheel 3906 are further operatively mounted to the steering assembly 3700.

The left frame member 3850 comprises a left longitudinal frame portion 3800 having a front end 3802 and an opposed back end 3804, each having defined therein a vertical pivot hole 3806 for pivotally connecting first and second link members 3706, 3708 to the frame 200.

Figure 39:
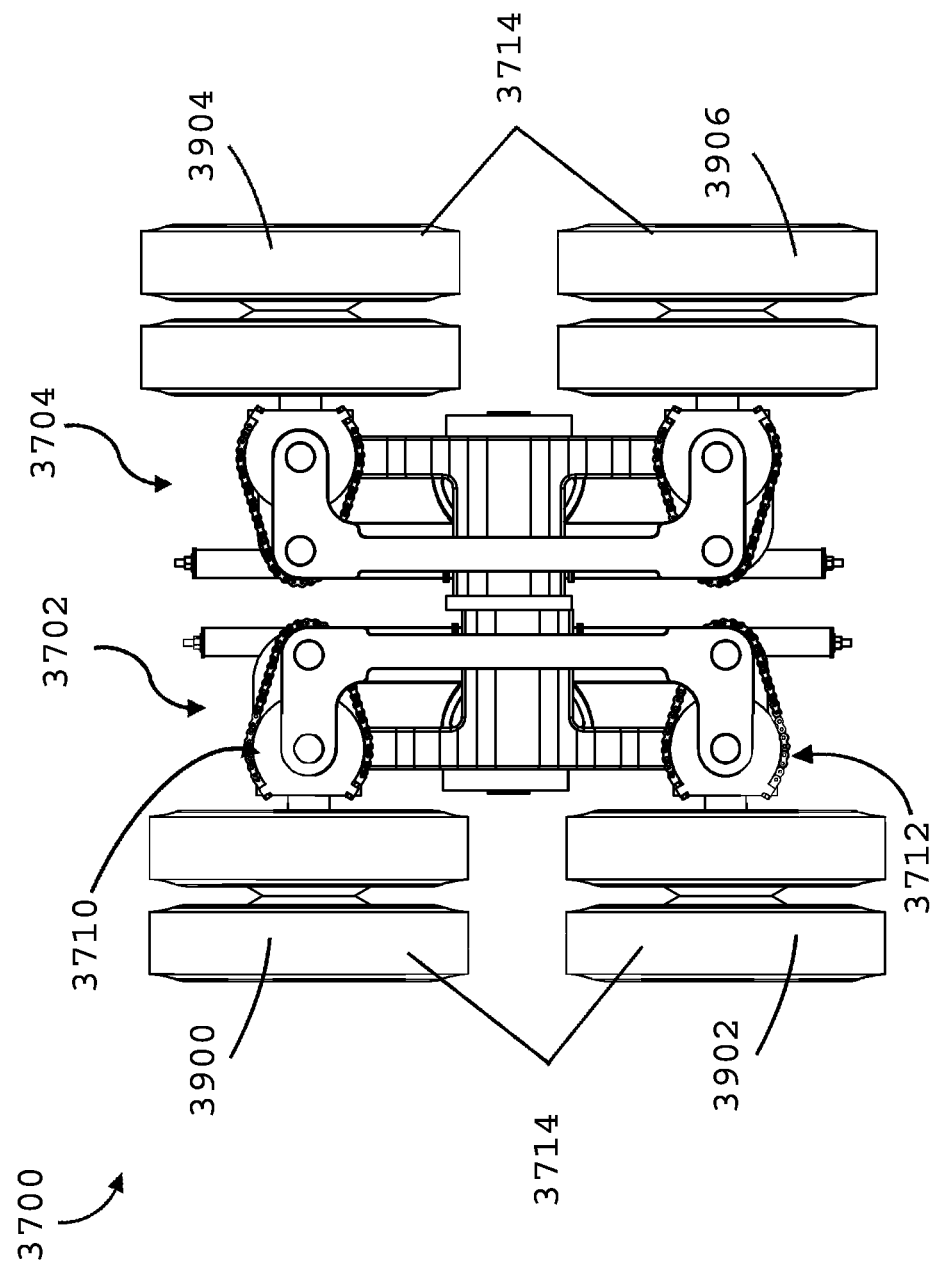
FIG. 39 is a drawing showing a top plan view of the steering assembly shown in FIG. 37, in a first position.
Figure 40:
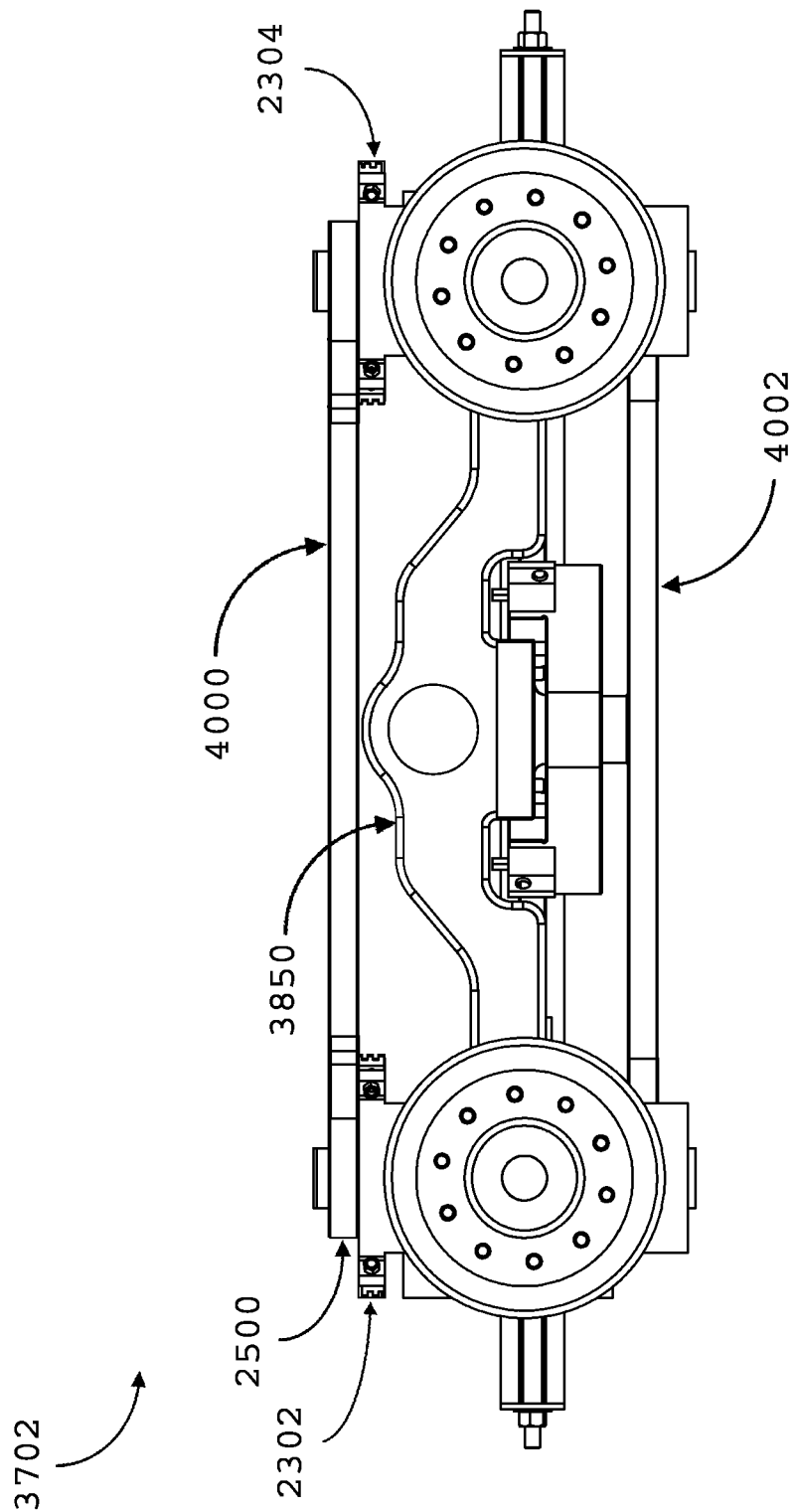
FIG. 40 is a drawing showing a left elevation view of the left steering assembly portion shown in FIG. 37.

As can be appreciated from FIG. 39, the right frame member 3852 is a mirror image of the left frame member 3850 and thus requires no further description.

Still referring to FIGS. 37 to 42, the skilled addressee will appreciate that the configuration of the steering assembly 3700 according to this embodiment is substantially similar to the steering assembly 2300 of the previous embodiment described hereabove. It will be appreciated that since the right steering assembly portion 3704 is substantially similar to the left steering assembly portion 3702, only the left steering assembly portion 3702 needs to be described.

As was the case with the other embodiments described hereinabove, the left steering assembly portion 3702 comprises a swing mechanism. The swing mechanism comprises parallel top and bottom mounting members 4000, 4002 pivotally connecting the left frame member 3850 to a front left steering knuckle 3710 and a back left steering knuckle 3712, each having a wheel 3714 rotatably mounted thereto.

In this configuration, the front and back left steering knuckles 3710, 3712 may therefore be moved along a corresponding arced path, as described hereinabove.

The steering assembly 3700 further comprises a guiding mechanism for pivoting the front left steering knuckle 3710 when the front left steering knuckle 3710 is displaced along its arced path. It will be appreciated that a similar guiding mechanism is provided for the back left steering knuckle 3712, as well as for the steering knuckles of the right steering assembly portion 3704.

Figures 43, 44:
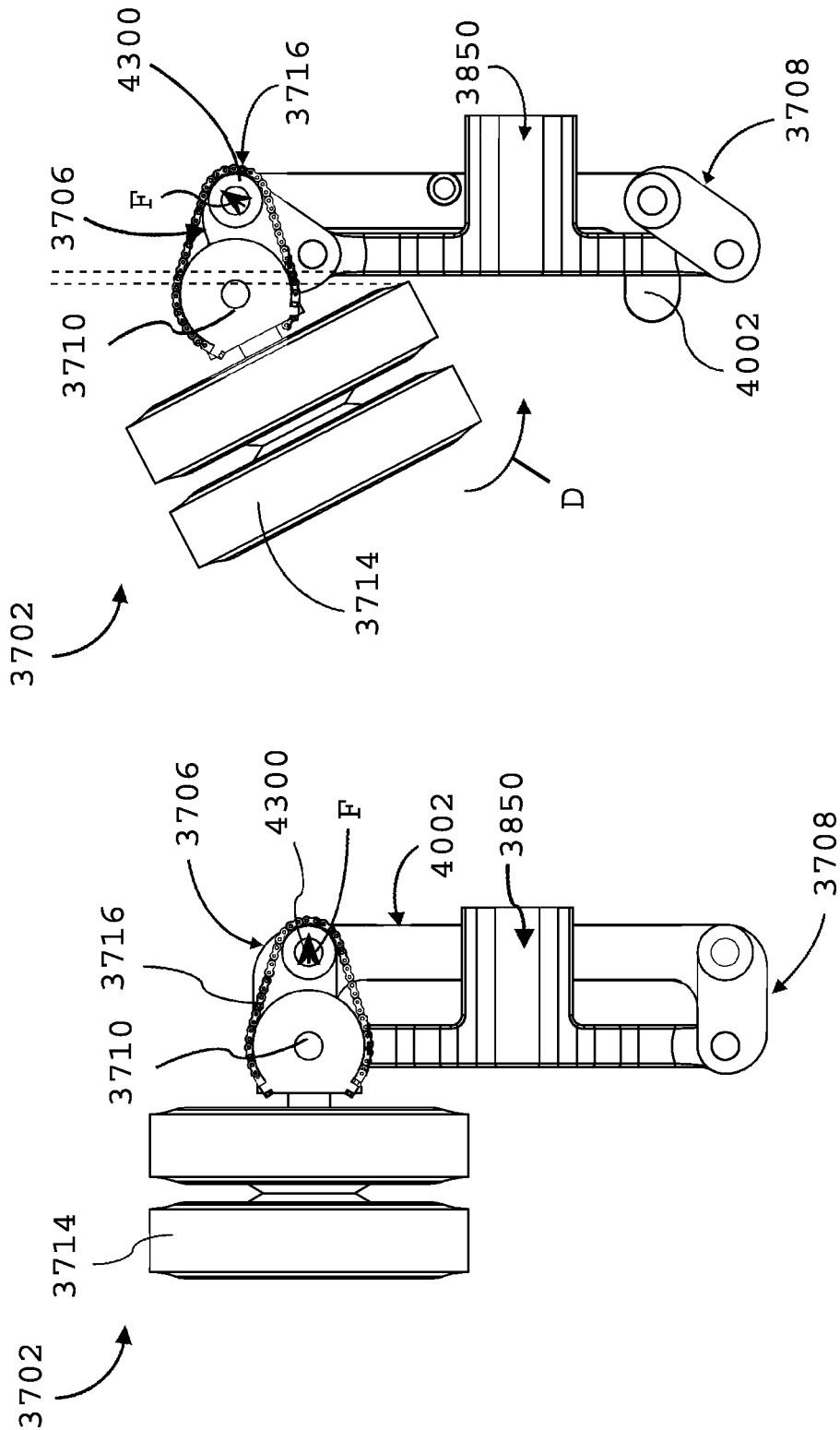
FIG. 43 is a top plan view of the left steering assembly portion shown in FIG. 37, with parts omitted and with the steering knuckle in a first position.
FIG. 44 is a top plan view of the left steering assembly portion shown in FIG. 37, with parts omitted and with the steering knuckle in a second position.
Figure 46:
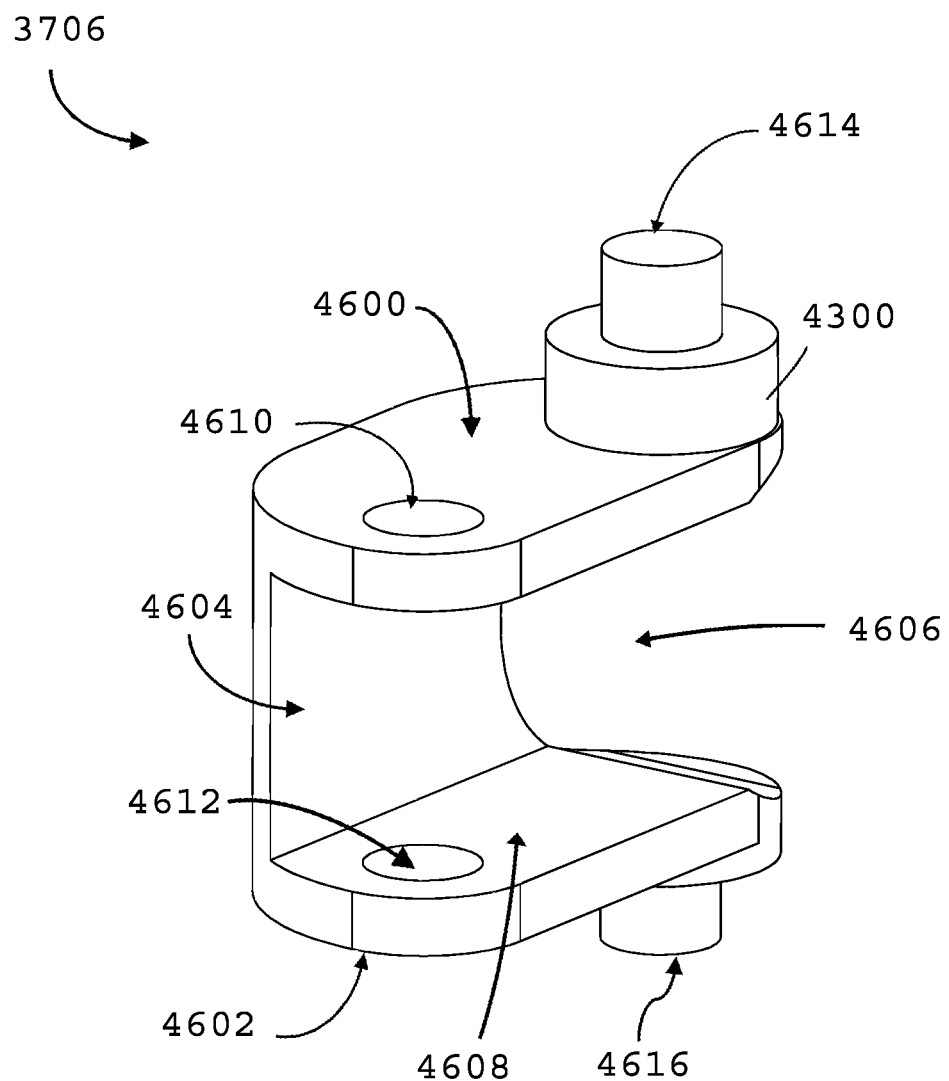
FIG. 46 is a drawing showing a perspective view of a first link member of the steering assembly shown in FIG. 37.

In this embodiment, the guiding mechanism comprises a chain 3716 secured to the front left steering knuckle 3710 and a sprocket 4300, best shown in FIGS. 43 and 46, secured to the first link member 3706. The chain 3716 is looped around the sprocket 4300 and secured thereto such that pivoting of the first link member 3706, and thereby of the sprocket 4300, urges pivoting of the front left steering knuckle 3710.

More specifically and referring to FIGS. 43 and 44, the chain 3716 is secured to the sprocket 4300 at a predetermined location on the chain indicated by arrow F. The chain 3716 may be secured to the sprocket 4300 using a bolt, a screw, a nail or any other fastener suitable for the present application. In this configuration, when the mounting members top and bottom mounting members 4000, 4002 are actuated and therefore when the front left steering knuckle is moved along its arced path, the first link member 3706, and thereby of the sprocket 4300, are pivoted. Tension is therefore created on the chain 3716 and the chain 3716 pulls on one of its end secured to the front left steering knuckle 3710 and causes the front left steering knuckle 3710 to pivot in the direction D.

It will further be appreciated that the pivoting rate of the front left steering knuckle 3710 may be adjusted by varying the diameter of the sprocket 4300. For instance, a greater diameter will provide a greater pivoting rate. The diameter of the sprocket 4300 may therefore be selected to enable the front left and back left steering knuckles 3710, 3712 to pivot such that each wheel 3714 is oriented tangentially to its respective trajectory.

Figure 45:
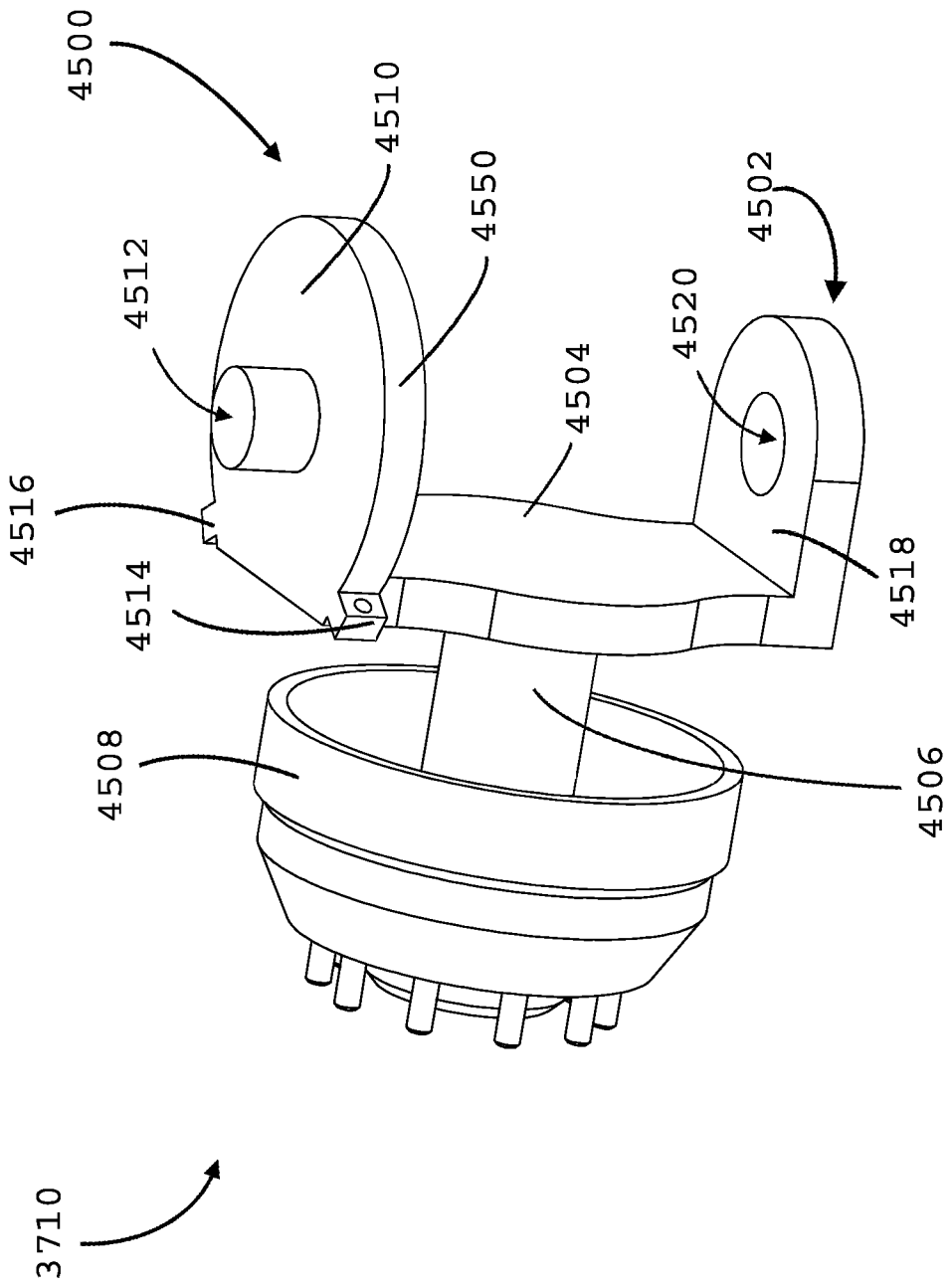
FIG. 45 is a drawing showing a perspective view of a steering knuckle of the steering assembly shown in FIG. 37.

Now turning to FIG. 45, there is shown the front left steering knuckle 3710, in accordance with the present embodiment. The front left steering knuckle 3710 comprises spaced apart top and bottom portions 4500, 4502 extending parallel to each other and a side portion 4504 extending orthogonally between the top and bottom portions 4500, 4502. The front left steering knuckle 3710 further comprises a spindle 4506 extending outwardly from the side portion 4504 and a wheel hub 4508 rotatably connected to the spindle 4506 for receiving the wheel 3714, not shown in FIG. 45, thereon.

The top portion 4500 comprises a generally circular plate 4510 and a peg 4512 projecting upwardly from the center of the circular plate 4510 for pivotally engaging the top mounting member 4000. The top portion 4500 further comprises first and second ears 4514, 4516 which project radially from an outer edge 4550 of the circular plate 4510. Each of the first and second ears 4514, 4516 is for securing one end of the chain 3716, not shown in FIG. 45, thereto.

The bottom portion 4502 comprises a generally semicircular plate 4518 having an opening 4520 adapted to receive a peg, not shown, of the bottom mounting member 4002 therein. It will be appreciated that the peg 4512 of the top portion 4500 and the opening 4520 of the bottom portion 4502 are generally aligned and define a pivot axis of the front left steering knuckle 3710. It will then further be appreciated that the first and second ears 4514, 4516 of the top portion 4500 are positioned such that, when the chain 3716 is secured thereto, tension on one end of the chain 3716 urges the front left steering knuckle 3710 to pivot about its pivot axis in a first direction and tension on the other end of the chain 3716 urges the front left steering knuckle 3710 to pivot about its pivot axis in a second direction opposite the first direction.

Furthermore, since the chain 3716 is also secured to the sprocket 4300 and the front left steering knuckle 3710 is otherwise pivotally connected to the first link member 3706, one skilled in the art will appreciate that angular orientation of the front left steering knuckle 3710 is set by angular orientation of the first link member 3706.

Now turning to FIG. 46, there is shown the first link member 3706, in accordance with the present embodiment. It will be appreciated that the second link member 3708 is a mirror image of the first link member 3706 and therefore need not be described.

Figure 41:
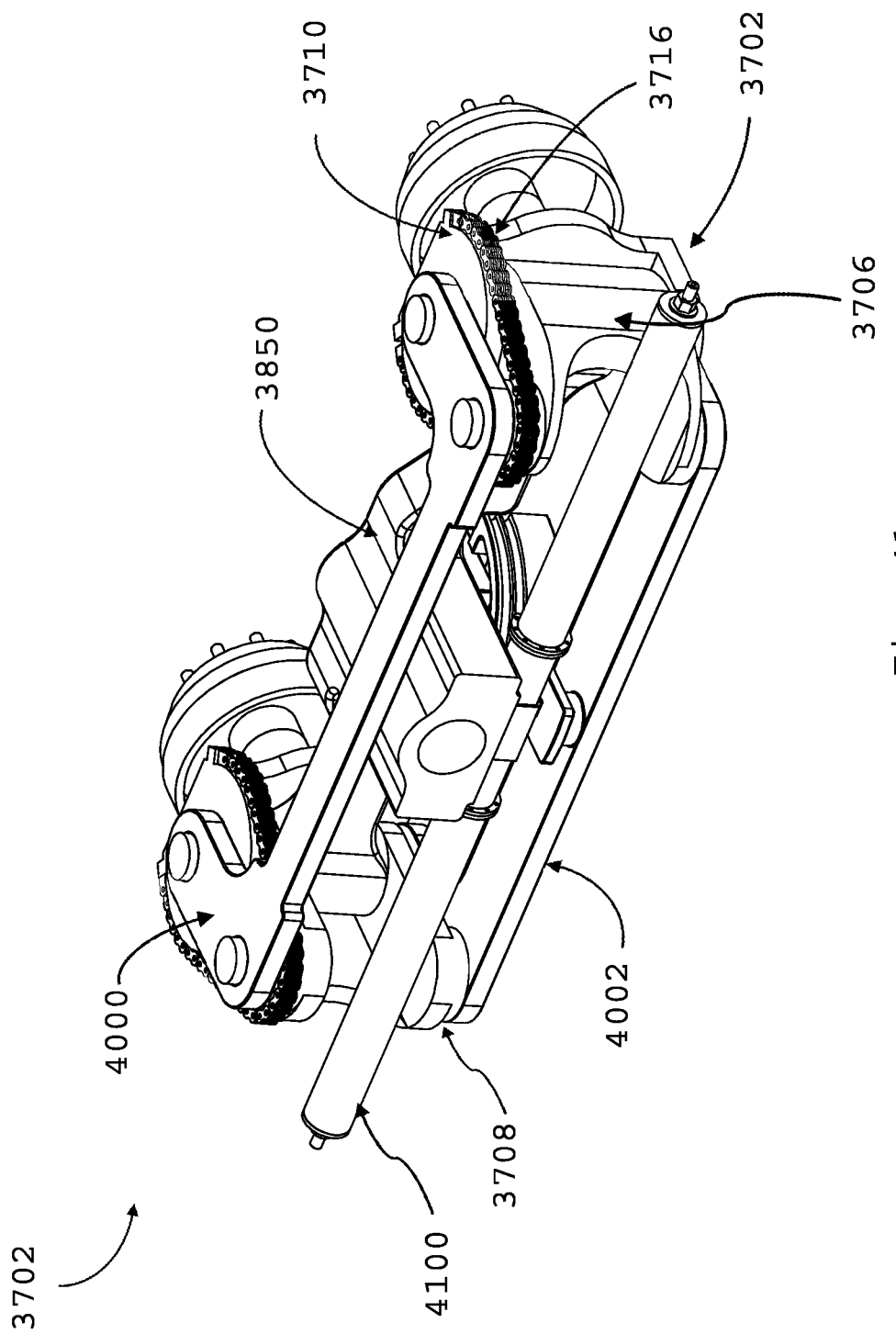
FIG. 41 is a drawing showing a perspective view of the left steering assembly portion shown in FIG. 37.

The first link member 3706 comprises parallel top and bottom panels 4600, 4602 and a side panel 4604 extending therebetween, generally orthogonally to the top and bottom panels 4600, 4602. In the illustrated embodiment, a semicircular indent 4606 is defined in the side panel 4604 to prevent other parts of the left steering assembly portion 3702 from creating interference with the first link member 3706 during movement of the first link member 3706, as best shown in FIG. 41.

Still referring to FIG. 46, a space 4608 is defined between the top panel 4600 and the bottom panel 4602 for receiving the front end 3802 of the left frame member 3850 therein. A first opening 4610 is also defined in the top panel 4600 and a second opening 4612 is defined in the bottom panel 4602. The top and bottom opening are aligned for receiving therethrough a connecting pin, not shown, which simultaneously engages the first opening 4610, the vertical opening 3806 of the left frame member 3850 and the second opening 4612.

In the illustrated embodiment, the sprocket 4300 and the top panel 4600 form a monolithic structure. Alternatively, the sprocket 4300 may instead by fastened to the top panel 4600 using fasteners such as screws, bolts or the like, or by using any other fastening means known to the skilled addressee.

In one embodiment, the sprocket 4300 is toothed to advantageously distribute tension from the chain 3716 to each tooth. Alternatively, the sprocket 4300 may not be toothed.

Still referring to FIG. 46, the first link member 3706 further comprises top and bottom pegs 4614, 4616 for pivotally engaging, respectively, the top and bottom mounting members 4000, 4002.

Figure 47:
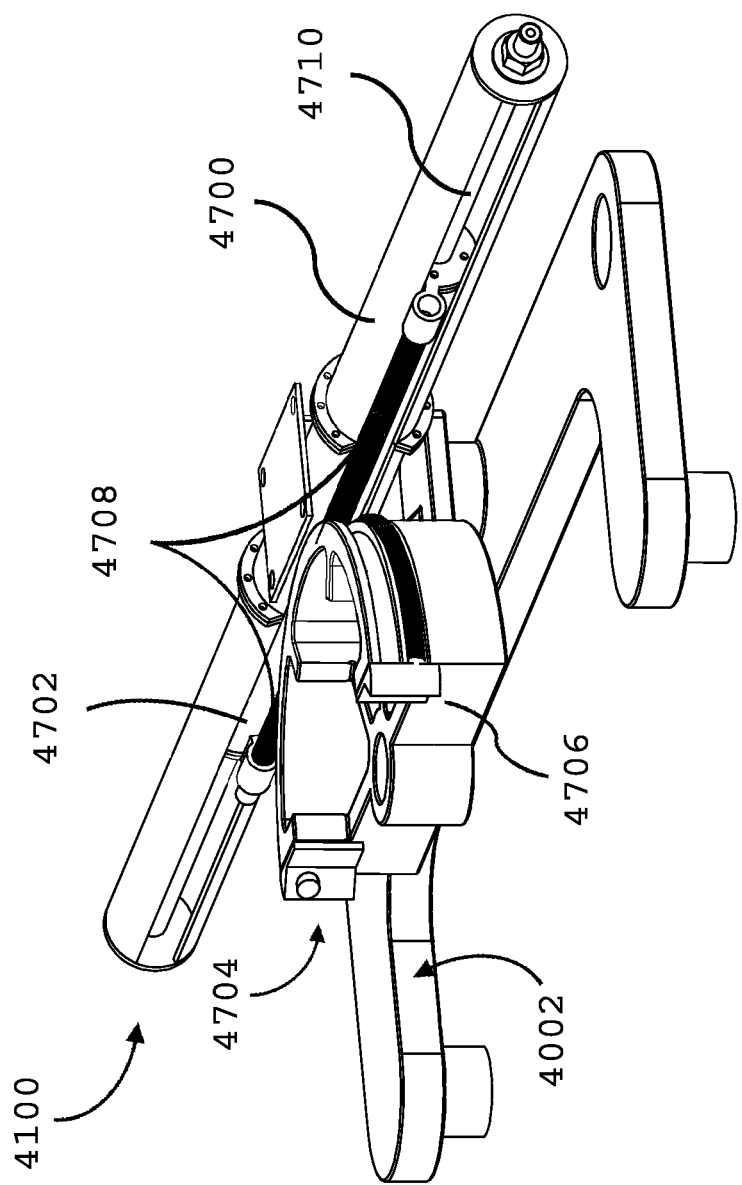
FIG. 47 is a drawing showing a perspective view of the left steering assembly portion shown in FIG. 37, with parts omitted to better show the cylinder and the movement transmission means.

Now referring to FIGS. 41 and 47, the steering assembly 3700 further comprises an actuator for displacing the front left and back left steering knuckles 3710, 3712 along their respective arced path. In the illustrated embodiment, the actuator comprises a left cylinder 4100 for actuating the swing mechanism. More specifically, the left cylinder 4100 comprises a sleeve 4700 secured to the left frame member 3850. A barrel 4702 of the left cylinder 4100 is slidably mounted in the sleeve 4700 and is operatively connected to the bottom mounting member 4002 via movement transmission means 4704.

More specifically, the movement transmission means 4704 comprise a half wheel 4706 pivotally connected to the left frame member 3850 and a plurality of cables 4708 connecting the barrel 4702 to the half wheel 4706.

The left cylinder 4100 further comprises a piston 4710 slidably mounted in the barrel 4702. The piston 4710 is secured to the sleeve 4700 such that activation of the left cylinder 4100, instead of moving the piston 4710 relative to the left frame member 3850, moves the barrel 4702 relative to the left frame member 3850.

In this configuration, when the barrel 4702 is moved linearly along the sleeve 4700, the half wheel 4706, being tied to the barrel 4702 by the plurality of cables 4708, is thereby urged to pivot, which arcuately moves the bottom mounting member 4002. The front left steering knuckle 3710 and the back left steering knuckle 3712 are thereby pivoted accordingly, as described above.

In an alternative embodiment, the barrel 4702 may instead be tied to the half wheel 4706 using chains, belts, or may instead engage the half wheel 4706 in a rack-and-pinion relationship.

In the illustrated embodiment, the left cylinder 4100 comprises a hydraulic cylinder. Alternatively, the actuator may instead comprise a pneumatic cylinder, an electric motor or any other actuator the skilled addressee may deem fit for the present use of the invention.

Referring back to FIG. 42, the actuator further comprises a right cylinder 4200 for actuating the swing mechanism of the right steering assembly portion 3704, thereby pivoting the front and back right steering knuckles accordingly, as described above. The right cylinder 4200 is substantially similar to the left cylinder 4100 and thus requires no further description.

In this embodiment, control means are further provided for controlling actuation of the left and right cylinders 4100, 4200 and for orienting each of the four wheels 3714 tangentially relative to its respective trajectory.

Figure 48:
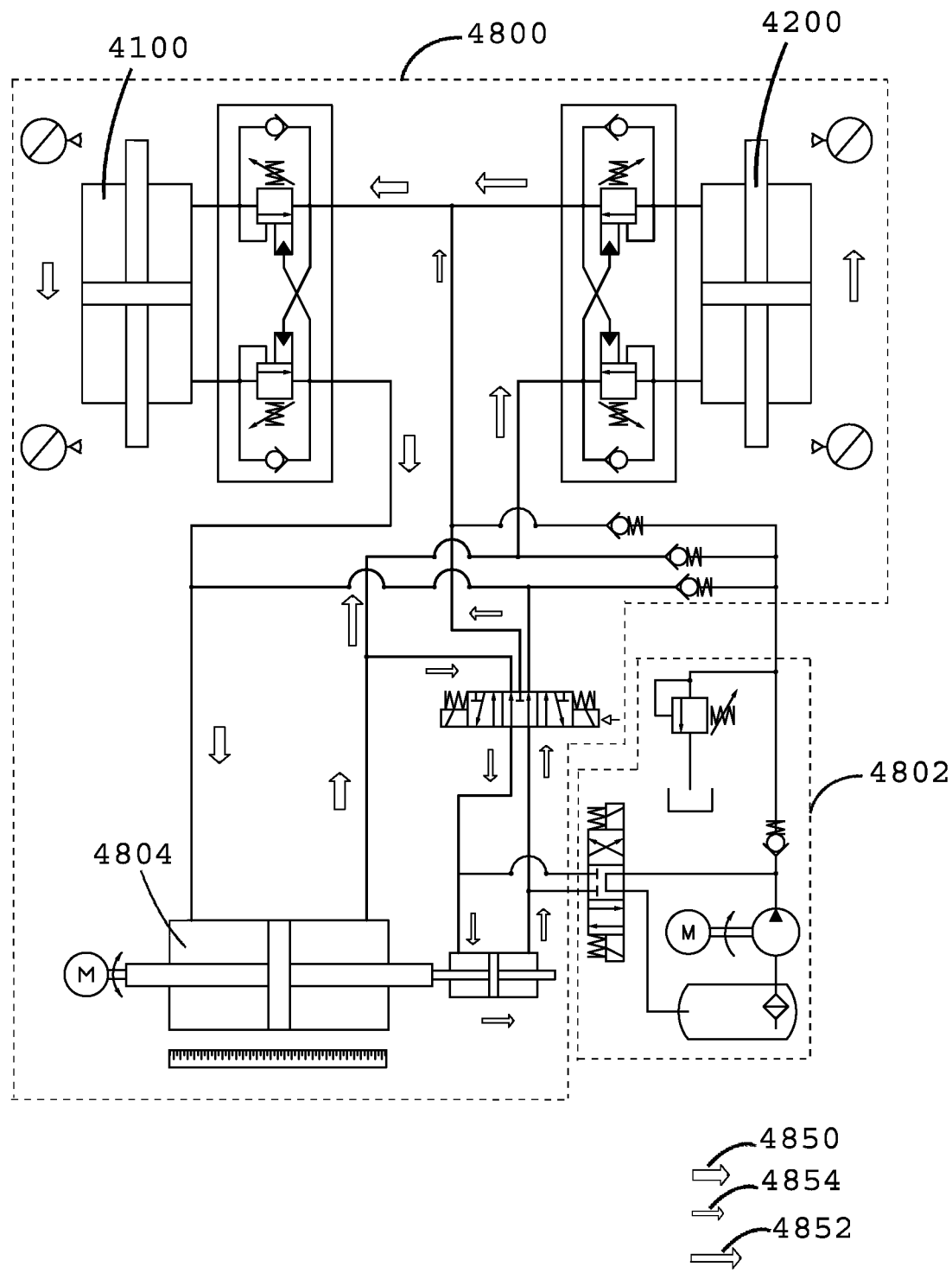
FIG. 48 is a schematic representation showing control means for the steering assembly shown in FIG. 37, with the control means in the left turn position.
Figure 49:
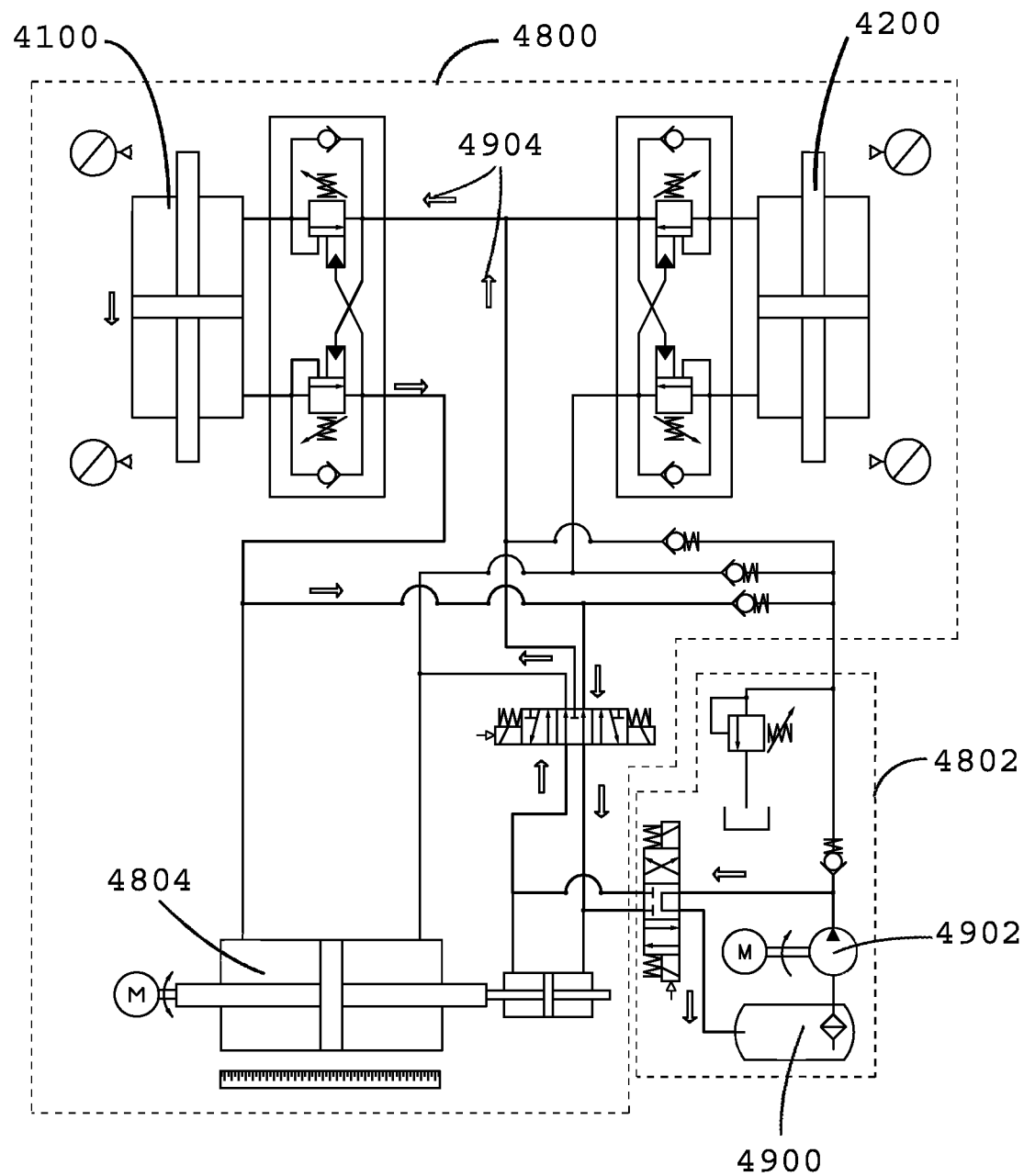
FIG. 49 is a schematic representation showing control means for the steering assembly shown in FIG. 37, with the control means in the left adjustment position.

Now turning to FIGS. 48 and 49, the control means comprise a main control circuit 4800 and an auxiliary control circuit 4802 operatively connected to the main control circuit 4800, both the main control circuit 4800 and the auxiliary control circuit 4802 containing hydraulic fluid such as oil or any other hydraulic fluid known to the skilled addressee. The main control circuit 4800 controls turning of the wheels of the trailer and the auxiliary control circuit 4802 enables the orientation of the wheels 3714 to be adjusted, as it will become apparent below.

In this embodiment, the main control circuit 4800 comprises a master cylinder 4804 which is operatively connected to the left and right cylinders 4100, 4200. The master cylinder 4804 may further be operatively connected to angular position detecting means, such as the sensor 2202, fifth wheel 2204 and kingpin 2206 assembly shown in FIG. 22, for actuating the master cylinder 4804 according to a turning angle of the tractor truck relative to the trailer, as explained above.

When making a left turn, the front left wheel 3900 and the back left wheel 3902 of the trailer respectively follow first and second trajectories and the front right wheel 3904 and the back right wheel 3906 respectively follow third and fourth trajectories. It will be appreciated that while all the trajectories have the same center of turn, each of the first and second trajectories has a substantially greater radius of turn than the third and fourth trajectories. In the illustrated embodiment, the control means are adapted for enabling the left wheels to be turned at an angle different from the right wheels in order for each wheel to be oriented according to its respective trajectory.

For instance, FIG. 48 shows the control means in a left turn position, which corresponds to the trailer making a left turn. It will be appreciated that when the trailer makes a right turn, the control means is positioned in a right turn position, which is substantially the opposite of the left turn position. Therefore, only the left turn position will be described hereinafter.

In the illustrated position, the master cylinder 4804 is actuated to provide fluid at a first flow rate, represented by arrows 4850 in FIG. 48, in the main control circuit 4800. The fluid at the first flow rate 4850 is then divided in the main control circuit 4800 between a first fluid portion, which is represented by arrows 4854 in FIG. 48, having a second flow rate lower than the first flow rate and a second fluid portion, which is represented by arrows 4852 in FIG. 48, having a third flow rate also lower than the first flow rate.

The first fluid portion 4854 is directed through the main control circuit 4800 towards the left cylinder 4100 and the second fluid portion 4852 is directed through the main control circuit 4800 towards the right cylinder 4200. In the illustrated embodiment, the main control circuit 4800 is configured such that the flow rate of fluid exiting from the right cylinder 4200 is similar to the flow rate of fluid entering the right cylinder 4200, i.e. the flow rate of the second fluid portion 4852. Fluid exiting the right cylinder 4200 is also directed towards the left cylinder 4100, such that fluid exiting the right cylinder 4200, which is at the third flow rate of the second fluid portion 4852, and the first fluid portion 4854, which is at the second flow rate, both actuate the left cylinder 4100. It will therefore be appreciated that the left cylinder 4100 is actuated by fluid at the first flow rate 4850, which is substantially the sum of the second and third flow rates.

Therefore, the left cylinder 4100 is actuated by fluid at the first flow rate 4850, while the right cylinder 4200 is actuated by the second fluid portion 4852 at the third flow rate, which is lower than the first flow rate. This enables the front and back left wheels 3900, 3902, which are operatively connected to the left cylinder 4100, to be oriented at greater angles than the front and back right wheels 3904, 3906.

This configuration therefore advantageously enables the front and back left wheels 3900, 3902 to be oriented to respectively follow the first and second trajectories while enabling the front and back right wheels 3904, 3906 to be oriented to respectively follow the third and fourth trajectories, each of which has a radius of turn greater than the first and second trajectories, as explained above.

It will be appreciated that in this configuration, the left cylinder 4100 and the right cylinder 4200 are operatively interconnected via the main control circuit 4800. This enables the left cylinder 4100 to be further guided by position of the right cylinder 4200, and vice versa, in order to ensure that the wheels are oriented tangentially to their respective trajectory.

For instance, during a left turn, the front left wheel 3900 may be oriented at a first angle to follow the first trajectory. In this case, the control means ensures that the front right wheel 3904 is oriented at a second angle corresponding to the third trajectory. The control means are therefore set to orient the left wheels at a predetermined angle according to the angle of the right wheels, and vice versa.

This predetermined angle may be determined using parameters such as the distance between the left wheels 3900, 3902 and the right wheels 3904, 3906. The skilled addressee will indeed appreciate that if the left wheels 3900, 3902 are further spaced from the right wheels 3904, 3906, the difference between the radii of turn of the left wheels 3900, 3902 and the right wheels 3904, 3906 will increase.

In the illustrated embodiment, the auxiliary control circuit 4802 further enables a user to adjust this predetermined angle, as it will become apparent below. This advantageously enables the main control circuit 4800 to be recalibrated such that it may properly orient the left wheels at the predetermined angle relative to the right wheels, for instance in case of loss of hydraulic fluid from the main control circuit 4800.

Now referring to FIG. 49, there is shown the control means in a left adjustment position, which enables the user to adjust the orientation of the left wheels 3900, 3902 relative to the right wheels 3904, 3906.

The auxiliary control circuit 4802 comprises a reservoir 4900 containing hydraulic fluid and a pump 4902 operatively coupled to the reservoir 4900 for directing hydraulic fluid towards the left cylinder 4100. In this configuration, the left cylinder 4100 is therefore actuated while the right cylinder 4200 remains unactuated, thereby enabling the left wheels 3900, 3902 to be moved without moving the right wheels 3904, 3906 in order to adjust the orientation of the left wheels 3900, 3902 relative to the right wheels 3904, 3906. It will be appreciated that the pump 4902 may be activated using automatic activation means such as an electronic controller or any other automatic activation means known to the skilled addressee. Alternatively, the pump 4902 may be activated manually by the operator.

In the embodiment illustrated in FIG. 49, the hydraulic fluid is directed towards the left cylinder 4100 in a first direction, represented by arrows 4904, for moving the left cylinder 4100 in a first direction. It will however be appreciated that the hydraulic fluid may alternatively be directed towards the left cylinder 4100 in a second direction opposite the first direction. Furthermore, the hydraulic fluid may alternatively be directed towards the right cylinder 4200 instead of the left cylinder 4100 in order such that the right cylinder 4200 may be actuated while the left cylinder 4100 remains unactuated.

The skilled addressee will appreciate that the control means, as described hereinbefore, are merely provided as an example and that other configurations are possible.

It will therefore be appreciated that the steering assembly disclosed herein has many advantages. The steering assembly reduces substantially the slippage or scrubbing of tires on the ground by orienting the wheels tangentially to their trajectory. This contributes to increasing the lifespan of tires and may lead to a substantial reduction of the cost associated with using or commercially exploiting a trailer.

Furthermore, by orienting the wheels of the trailer such that the trailer may follow the trajectory of the tractor truck advantageously reduces the amount of space required to maneuver the trailer, especially during relatively tight turns.

By providing a manual mode of control, the steering assembly further facilitates maneuvering of large vehicles in dense areas and narrow thoroughfares, which is also a great advantage. Also, the steering assembly enables the wheels to be oriented at a relatively great angle, which advantageously improves the maneuverability of the trailer.

Although the above description relates to a specific preferred embodiment as presently contemplated by the inventor, it will be understood that the invention in its broad aspect includes mechanical and functional equivalents of the elements described herein.

The invention claimed is:

1. A steering assembly for steering a vehicle, the steering assembly comprising:
   a first frame member securely connected to a chassis of the vehicle;
   a first steering knuckle comprising a first spindle having a first wheel rotatably mounted thereto;
   a first swing mechanism operatively connecting the first steering knuckle to the first frame member for enabling displacement of the first steering knuckle along a first arced path having a first radius of curvature, the first steering knuckle being pivotally connected to the first swing mechanism for enabling the first wheel to be oriented in a first desired orientation relative to the vehicle, the first arced path being concave relative to a central longitudinal axis of the vehicle and spaced from the first frame member, away from the central longitudinal axis of the vehicle, by a distance sufficient to prevent the first wheel from contacting the first frame member when the first steering knuckle is pivoted;
   a first guiding mechanism operatively connecting the first steering knuckle and the first swing mechanism for pivoting the first steering knuckle when the first steering knuckle is displaced along the first arced path in order to maintain the first wheel oriented tangentially relative to the first arced path; and
   an actuator operatively connected to the first swing mechanism for displacing the first steering knuckle along the first arced path, and thereby pivoting the first steering knuckle, until the first wheel is oriented in the desired orientation to thereby steer the vehicle in a desired direction.

2. The steering assembly as claimed in claim 1 further comprising:
   a second steering knuckle comprising a second spindle having a second wheel rotatably mounted thereto, the first swing mechanism further operatively connecting the second steering knuckle to the first frame member for enabling displacement of the second steering knuckle along a second arced path having a second radius of curvature similar to the first radius of curvature, the second steering knuckle being pivotally connected to the first swing mechanism for enabling the second wheel to be oriented in a second desired orientation relative to the vehicle, the second arced path being concave relative to the central longitudinal axis of the vehicle and spaced from the first frame member, away from the central longitudinal axis of the vehicle, by a distance sufficient to prevent the second wheel from contacting the first frame member when the second steering knuckle is pivoted; and
   a second guiding mechanism operatively connecting the second steering knuckle and the first swing mechanism for pivoting the second steering knuckle when the second steering knuckle is displaced along the second arced path in order to maintain the second wheel oriented tangentially relative to the second arced path.

3. The steering assembly as claimed in claim 1, wherein the first swing mechanism further comprises:
   first and second link members pivotally connected to the first frame member and extending towards the central longitudinal axis of the vehicle; and
   a mounting member pivotally connected to the first and second link members in order to enable arcuate movement of the mounting member while maintaining the mounting parallel to the frame member, the first and second steering knuckles being pivotally connected to the mounting member.

4. The steering assembly as claimed in claim 3, wherein the mounting member is C-shaped and comprises first and second mounting portions extending away from the central longitudinal axis of the vehicle, the first steering knuckle being pivotally connected to the first mounting portion and the second steering knuckle being pivotally connected to the second mounting portion.

5. The steering assembly as claimed in claim 3, wherein the first guiding mechanism comprises a first guiding element associated with the first steering knuckle and a second guiding element associated with the first link member, the first and second guiding elements being operatively engaged together.

6. The steering assembly as claimed in claim 5, wherein the second guiding mechanism comprises a third guiding element associated with the second steering knuckle and a fourth guiding element associated with the second link member, the third and fourth guiding elements being operatively engaged together.

7. The steering assembly as claimed in claim 6, wherein the second guiding element is different from the fourth guiding element for enabling the first wheel to be oriented tangentially to a trajectory of the first wheel and the second wheel to be oriented tangentially to a trajectory of the second wheel, the trajectory of the first wheel being different from the trajectory of the second wheel.

8. The steering assembly as claimed in claim 5, wherein the first guiding element comprises a groove defined in the first steering knuckle and the second guiding element comprises a pin projecting from the first link member, the pin being adapted for slidingly engaging the groove such that pivoting of the first link member moves the pin along the groove, thereby urging pivoting of the first steering knuckle.

9. The steering assembly as claimed in claim 5, wherein the first guiding element comprises a first chain secured to the first steering knuckle and the second guiding element comprises a first sprocket securely connected to the first link member, the first chain being secured to the first sprocket such that pivoting of the first link member, and thereby of the first sprocket, urges pivoting of the first steering knuckle.

10. The steering assembly as claimed in claim 9, wherein the third guiding element comprises a second chain secured to the second steering knuckle and the fourth guiding element comprises a second sprocket securely connected to the second link member, the second chain being secured to the second sprocket such that pivoting of the second link member, and thereby of the second sprocket, urges pivoting of the second steering knuckle.

11. The steering assembly as claimed in claim 10, wherein the first sprocket has a diameter greater than the second sprocket for enabling the first wheel to be oriented in a first orientation while the second wheel is oriented in a second orientation different from the first orientation.

12. The steering assembly as claimed in claim 2, further comprising:
   a second frame member securely connected to the chassis of the vehicle;
   a third steering knuckle comprising a third spindle having a third wheel rotatably mounted thereto;
   a second swing mechanism operatively connecting the third steering knuckle to the second frame member for enabling displacement of the third steering knuckle along a third arced path having a third radius of curvature similar to the first and second radii of curvature, the second steering knuckle being pivotally connected to the second swing mechanism for enabling the third wheel to be oriented in a third desired orientation relative to the vehicle, the third arced path being concave relative to the central longitudinal axis of the vehicle and spaced from the second frame member, away from the central longitudinal axis of the vehicle, by a distance sufficient to prevent the third wheel from contacting the second frame member when the third steering knuckle is pivoted;

a third guiding mechanism operatively connecting the third steering knuckle and the second swing mechanism for pivoting the third steering knuckle when the third steering knuckle is displaced along the third arced path in order to maintain the third wheel oriented tangentially relative to the third arced path;

further wherein the actuator is operatively connected to the second swing mechanism for displacing the third steering knuckle along the third arced path, and thereby pivoting the third steering knuckle, until the third wheel is oriented in the desired orientation to thereby steer the vehicle in the desired direction.

13. The steering assembly as claimed in claim 12 further comprising:

a fourth steering knuckle including a fourth spindle having a fourth wheel rotatably mounted thereto, the second swing mechanism further operatively connecting the fourth steering knuckle to the second frame member for enabling displacement of the fourth steering knuckle along a fourth arced path having a fourth radius of curvature similar to the first, second and third radii of curvature, the fourth steering knuckle being pivotally connected to the second swing mechanism for enabling the fourth wheel to be oriented in a fourth desired orientation relative to the vehicle, the fourth arced path being concave relative to the central longitudinal axis of the vehicle and spaced from the second frame member, away from the central longitudinal axis of the vehicle, by a distance sufficient to prevent the fourth wheel from contacting the second frame member when the fourth steering knuckle is pivoted; and a fourth guiding mechanism operatively connecting the fourth steering knuckle and the second swing mechanism for pivoting the fourth steering knuckle when the fourth steering knuckle is displaced along the fourth arced path in order to maintain the fourth wheel oriented tangentially relative to the fourth arced path.

14. The steering assembly as claimed in claim 13, wherein the first, second, third and fourth guiding mechanism are respectively adapted to pivot a corresponding steering knuckle at a predetermined pivoting rate such that, during turning of the vehicle travelling on a ground surface, each of the first, second, third and fourth wheel is oriented tangentially relative to a respective trajectory of the corresponding wheel, thereby preventing slippage of the first, second, third and fourth wheels on the ground surface.

15. The steering assembly as claimed in claim 12, wherein the first frame member is pivotally connected to the second frame member for enabling the first frame member to pivot relative to the second frame member about a frame pivot axis extending perpendicularly to the central longitudinal axis of the vehicle and parallel to a ground surface.

16. The steering assembly as claimed in claim 12, wherein the actuator comprises a first cylinder adapted to actuate the first swing mechanism and a second cylinder adapted to actuate the second swing mechanism.

17. The steering assembly as claimed in claim 16, wherein the first and second cylinders are hydraulic cylinders.

18. The steering assembly as claimed in claim 16, wherein each one of the first and second cylinders comprises:

a sleeve secured to a corresponding frame member;

a barrel slidably mounted in the sleeve and operatively connected to a corresponding mounting member via movement transmission means; and a piston slidably mounted in the barrel, the piston being secured to the sleeve such that activation of the corresponding cylinder moves the barrel linearly along the sleeve, thereby arcuately moving the corresponding mounting member.

19. The steering assembly as claimed in claim 18, wherein the first and second cylinders are reciprocally interconnected such that activation of one of the first and second cylinders in order to move the corresponding barrel linearly in a first direction causes activation of the other of the first and second cylinders and moves the corresponding barrel in a second direction opposite the first direction.

20. The steering assembly as claimed in claim 18, wherein the movement transmission means comprise:

a half wheel pivotally connected to the corresponding frame member and to the corresponding mounting member; and a plurality of cables connecting the barrel to the half wheel for urging pivoting of the half wheel when the barrel is moved linearly along the sleeve to thereby arcuately move the corresponding mounting member.

21. The steering assembly as claimed in claim 1, further comprising controlling means operatively connected to the actuator for controlling actuation of the first swing mechanism.

22. The steering assembly as claimed in claim 12, further comprising controlling means operatively connected to the actuator for controlling actuation of the first and second swing mechanisms.

23. The steering assembly as claimed in claim 22, wherein the vehicle comprises a trailer pivotally coupled to a tractor truck via a fifth wheel coupling for enabling pivoting of the trailer relative to the tractor truck about a vertical trailer pivot axis.

24. The steering assembly as claimed in claim 23, wherein the controlling means are operatively coupled to the actuator and the fifth wheel coupling for detecting a turning angle of the tractor truck relative to the trailer, the tractor truck travelling on a ground surface, and for controlling actuation of the first and second swing mechanisms in order to orient the first, second, third and fourth wheels tangentially to their respective trajectory, thereby preventing slippage of the first, second, third and fourth wheels on the ground surface.

25. The steering assembly as claimed in claim 22, wherein the controlling means are settable to a manual mode for enabling a user to manually orient the first, second, third and fourth wheels in their respective desired orientation.

26. The steering assembly as claimed in claim 13, wherein the first, second, third and fourth wheels each comprises a dual wheel assembly having a pair of single wheels rotatably mounted to a corresponding steering knuckle, parallel to one another.

27. A vehicle comprising the steering assembly as claimed in claim 1.

28. A method of operating the steering assembly as claimed in claim 13, the method comprising:

providing the steering assembly;

activating the actuator to thereby move the first, second, third and fourth steering knuckle along their respective arced path until the first, second, third and fourth wheels are oriented in the desired orientation.

29. The method as claimed in claim 28, wherein the vehicle comprises a trailer pivotally coupled to a tractor truck via a fifth wheel coupling for enabling pivoting of the trailer relative to the tractor truck about a vertical trailer pivot axis, the method further comprising:
- detecting a turning angle of the tractor truck relative to the trailer, the tractor truck travelling on a ground surface;
- controlling actuation of the first and second swing mechanisms in order to orient the first, second, third and fourth wheels tangentially to their respective trajectory, thereby preventing slippage of the first, second, third and fourth wheels on the ground surface.

30. The method as claimed in claim 28, wherein activating the actuator comprises manually activating the actuator.

* * * * *